US012626416B2

(12) United States Patent
Zhang et al.

(10) Patent No.: US 12,626,416 B2
(45) Date of Patent: May 12, 2026

(54) DATA ENCODING METHOD AND RELATED DEVICE FOR LOSSLESS COMPRESSION USING TRAINED VOLUME PRESERVING FLOW MODEL

(71) Applicant: Huawei Technologies Co., Ltd., Shenzhen (CN)

(72) Inventors: Shifeng Zhang, Beijing (CN); Chen Zhang, Shenzhen (CN); Ning Kang, Hong Kong (CN); Zhenguo Li, Hong Kong (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 258 days.

(21) Appl. No.: 18/455,844

(22) Filed: Aug. 25, 2023

(65) Prior Publication Data

US 2023/0401756 A1    Dec. 14, 2023

Related U.S. Application Data

(63) Continuation of application No. PCT/CN2022/077808, filed on Feb. 25, 2022.

(30) Foreign Application Priority Data

Feb. 27, 2021    (CN) ........................ 202110221722.X

(51) Int. Cl.
*G06T 9/00* (2006.01)
*G06N 3/0464* (2023.01)
(Continued)

(52) U.S. Cl.
CPC ........... *G06T 9/002* (2013.01); *G06N 3/0464* (2023.01); *H04N 19/13* (2014.11); *H04N 19/149* (2014.11);
(Continued)

(58) Field of Classification Search
CPC ........... G06T 9/002; G06T 2207/10016; G06T 2207/20076; G06T 2207/20081;
(Continued)

(56) References Cited

U.S. PATENT DOCUMENTS

| | | | |
|---|---|---|---|
| 11,924,445 B2 * | 3/2024 | Van Rozendaal .... | G06N 3/0495 |
| 2023/0239516 A1 * | 7/2023 | Mao ........................ | H04N 19/30 |
| | | | 375/240.12 |

(Continued)

FOREIGN PATENT DOCUMENTS

| | | | |
|---|---|---|---|
| EP | 3644515 A1 | 4/2020 | |
| WO | WO-2023207836 A1 * | 11/2023 | ............. H04N 19/42 |

(Continued)

OTHER PUBLICATIONS

Huang, Chin-Wei, Laurent Dinh, and Aaron Courville. "Augmented normalizing flows: Bridging the gap between generative flows and latent variable models." arXiv preprint arXiv:2002.07101 (Year: 2020).*

(Continued)

*Primary Examiner* — Scott A Rogers
(74) *Attorney, Agent, or Firm* — Conley Rose, P.C.

(57) ABSTRACT

A data encoding method includes obtaining to-be-encoded data; processing the to-be-encoded data by using a volume preserving flow model to obtain a hidden variable output, where the volume preserving flow model includes a target volume preserving flow layer, an operation corresponding to the target volume preserving flow layer is an invertible operation that meets a volume preserving flow constraint, the target volume preserving flow layer is used to perform a multiplication operation on a preset coefficient and first data input to the target volume preserving flow layer, and the preset coefficient is not 1; and encoding the hidden variable output to obtain encoded data.

17 Claims, 14 Drawing Sheets

(51) Int. Cl.
 *H04N 19/13* (2014.01)
 *H04N 19/149* (2014.01)
 *H04N 19/91* (2014.01)

(52) U.S. Cl.
 CPC .... *H04N 19/91* (2014.11); *G06T 2207/10016*
 (2013.01); *G06T 2207/20076* (2013.01); *G06T*
 *2207/20081* (2013.01); *G06T 2207/20084*
 (2013.01)

(58) Field of Classification Search
 CPC ........ G06T 2207/20084; G06N 3/0464; H04N
 19/13; H04N 19/149; H04N 19/91
 See application file for complete search history.

(56) References Cited

U.S. PATENT DOCUMENTS

| | | | |
|---|---|---|---|
| 2023/0276063 A1* | 8/2023 | Kim | H04N 19/172 |
| | | | 375/240.08 |
| 2024/0235577 A1* | 7/2024 | Zhang | H03M 7/6035 |
| 2024/0323441 A1* | 9/2024 | Guo | H04N 19/60 |
| 2025/0150640 A1* | 5/2025 | Kim | H04N 19/119 |
| 2025/0245488 A1* | 7/2025 | Alshina | H04N 19/51 |
| 2025/0278627 A1* | 9/2025 | Perez | G06N 3/0442 |

FOREIGN PATENT DOCUMENTS

| | | | | |
|---|---|---|---|---|
| WO | WO-2024245277 A1 * | 12/2024 | ............ | H04N 19/61 |
| WO | WO-2025011360 A1 * | 1/2025 | ............ | H04N 19/42 |

OTHER PUBLICATIONS

Townsend, James. "Lossless compression with latent variable models." arXiv preprint arXiv:2104.10544 (Year: 2021).*

Wang, Siyu, et al. "Fast lossless neural compression with integer-only discrete flows." International Conference on Machine Learning. PMLR (Year: 2022).*

European extended search report and opinion in EP application No. 22758952 dated Jun. 6, 2024 (Year: 2024).*

Emiel Hoogeboom et al: "Integer Discrete Flows and Lossless Compression", 33rd Conference on Neural Information Processing Systems (NeurIPS 2019), Dec. 6, 2019, total 14 pages.

George Papamakarios et al., "Normalizing Flows for Probabilistic Modeling and Inference," arXiv 1912.02762v1, stat. ML, Dec. 5, 2019, 60 pages.

Rianne van den Berg et al., IDF ++: Analyzing and Improving Integer Discrete Flows for Lossless Compression arXiv 2006.12459v1, cs. LG, Jun. 22, 2020, 16 pages.

* cited by examiner

Hidden variable output

To-be-encoded data

Obtain encoded data — 701

↓

Decode the encoded data, to obtain a hidden variable output — 702

↓

Obtain a volume preserving flow model, and process the hidden variable output by using the volume preserving flow model, to obtain a decoding output, where the volume preserving flow model includes a target volume preserving flow layer, an operation corresponding to the target volume preserving flow layer is an invertible operation that meets a volume preserving flow constraint, the target volume preserving flow layer is used to obtain first data, and perform a division operation on the first data and a preset coefficient, and the preset coefficient is not 1 — 703

FIG. 7

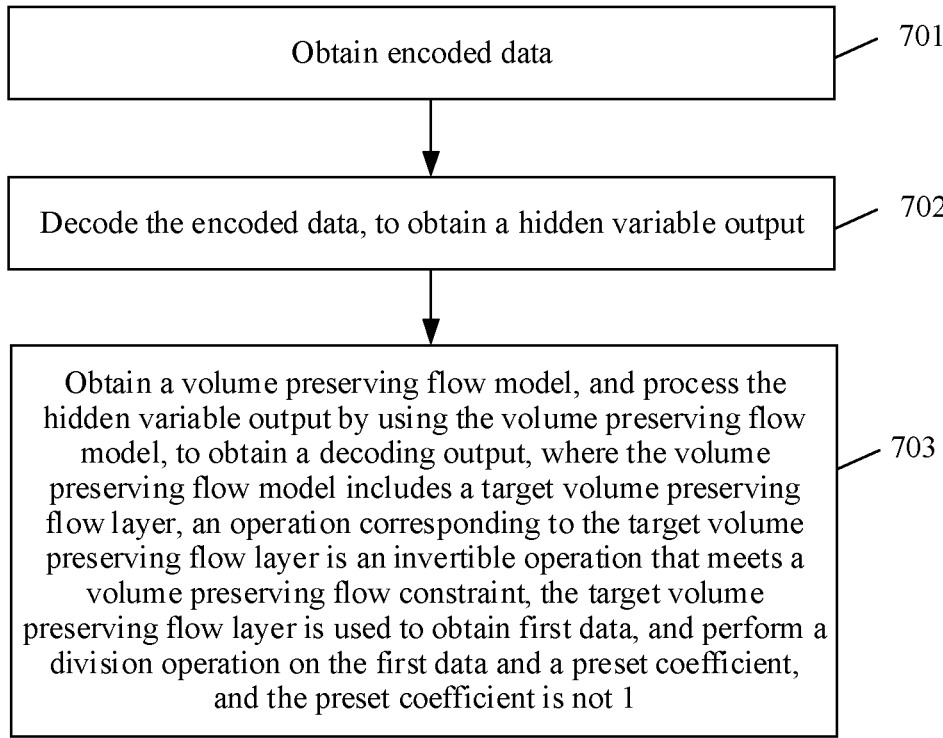

Encoded data

Encoder

Hidden variable output

Volume preserving flow model (forward calculation)

To-be-encoded data

Decoder

Hidden variable output

Volume preserving flow model (inverse calculation)

Decoding output

Execution device

Antenna          Antenna

Receiver 1401        Transmitter 1402

Processor 1403

Memory 1404

Application processor 14031

Communication processor 14032

DATA ENCODING METHOD AND RELATED DEVICE FOR LOSSLESS COMPRESSION USING TRAINED VOLUME PRESERVING FLOW MODEL

CROSS-REFERENCE TO RELATED APPLICATIONS

This is a continuation of International Patent Application No. PCT/CN2022/077808 filed on Feb. 25, 2022, which claims priority to Chinese Patent Application No. 202110221722.X filed on Feb. 27, 2021. The disclosures of the aforementioned applications are hereby incorporated by reference in their entireties.

TECHNICAL FIELD

This application relates to the field of artificial intelligence, and in particular, to a data encoding method and a related device.

BACKGROUND

A core of lossless compression is searching for a distribution rule inside data. For example, in an English document, the letter e appears more frequently than the letter z. If e is stored by using shorter bits, a storage length of the document can be shorter, to implement document compression. Artificial intelligence (AI) lossless compression is a new technology field that uses artificial intelligence to perform lossless compression. A core of the artificial intelligence lossless compression is using AI to search for a better distribution rule inside data, and compress data based on data distribution to obtain a better lossless compression rate.

During lossless compression, input data and a hidden variable output used for encoding need to be discrete and completely invertible. This directly limits selection and use of a data encoding/decoding method. Because if most data encoding/decoding methods perform a floating-point operation, a numerical error is caused, and an invertible operation cannot be implemented.

In an existing implementation, lossless compression is performed by using an integer discrete flow (IDF) model. The integer discrete flow model uses integer addition and subtraction operations, to avoid a floating-point error, and ensure that a value of the flow model is invertible. During calculation, the model uses integer addition and subtraction operations for input data, to avoid a numerical error. In addition, both the input data x and a hidden variable output z=f(x) are integers, and $f^{-1}(f(x))=x$ can be ensured. However, because only the integer addition and subtraction operations are used in an encoding/decoding process, an IDF representation capability is poor, and data distribution cannot be accurately estimated, which causes a low compression rate.

SUMMARY

According to a first aspect, this application provides a data encoding method. The method includes obtaining the to-be-encoded data.

The to-be-encoded data may be data of an image, a video, or a text.

For example, the to-be-encoded data is data of an image. The image may be an image photographed by a terminal device by using a camera, or an image obtained from a terminal device (for example, an image stored in an album of the terminal device, or a picture obtained by the terminal device from a cloud). It should be understood that the image may be an image with an image compression requirement. A source of the to-be-processed image is not limited in this application.

The to-be-encoded data is processed by using a volume preserving flow model to obtain a hidden variable output. The volume preserving flow model includes a target volume preserving flow layer, an operation corresponding to the target volume preserving flow layer is an invertible operation that meets a volume preserving flow constraint, the target volume preserving flow layer is used to perform a multiplication operation on a preset coefficient and first data input to the target volume preserving flow layer, and the preset coefficient is not 1.

The target volume preserving flow layer may also be referred to as a target volume preserving coupling layer.

The volume preserving flow constraint may be that input space and output space of an operation corresponding to a volume preserving operation layer have a same volume size. The same volume size means that data of the input space one-to-one corresponds to the data of the output space, and different output data corresponds to different input data. To ensure that the operation corresponding to the target volume preserving flow layer meets the volume preserving flow constraint, a product of linear coefficients in the operation corresponding to the target volume preserving flow layer needs to be 1. Further, the first data and the preset coefficient are vectors, the first data includes N elements, the preset coefficient includes N coefficients, the N elements included in the first data one-to-one correspond to the N coefficients, the N coefficients included in the preset coefficient is the linear coefficients in the operation corresponding to the target volume preserving flow layer, and a product of the N coefficients is 1.

The invertible operation means that the operation may obtain output data based on input data, and may also inversely derive the input data based on the output data. For example, it is assumed that the input data is x, and the output data is z=f(x). x may also be restored from the output data z by using an inverse operation.

The hidden variable output is encoded to obtain encoded data.

In this embodiment of this application, the hidden variable output z may be represented by probability distribution $p_z(z)$, and the hidden variable output z may be encoded based on the probability distribution $p_z(z)$ to obtain the encoded data.

In an optional implementation, the encoded data is a binary bitstream. An entropy estimation network may be used to obtain probability estimation of each point in the hidden variable output, and entropy encoding is performed on the hidden variable output based on the probability estimation to obtain the binary bitstream. It should be noted that an existing entropy encoding technology may be used in the entropy encoding process mentioned in this application. Details are not described in this application.

In this application, lossless compression is implemented by using the volume preserving flow model. In comparison with an integer discrete flow model, on a premise that the target volume preserving flow layer of the volume preserving flow model can be inverse, the operation corresponding to the target volume preserving flow layer includes an operation (multiplication operation) other than integer addition and subtraction operations such that the volume preserving flow model has a stronger representation capability.

This can more accurately determine data distribution, and implement a better compression rate.

On the other hand, for a general flow model, it can be proved that there is no method for implementing numerical invertibility in discrete space. Because hidden variable data may correspond to a plurality of pieces of input data due to a numerical error, a plurality of encoding operations need to be performed to eliminate the numerical error, which causes low algorithm efficiency. However, in the volume preserving flow model in this embodiment of this application, a numerical invertible operation can be implemented by using a numerical invertible target volume preserving flow layer. On a premise that the model has a strong representation capability, a small quantity of encoding times is implemented in a compression process. This implements a higher compression throughput rate and a lower compression rate.

In a possible implementation, the first data and the preset coefficient are vectors, the first data includes N elements, the preset coefficient includes N coefficients, the N elements included in the first data one-to-one correspond to the N coefficients, a product of the N coefficients is 1, and performing the multiplication operation on the first data and the preset coefficient includes performing a multiplication operation on each element in the first data and a corresponding coefficient to obtain a product result.

In a possible implementation, the method further includes processing, by using a first neural network, second data input to the target volume preserving flow layer to obtain a first network output, and performing a preset operation on the first network output to obtain the preset coefficient. In an implementation, the preset operation is an exponentiation operation by using a natural constant e as a base.

The first data and the second data are two parts of the input data. For example, if the input data is a vector [A, B], the first data is a vector [A], and the second data is a vector [B].

In a possible implementation, the first network output is a vector, the first network output includes N elements, and performing the preset operation on the first network output includes obtaining an average of the N elements included in the first network output, and subtracting the average from each element included in the first network output to obtain processed N elements; and performing an exponentiation operation on each of the processed N elements by using a natural constant e as a base to obtain the preset coefficient, where the preset coefficient includes the N coefficients.

To ensure that the product of the N coefficients in the preset coefficient is 1, an average may be subtracted from each element included in the first network output. Further, the first network output is a vector, and the first network output includes the N elements. The average of the N elements included in the first network output may be obtained, and the average is subtracted from each element included in the first network output to obtain the processed N elements. An exponentiation operation is performed on each of the processed N elements by using the natural constant e as a base to obtain the preset coefficient, where the preset coefficient includes the N coefficients.

In a possible implementation, an output at the target volume preserving flow layer includes the second data.

In a possible implementation, the target volume preserving flow layer is further used to perform an addition operation on a constant term and the product result of the first data and the preset coefficient, where the constant term is not 0.

In a possible implementation, the method further includes processing, by using a second neural network, the second data input to the target volume preserving flow layer to obtain the constant term.

In a possible implementation, the first data and the preset coefficient are vectors, the first data includes the N elements, the preset coefficient includes the N coefficients, the N elements included in the first data one-to-one correspond to the N coefficients, the N elements include a first target element and a second target element, the first target element corresponds to a first target coefficient, the second target element corresponds to a second target coefficient, and performing the multiplication operation on the first data and the preset coefficient includes obtaining a first fixed-point number corresponding to the first target element and a second fixed-point number corresponding to the second target element; obtaining a first fraction corresponding to the first target coefficient and a second fraction corresponding to the second target coefficient, where the first fraction includes a first numerator and a first denominator, the second fraction includes a second numerator and a second denominator, the first numerator, the first denominator, the second numerator, and the second denominator are integers, and the first denominator is the same as the second numerator; performing a multiplication operation on the first fixed-point number and the first numerator to obtain a first result; performing a division operation on the first result and the first denominator to obtain a second result, where the second result includes a first quotient result and a first remainder result, and the first quotient result is used as a multiplication result of the first target element and the first target coefficient; performing a multiplication operation on the second fixed-point number and the second numerator to obtain a third result; performing an addition operation on the third result and the first remainder result to obtain a fourth result; and performing a division operation on the fourth result and the second denominator to obtain a fifth result, where the fifth result includes a second quotient result and a second remainder result, and the second quotient result is used as a multiplication result of the second target element and the second target coefficient.

In this embodiment, an inverse calculation problem is resolved through division with a remainder. Further, a linear coefficient is changed into a fractional form, and a numerator of each dimension is a denominator of a previous dimension. Data of each dimension is multiplied by a numerator of a current linear coefficient, a remainder of the previous dimension is added, and then a denominator is used to perform division with a remainder to obtain a result of a current dimension. In addition, the remainder of division with a remainder is transferred to a next dimension, to eliminate a numerical error.

For example, a fixed-point number of the first data x may be [44/16, 55/16, 66/16], 16 indicates that precision of the fixed-point number is not in the multiplication operation, and the fixed-point number of the first data is x=[44, 55, 66]. The preset coefficient s is [0.65, 0.61, 2.52], and a fraction corresponding to the preset coefficient s is represented as [2/3, 3/5, 5/2]. The first fixed-point number is 44, the second fixed-point number is 55, the first target coefficient is 0.65, the second target coefficient is 0.61, the first fraction is 2/3, the second fraction is 3/5, the first numerator is 2, the first denominator is 3, the second numerator is 3, and the second denominator is 5. A multiplication operation is performed on the first fixed-point number (44) and the first numerator (2) to obtain the first result (88), and a division operation is performed on the first result (88) and the first denominator (3) to obtain the second result. The second result includes the first quotient result (29) and the first remainder result (1), and the first quotient result (29) is used as the multiplication result of the first target element and the first target coefficient. A multiplication operation is performed on the second fixed-point number (55) and the second numerator (3) to obtain the third result (165), an addition operation is performed on the third result (165) and the first remainder result (1) to obtain the fourth result (166), and a division operation is performed on the fourth result (166) and the second denominator (5) to obtain the fifth result. The fifth result includes the second quotient result (33) and the second remainder result (1), and the second quotient result (33) is used as the multiplication result of the second target element and the second target coefficient.

In a possible implementation, the second target element is a last element in the N elements on which a multiplication operation is performed with a corresponding coefficient in a process of performing a multiplication operation on the first data and the preset coefficient, and the target volume preserving flow layer is further used to output the second remainder result. Further, the target volume preserving flow layer may output the second remainder result to a next volume preserving flow layer adjacent to the target volume preserving flow layer. In other words, a remainder result is obtained for each element in the first data in the foregoing manner, and is input to a calculation process of a next element until a product operation of a last element in the first data is completed. In this case, an obtained remainder result may be input to an adjacent next volume preserving flow layer.

In a possible implementation, the target volume preserving flow layer is further used to output the second remainder result to a next volume preserving flow layer adjacent to the target volume preserving flow layer.

In a possible implementation, the volume preserving flow model further includes a first volume preserving flow layer, the first volume preserving flow layer is an adjacent volume preserving flow layer before the target volume preserving flow layer, and performing the multiplication operation on the first fixed-point number and the first numerator to obtain a first result includes obtaining a remainder result output by the first volume preserving flow layer; and performing a multiplication operation on the first fixed-point number and the first numerator, and performing an addition operation on a multiplication operation result and the remainder result output by the first volume preserving flow layer to obtain the first result.

In an implementation, if the target volume preserving flow layer is a $1^{st}$ volume preserving flow layer (namely, a volume preserving flow layer for processing the to-be-encoded data) in the volume preserving flow model, the first result is the multiplication result of the multiplication operation performed on the first fixed-point number and the first numerator. If the target volume preserving flow layer is not a $1^{st}$ volume preserving flow layer (namely, a volume preserving flow layer not for processing the to-be-encoded data, but for processing an output result at another intermediate layer) in the volume preserving flow model, the first fixed-point number is a summation result of the multiplication result of the multiplication operation performed on the first fixed-point number and the first numerator and a remainder result output by an adjacent previous volume preserving flow layer.

In a possible implementation, the volume preserving flow model includes M volume preserving flow layers that are connected in series, the M volume preserving flow layers that are connected in series include the target volume preserving flow layer, an output at an $(i-1)^{th}$ volume preserving flow layer is used as an input at an $i^{th}$ volume preserving flow layer, i is a positive integer not greater than M, an input at a $1^{st}$ volume preserving flow layer is the to-be-encoded data, and an output at an $M^{th}$ volume preserving flow layer is the hidden variable output. The volume preserving flow model may be obtained by stacking a plurality of volume preserving flow layers.

In a possible implementation, the volume preserving flow model further includes a target convolutional layer connected to the target volume preserving flow layer, the output at the target volume preserving flow layer is used as an input at the target convolutional layer, and the target convolutional layer is used to perform a multiplication operation on the output at the target volume preserving flow layer and a weight matrix.

In a possible implementation, performing the multiplication operation on the output at the target volume preserving flow layer and a weight matrix includes obtaining the weight matrix; performing lower-upper (LU) decomposition on the weight matrix to obtain a first matrix, a second matrix, a third matrix, and a fourth matrix, where the first matrix is a permutation matrix, the second matrix is a lower triangular matrix, the third matrix is a unit matrix whose product of diagonal elements is 1, and the fourth matrix is an upper triangular matrix; performing a multiplication operation on the output at the target volume preserving flow layer and the fourth matrix to obtain a sixth result; performing a multiplication operation on the sixth result and the third matrix to obtain a seventh result; performing a multiplication operation on the seventh result and the second matrix to obtain an eighth result; and performing a multiplication operation on the eighth result and the first matrix to obtain a ninth result, where the ninth result is used as a result obtained by performing a multiplication operation on the output at the target volume preserving flow layer and the weight matrix.

In this embodiment, the target convolutional layer is converted into continuous matrix multiplication operations of the upper triangular matrix, the diagonal matrix, the lower triangular matrix, and the permutation matrix, and iterative calculation, numerical calculation at a coupling layer, iterative calculation, and element rearrangement are respectively used for the four matrix multiplication operations. When a multiplication operation is performed on the convolutional layer and the weight matrix, the target convolutional layer is converted into continuous matrix multiplication operations of the upper triangular matrix, the diagonal matrix, the lower triangular matrix, and the permutation matrix. Four calculation manners, namely, iterative calculation, numerical calculation at the target volume preserving flow layer, iterative calculation, and element rearrangement, are respectively used for the four matrix multiplication operations. In addition, an inverse calculation method of each calculation manner is provided, to implement numerical inverse calculation at the target convolutional layer.

In a possible implementation, the volume preserving flow model includes M volume preserving flow layers and M convolutional layers that are connected in series, the M volume preserving flow layers include the target volume preserving flow layer, the M convolutional layers include the target convolutional layer, an output at an $i^{th}$ volume preserving flow layer is used as an input at an $i^{th}$ convolutional layer, an output at the $i^{th}$ convolutional layer is used as an input at an $(i+1)^{th}$ volume preserving flow layer, i is a positive integer not greater than M, an input at a $1^{st}$ volume preserving flow layer is the to-be-encoded data, and an output at an Mt convolutional layer is the hidden variable output. The volume preserving flow model may be obtained by stacking a plurality of volume preserving flow layers and a plurality of convolutional layers.

According to a second aspect, this application provides a data decoding method. The method includes obtaining encoded data.

In this embodiment of this application, after the encoded data is obtained, the encoded data may be sent to a terminal device for decompression, and an image processing device for decompression may obtain the encoded data, and decompress the data. Alternatively, a terminal device for compression may store the encoded data in a storage device. When required, the terminal device may obtain the encoded data from the storage device, and may decompress the encoded data.

It should be understood that a decoding device may further obtain the remainder result described in the foregoing embodiment.

The encoded data is decoded to obtain a hidden variable output.

In this embodiment of this application, the decoding device may decode the encoded data to obtain the hidden variable output.

Further, the encoded data may be decoded by using an entropy decoding technology in the conventional technology to obtain a reconstructed hidden variable output.

The hidden variable output is processed by using a volume preserving flow model to obtain a decoding output. The volume preserving flow model includes a target volume preserving flow layer, an operation corresponding to the target volume preserving flow layer is an invertible operation that meets a volume preserving flow constraint, the target volume preserving flow layer is used to perform a multiplication operation on a preset coefficient and first data input to the target volume preserving flow layer, and the preset coefficient is not 1.

The invertible operation means that the operation may obtain output data based on input data, and may also inversely derive the input data based on the output data. For example, it is assumed that the input data is x, and the output data is z=f(x). x may also be restored from the output data z by using an inverse operation.

In this embodiment of this application, after the hidden variable output is obtained, the hidden variable output may be processed by using an inverse operation of an operation corresponding to each layer in the volume preserving flow model, to restore original to-be-encoded data (namely, a decoding output) such as to implement lossless decompression.

In a possible implementation, the volume preserving flow constraint includes that input space and output space of an operation corresponding to a volume preserving operation layer have a same volume size.

In a possible implementation, the first data and the preset coefficient are vectors, the first data includes N elements, the preset coefficient includes N coefficients, the N elements included in the first data one-to-one correspond to the N coefficients, a product of the N coefficients is 1, and the performing a division operation on the first data and the preset coefficient includes performing a division operation on each element in the first data and a corresponding coefficient to obtain a division result.

In this embodiment of this application, to ensure that the operation corresponding to the target volume preserving flow layer meets the volume preserving flow constraint, a product of linear coefficients in the operation corresponding to the target volume preserving flow layer needs to be 1. Further, the first data and the preset coefficient are vectors, the first data includes N elements, the preset coefficient includes N coefficients, the N elements included in the first data one-to-one correspond to the N coefficients, the N coefficients included in the preset coefficient is the linear coefficients in the operation corresponding to the target volume preserving flow layer, and a product of the N coefficients is 1.

In a possible implementation, the method further includes processing, by using a first neural network, second data input to the target volume preserving flow layer to obtain a first network output, and performing a preset operation on the first network output to obtain the preset coefficient.

In a possible implementation, the first network output is a vector, the first network output includes N elements, and performing the preset operation on the first network output includes obtaining an average of the N elements included in the first network output, and subtracting the average from each element included in the first network output to obtain processed N elements; and performing an exponentiation operation on each of the processed N elements by using a natural constant e as a base to obtain the preset coefficient, where the preset coefficient includes the N coefficients.

To ensure that the product of the N coefficients in the preset coefficient is 1, an average may be subtracted from each element included in the first network output. Further, the first network output is a vector, and the first network output includes the N elements. The average of the N elements included in the first network output may be obtained, and the average is subtracted from each element included in the first network output to obtain the processed N elements. An exponentiation operation is performed on each of the processed N elements by using the natural constant e as a base to obtain the preset coefficient, where the preset coefficient includes the N coefficients.

In a possible implementation, an output at the target volume preserving flow layer includes the second data.

In a possible implementation, the target volume preserving flow layer is further used to perform a subtraction operation on the first data and a constant term to obtain a subtraction result, where the constant term is not 0; and performing the division operation on the first data and the preset coefficient includes performing a division operation on the subtraction result and the preset coefficient.

In a possible implementation, the method further includes processing, by using a second neural network, the second data input to the target volume preserving flow layer to obtain the constant term.

In a possible implementation, the first data and the preset coefficient are vectors, the first data includes the N elements, the preset coefficient includes the N coefficients, the N elements included in the first data one-to-one correspond to the N coefficients, the N elements include a first target element and a second target element, the first target element corresponds to a first target coefficient, the second target element corresponds to a second target coefficient, and performing the division operation on the first data and the preset coefficient includes obtaining a first fixed-point number corresponding to the first target element and a second fixed-point number corresponding to the second target element; obtaining a first fraction corresponding to the first target coefficient and a second fraction corresponding to the second target coefficient, where the first fraction includes a first numerator and a first denominator, the second fraction includes a second numerator and a second denominator, the first numerator, the first denominator, the second numerator, and the second denominator are integers, and the first numerator is the same as the second denominator; performing a multiplication operation on the first fixed-point number and the first denominator to obtain a first result; performing a division operation on the first result and the first numerator to obtain a second result, where the second result includes a first quotient result and a first remainder result, and the first quotient result is used as a division result of the first target element and the first target coefficient; performing a multiplication operation on the second fixed-point number and the second denominator to obtain a third result; performing an addition operation on the third result and the first remainder result to obtain a fourth result; and performing a division operation on the fourth result and the second numerator to obtain a fifth result, where the fifth result includes a second quotient result and a second remainder result, and the second quotient result is used as a division result of the second target element and the second target coefficient.

In a possible implementation, the second target element is a last element in the N elements on which a division operation is performed with a corresponding coefficient in a process of performing a division operation on the first data and the preset coefficient, and the target volume preserving flow layer is further used to output the second remainder result.

In a possible implementation, the volume preserving flow model further includes a first volume preserving flow layer, the first volume preserving flow layer is an adjacent volume preserving flow layer before the target volume preserving flow layer, and performing the multiplication operation on the first fixed-point number and the first denominator to obtain a first result includes obtaining a remainder result output by the first volume preserving flow layer; and performing a multiplication operation on the first fixed-point number and the first denominator, and performing an addition operation on a multiplication operation result and the remainder result output by the first volume preserving flow layer to obtain the first result.

In a possible implementation, the volume preserving flow model includes M volume preserving flow layers that are connected in series, the M volume preserving flow layers that are connected in series include the target volume preserving flow layer, an output at an $(i-1)^{th}$ volume preserving flow layer is used as an input at an $i^{th}$ volume preserving flow layer, i is a positive integer not greater than M, an input at a $1^{st}$ volume preserving flow layer is the hidden variable output, and an output at an $M^{th}$ volume preserving flow layer is the decoding output.

In a possible implementation, the volume preserving flow model further includes a target convolutional layer connected to the target volume preserving flow layer, an output at the target convolutional layer is the first data, and the target convolutional layer is used to perform a division operation on input data and a weight matrix.

In a possible implementation, performing the division operation on input data and a weight matrix includes obtaining the weight matrix; performing LU decomposition on the weight matrix to obtain a first matrix, a second matrix, a third matrix, and a fourth matrix, where the first matrix is a permutation matrix, the second matrix is a lower triangular matrix, the third matrix is a unit matrix whose product of diagonal elements is 1, and the fourth matrix is an upper triangular matrix; performing a multiplication operation on the input data and an inverse matrix of the first matrix to obtain a sixth result; performing a multiplication operation on the sixth result and an inverse matrix of the second matrix to obtain a seventh result; performing a multiplication operation on the seventh result and an inverse matrix of the third matrix to obtain an eighth result; and performing a multiplication operation on the eighth result and an inverse matrix of the fourth matrix to obtain a ninth result, where the ninth result is used as a result obtained by performing a division operation on the input data and the weight matrix.

The second target element is a last element in the N elements on which a division operation is performed with a corresponding coefficient in a process of performing a division operation on the first data and the preset coefficient, and the target volume preserving flow layer is further used to output the second remainder result. Further, the target volume preserving flow layer may output the second remainder result to a next volume preserving flow layer adjacent to the target volume preserving flow layer. In other words, a remainder result is obtained for each element in the first data in the foregoing manner, and is input to a calculation process of a next element until a product operation of a last element in the first data is completed. In this case, an obtained remainder result may be input to an adjacent next volume preserving flow layer.

In a possible implementation, the volume preserving flow model includes M volume preserving flow layers and M convolutional layers that are connected in series, the M volume preserving flow layers include the target volume preserving flow layer, the M convolutional layers include the target convolutional layer, an output at an $i^{th}$ convolutional layer is used as an input at an $i^{th}$ volume preserving flow layer, an output at the $i^{th}$ volume preserving flow layer is used as an input at an $(i+1)^{th}$ convolutional layer, i is a positive integer not greater than M, an input at a $1^{st}$ convolutional layer is the hidden variable output, and an output at an $M^{th}$ volume preserving flow layer is the decoding output.

A multiplication operation is performed on the input data and an inverse matrix of the first matrix to obtain a sixth result. A multiplication operation is performed on the sixth result and an inverse matrix of the second matrix to obtain a seventh result. A multiplication operation is performed on the seventh result and an inverse matrix of the third matrix to obtain an eighth result. A multiplication operation is performed on the eighth result and an inverse matrix of the fourth matrix to obtain a ninth result, where the ninth result is used as a result obtained by performing a division operation on the input data and the weight matrix. For how to perform an invertible operation on the target convolutional layer, refer to the descriptions of the invertible operation on the target convolutional layer in the embodiment corresponding to FIG. 3. Details are not described herein.

In this application, lossless compression is implemented by using the volume preserving flow model. In comparison with an integer discrete flow model, on a premise that the target volume preserving flow layer of the volume preserving flow model can be inverse, the operation corresponding to the target volume preserving flow layer includes an operation (multiplication operation) other than integer addition and subtraction operations, so that the volume preserving flow model has a stronger representation capability. This can more accurately determine data distribution, and implement a better compression rate.

On the other hand, for a general flow model, it can be proved that there is no method for implementing numerical invertibility in discrete space. Because hidden variable data may correspond to a plurality of pieces of input data due to a numerical error, a plurality of encoding operations need to be performed to eliminate the numerical error, which causes low algorithm efficiency. However, in the volume preserving flow model in this embodiment of this application, a numerical invertible operation can be implemented by using a numerical invertible target volume preserving flow layer. On a premise that the model has a strong representation capability, a small quantity of encoding times is implemented in a compression process. This implements a higher compression throughput rate and a lower compression rate.

According to a third aspect, this application provides a data encoding apparatus. The apparatus includes an obtaining module configured to obtain to-be-encoded data; a volume preserving flow module configured to process the to-be-encoded data by using a volume preserving flow model to obtain a hidden variable output, where the volume preserving flow model includes a target volume preserving flow layer, an operation corresponding to the target volume preserving flow layer is an invertible operation that meets a volume preserving flow constraint, the target volume preserving flow layer is used to perform a multiplication operation on a preset coefficient and first data input to the target volume preserving flow layer, and the preset coefficient is not 1; and an encoding module configured to encode the hidden variable output to obtain encoded data.

In this application, lossless compression is implemented by using the volume preserving flow model. In comparison with an integer discrete flow model, on a premise that the target volume preserving flow layer of the volume preserving flow model can be inverse, the operation corresponding to the target volume preserving flow layer includes an operation (multiplication operation) other than integer addition and subtraction operations such that the volume preserving flow model has a stronger representation capability. This can more accurately determine data distribution, and implement a better compression rate.

On the other hand, for a general flow model, it can be proved that there is no method for implementing numerical invertibility in discrete space. Because hidden variable data may correspond to a plurality of pieces of input data due to a numerical error, a plurality of encoding operations need to be performed to eliminate the numerical error, which causes low algorithm efficiency. However, in the volume preserving flow model in this embodiment of this application, a numerical invertible operation can be implemented by using a numerical invertible target volume preserving flow layer. On a premise that the model has a strong representation capability, a small quantity of encoding times is implemented in a compression process. This implements a higher compression throughput rate and a lower compression rate.

In a possible implementation, the volume preserving flow constraint includes that input space and output space of an operation corresponding to a volume preserving operation layer have a same volume size.

In a possible implementation, the first data and the preset coefficient are vectors, the first data includes N elements, the preset coefficient includes N coefficients, the N elements included in the first data one-to-one correspond to the N coefficients, a product of the N coefficients is 1, and performing the multiplication operation on the first data and the preset coefficient includes performing a multiplication operation on each element in the first data and a corresponding coefficient to obtain a product result.

In a possible implementation, the volume preserving flow module is further configured to process, by using a first neural network, second data input to the target volume preserving flow layer to obtain a first network output, and perform a preset operation on the first network output to obtain the preset coefficient.

In a possible implementation, the first network output is a vector, and the first network output includes the N elements. The obtaining module is configured to obtain an average of the N elements included in the first network output, and subtract the average from each element included in the first network output to obtain processed N elements; and perform an exponentiation operation on each of the processed N elements by using a natural constant e as a base to obtain the preset coefficient, where the preset coefficient includes the N coefficients.

In a possible implementation, an output at the target volume preserving flow layer includes the second data.

In a possible implementation, the target volume preserving flow layer is further used to perform an addition operation on a constant term and the product result of the first data and the preset coefficient, where the constant term is not 0.

In a possible implementation, the volume preserving flow module is configured to process, by using a second neural network, the second data input to the target volume preserving flow layer to obtain the constant term.

In a possible implementation, the first data and the preset coefficient are vectors, the first data includes the N elements, the preset coefficient includes the N coefficients, the N elements included in the first data one-to-one correspond to the N coefficients, the N elements include a first target element and a second target element, the first target element corresponds to a first target coefficient, the second target element corresponds to a second target coefficient, and the volume preserving flow module is configured to obtain a first fixed-point number corresponding to the first target element and a second fixed-point number corresponding to the second target element; obtain a first fraction corresponding to the first target coefficient and a second fraction corresponding to the second target coefficient, where the first fraction includes a first numerator and a first denominator, the second fraction includes a second numerator and a second denominator, the first numerator, the first denominator, the second numerator, and the second denominator are integers, and the first denominator is the same as the second numerator; perform a multiplication operation on the first fixed-point number and the first numerator to obtain a first result; perform a division operation on the first result and the first denominator to obtain a second result, where the second result includes a first quotient result and a first remainder result, and the first quotient result is used as a multiplication result of the first target element and the first target coefficient; perform a multiplication operation on the second fixed-point number and the second numerator to obtain a third result; perform an addition operation on the third result and the first remainder result to obtain a fourth result; and perform a division operation on the fourth result and the second denominator to obtain a fifth result, where the fifth result includes a second quotient result and a second remainder result, and the second quotient result is used as a multiplication result of the second target element and the second target coefficient.

In a possible implementation, the second target element is a last element in the N elements on which a multiplication operation is performed with a corresponding coefficient in a process of performing a multiplication operation on the first data and the preset coefficient, and the target volume preserving flow layer is further used to output the second remainder result.

In a possible implementation, the target volume preserving flow layer is further used to output the second remainder result to a next volume preserving flow layer adjacent to the target volume preserving flow layer.

In a possible implementation, the volume preserving flow model further includes a first volume preserving flow layer, the first volume preserving flow layer is an adjacent volume preserving flow layer before the target volume preserving flow layer, and the volume preserving flow module is configured to obtain a remainder result output by the first volume preserving flow layer; perform a multiplication operation on the first fixed-point number and the first numerator, and performing an addition operation on a multiplication operation result and the remainder result output by the first volume preserving flow layer to obtain the first result.

In a possible implementation, the volume preserving flow model includes M volume preserving flow layers that are connected in series, the M volume preserving flow layers that are connected in series include the target volume preserving flow layer, an output at an $(i-1)^{th}$ volume preserving flow layer is used as an input at an $i^{th}$ volume preserving flow layer, i is a positive integer not greater than M, an input at a $1^{st}$ volume preserving flow layer is the to-be-encoded data, and an output at an $M^{th}$ volume preserving flow layer is the hidden variable output.

In a possible implementation, the volume preserving flow model further includes a target convolutional layer connected to the target volume preserving flow layer, the output at the target volume preserving flow layer is used as an input at the target convolutional layer, and the target convolutional layer is used to perform a multiplication operation on the output at the target volume preserving flow layer and a weight matrix.

In a possible implementation, the volume preserving flow module is configured to obtain the weight matrix; perform LU decomposition on the weight matrix to obtain a first matrix, a second matrix, a third matrix, and a fourth matrix, where the first matrix is a permutation matrix, the second matrix is a lower triangular matrix, the third matrix is a unit matrix whose product of diagonal elements is 1, and the fourth matrix is an upper triangular matrix; perform a multiplication operation on the output at the target volume preserving flow layer and the fourth matrix to obtain a sixth result; perform a multiplication operation on the sixth result and the third matrix to obtain a seventh result; perform a multiplication operation on the seventh result and the second matrix to obtain an eighth result; and perform a multiplication operation on the eighth result and the first matrix to obtain a ninth result, where the ninth result is used as a result obtained by performing a multiplication operation on the output at the target volume preserving flow layer and the weight matrix.

In a possible implementation, the volume preserving flow model includes M volume preserving flow layers and M convolutional layers that are connected in series, the M volume preserving flow layers include the target volume preserving flow layer, the M convolutional layers include the target convolutional layer, an output at an $i^{th}$ volume preserving flow layer is used as an input at an $i^{th}$ convolutional layer, an output at the $i^{th}$ convolutional layer is used as an input at an $(i+1)^{th}$ volume preserving flow layer, i is a positive integer not greater than M, an input at a $1^{st}$ volume preserving flow layer is the to-be-encoded data, and an output at an $M^{th}$ convolutional layer is the hidden variable output.

According to a fourth aspect, this application provides a data decoding apparatus. The apparatus includes an obtaining module configured to obtain encoded data; a decoding module configured to decode the encoded data to obtain a hidden variable output; and a volume preserving flow module configured to process the hidden variable output by using a volume preserving flow model to obtain a decoding output, where the volume preserving flow model includes a target volume preserving flow layer, an operation corresponding to the target volume preserving flow layer is an invertible operation that meets a volume preserving flow constraint, the target volume preserving flow layer is used to perform a multiplication operation on a preset coefficient and first data input to the target volume preserving flow layer, and the preset coefficient is not 1.

In this application, lossless compression is implemented by using the volume preserving flow model. In comparison with an integer discrete flow model, on a premise that the target volume preserving flow layer of the volume preserving flow model can be inverse, the operation corresponding to the target volume preserving flow layer includes an operation (multiplication operation) other than integer addition and subtraction operations, so that the volume preserving flow model has a stronger representation capability. This can more accurately determine data distribution, and implement a better compression rate.

On the other hand, for a general flow model, it can be proved that there is no method for implementing numerical invertibility in discrete space. Because hidden variable data may correspond to a plurality of pieces of input data due to a numerical error, a plurality of encoding operations need to be performed to eliminate the numerical error, which causes low algorithm efficiency. However, in the volume preserving flow model in this embodiment of this application, a numerical invertible operation can be implemented by using a numerical invertible target volume preserving flow layer. On a premise that the model has a strong representation capability, a small quantity of encoding times is implemented in a compression process. This implements a higher compression throughput rate and a lower compression rate.

In a possible implementation, the volume preserving flow constraint includes that input space and output space of an operation corresponding to a volume preserving operation layer have a same volume size.

In a possible implementation, the first data and the preset coefficient are vectors, the first data includes N elements, the preset coefficient includes N coefficients, the N elements included in the first data one-to-one correspond to the N coefficients, a product of the N coefficients is 1, and the performing a division operation on the first data and the preset coefficient includes performing a division operation on each element in the first data and a corresponding coefficient to obtain a division result.

In a possible implementation, the volume preserving flow module is further configured to process, by using a first neural network, second data input to the target volume preserving flow layer to obtain a first network output, and perform a preset operation on the first network output to obtain the preset coefficient.

In a possible implementation, the first network output is a vector, and the first network output includes the N elements. The obtaining module is configured to obtain an average of the N elements included in the first network output, and subtract the average from each element included in the first network output to obtain processed N elements; and perform an exponentiation operation on each of the processed N elements by using a natural constant e as a base to obtain the preset coefficient, where the preset coefficient includes the N coefficients.

In a possible implementation, an output at the target volume preserving flow layer includes the second data.

In a possible implementation, the target volume preserving flow layer is further used to perform a subtraction operation on the first data and a constant term to obtain a subtraction result, where the constant term is not 0.

The obtaining module is configured to perform a division operation on the subtraction result and the preset coefficient.

In a possible implementation, the volume preserving flow module is configured to process, by using a second neural network, the second data input to the target volume preserving flow layer to obtain the constant term.

In a possible implementation, the first data and the preset coefficient are vectors, the first data includes the N elements, the preset coefficient includes the N coefficients, the N elements included in the first data one-to-one correspond to the N coefficients, the N elements include a first target element and a second target element, the first target element corresponds to a first target coefficient, the second target element corresponds to a second target coefficient, and the volume preserving flow module is configured to obtain a first fixed-point number corresponding to the first target element and a second fixed-point number corresponding to the second target element; obtain a first fraction corresponding to the first target coefficient and a second fraction corresponding to the second target coefficient, where the first fraction includes a first numerator and a first denominator, the second fraction includes a second numerator and a second denominator, the first numerator, the first denominator, the second numerator, and the second denominator are integers, and the first numerator is the same as the second denominator; perform a multiplication operation on the first fixed-point number and the first denominator to obtain a first result; perform a division operation on the first result and the first numerator to obtain a second result, where the second result includes a first quotient result and a first remainder result, and the first quotient result is used as a division result of the first target element and the first target coefficient; perform a multiplication operation on the second fixed-point number and the second denominator to obtain a third result; perform an addition operation on the third result and the first remainder result to obtain a fourth result; and perform a division operation on the fourth result and the second numerator to obtain a fifth result, where the fifth result includes a second quotient result and a second remainder result, and the second quotient result is used as a division result of the second target element and the second target coefficient.

In a possible implementation, the second target element is a last element in the N elements on which a division operation is performed with a corresponding coefficient in a process of performing a division operation on the first data and the preset coefficient, and the target volume preserving flow layer is further used to output the second remainder result.

In a possible implementation, the volume preserving flow model further includes a first volume preserving flow layer, the first volume preserving flow layer is an adjacent volume preserving flow layer before the target volume preserving flow layer, and the obtaining module is configured to obtain a remainder result output by the first volume preserving flow layer; and perform a multiplication operation on the first fixed-point number and the first denominator, and perform an addition operation on a multiplication operation result and the remainder result output by the first volume preserving flow layer to obtain the first result.

In a possible implementation, the volume preserving flow model includes M volume preserving flow layers that are connected in series, the M volume preserving flow layers that are connected in series include the target volume preserving flow layer, an output at an $(i-1)^{th}$ volume preserving flow layer is used as an input at an $i^{th}$ volume preserving flow layer, i is a positive integer not greater than M, an input at a $1^{st}$ volume preserving flow layer is the hidden variable output, and an output at an $M^{th}$ volume preserving flow layer is the decoding output.

In a possible implementation, the volume preserving flow model further includes a target convolutional layer connected to the target volume preserving flow layer, an output at the target convolutional layer is the first data, and the target convolutional layer is used to perform a division operation on input data and a weight matrix.

In a possible implementation, the volume preserving flow module is configured to obtain the weight matrix; perform LU decomposition on the weight matrix to obtain a first matrix, a second matrix, a third matrix, and a fourth matrix, where the first matrix is a permutation matrix, the second matrix is a lower triangular matrix, the third matrix is a unit matrix whose product of diagonal elements is 1, and the fourth matrix is an upper triangular matrix; perform a multiplication operation on the input data and an inverse matrix of the first matrix to obtain a sixth result; perform a multiplication operation on the sixth result and an inverse matrix of the second matrix to obtain a seventh result; perform a multiplication operation on the seventh result and an inverse matrix of the third matrix to obtain an eighth result; and perform a multiplication operation on the eighth result and an inverse matrix of the fourth matrix to obtain a ninth result, where the ninth result is used as a result obtained by performing a division operation on the input data and the weight matrix.

In a possible implementation, the volume preserving flow model includes M volume preserving flow layers and M convolutional layers that are connected in series, the M volume preserving flow layers include the target volume preserving flow layer, the M convolutional layers include the target convolutional layer, an output at an $i^{th}$ convolutional layer is used as an input at an $i^{th}$ volume preserving flow layer, an output at the $i^{th}$ volume preserving flow layer is used as an input of an $(i+1)^{th}$ convolutional layer, i is a positive integer not greater than M, an input at a $1^{st}$ convolutional layer is the hidden variable output, and an output at an $M^{th}$ volume preserving flow layer is the decoding output.

According to a fifth aspect, this application provides a data encoding apparatus, including a storage medium, a processing circuit, and a bus system. The storage medium is configured to store instructions, and the processing circuit is configured to execute the instructions stored in a memory to perform the data encoding method in any one of the first aspect and the possible implementations of the first aspect.

According to a sixth aspect, this application provides a data decoding apparatus, including a storage medium, a processing circuit, and a bus system. The storage medium is configured to store instructions, and the processing circuit is configured to execute the instructions stored in a memory, to perform the data decoding method in any one of the second aspect and the possible implementations of the second aspect.

According to a seventh aspect, an embodiment of this application provides a computer-readable storage medium. The computer-readable storage medium stores a computer program, and when the computer program is run on a computer, the computer is enabled to perform the method in the first aspect or the second aspect.

According to an eighth aspect, an embodiment of this application provides a computer program. When the computer program is run on a computer, the computer is enabled to perform the method in the first aspect or the second aspect.

According to a ninth aspect, this application provides a chip system. The chip system includes a processor, configured to support an execution device or a training device to implement functions in the foregoing aspects, for example, sending or processing data and/or information in the foregoing method. In a possible design, the chip system further includes a memory. The memory is configured to store program instructions and data that are necessary for the execution device or a training device. The chip system may include a chip, or may include a chip and another discrete component.

An embodiment of this application provides a data encoding method. The method includes obtaining to-be-encoded data; processing the to-be-encoded data by using a volume preserving flow model to obtain a hidden variable output, where the volume preserving flow model includes a target volume preserving flow layer, an operation corresponding to the target volume preserving flow layer is an invertible operation that meets a volume preserving flow constraint, the target volume preserving flow layer is used to perform a multiplication operation on a preset coefficient and first data input to the target volume preserving flow layer, and the preset coefficient is not 1; and encoding the hidden variable output to obtain encoded data.

On the one hand, in this application, lossless compression is implemented by using the volume preserving flow model. In comparison with an integer discrete flow model, on a premise that the target volume preserving flow layer of the volume preserving flow model can be inverse, the operation corresponding to the target volume preserving flow layer includes an operation (multiplication operation) other than integer addition and subtraction operations such that the volume preserving flow model has a stronger representation capability. This can more accurately determine data distribution, and implement a better compression rate.

On the other hand, when a multiplication operation is performed, division with a remainder is used to resolve a numerical inverse calculation problem at the target volume preserving flow layer. A linear coefficient (namely, the preset coefficient in the foregoing embodiments) is changed into a fractional form, and a numerator of each dimension is a denominator of a previous dimension. Data of each dimension is multiplied by a numerator of a current linear coefficient, a remainder of the previous dimension is added, then a denominator is used to perform division with a remainder, and a constant term is added to obtain a calculation result of a current dimension. In addition, the remainder result of division with a remainder is transferred to a next dimension, to eliminate a numerical error such as to implement numerical inverse calculation at the target volume preserving flow layer.

On the other hand, when a multiplication operation is performed on the convolutional layer and the weight matrix, the target convolutional layer is converted into continuous matrix multiplication operations of the upper triangular matrix, the diagonal matrix, the lower triangular matrix, and the permutation matrix. Four calculation manners, namely, iterative calculation, numerical calculation at the target volume preserving flow layer, iterative calculation, and element rearrangement, are respectively used for the four matrix multiplication operations. In addition, an inverse calculation method of each calculation manner is provided to implement numerical inverse calculation of the target convolutional layer.

On the other hand, for a general flow model, it can be proved that there is no method for implementing numerical invertibility in discrete space. Because hidden variable data may correspond to a plurality of pieces of input data due to a numerical error, a plurality of encoding operations need to be performed to eliminate the numerical error, which causes low algorithm efficiency. However, in the volume preserving flow model in this embodiment of this application, a numerical invertible operation can be implemented by using a numerical invertible target volume preserving flow layer. On a premise that the model has a strong representation capability, a small quantity of encoding times is implemented in a compression process. This implements a higher compression throughput rate and a lower compression rate.

BRIEF DESCRIPTION OF DRAWINGS

FIG. 7 is a schematic diagram of an embodiment of a data decoding method according to an embodiment of this application;

FIG. 8 is a schematic diagram of an embodiment of a data decoding method according to an embodiment of this application;

DESCRIPTION OF EMBODIMENTS

The following describes embodiments with reference to the accompanying drawings in embodiments. Terms used in implementations of the present disclosure are merely intended to explain specific embodiments, but are not intended to limit the present disclosure.

The following describes embodiments of this application with reference to the accompanying drawings. A person of ordinary skill in the art may learn that, with development of technologies and emergence of a new scenario, the technical solutions provided in embodiments of this application are also applicable to a similar technical problem.

In the specification, claims, and accompanying drawings of this application, the terms "first", "second", and so on are intended to distinguish between similar objects but do not necessarily indicate a specific order or sequence. It should be understood that the terms used in such a way are interchangeable in proper circumstances, which is merely a discrimination manner that is used when objects having a same attribute are described in embodiments of this application. In addition, the terms "include", "contain" and any other variants mean to cover the non-exclusive inclusion, so that a process, method, system, product, or device that includes a series of units is not necessarily limited to those units, but may include other units not expressly listed or inherent to such a process, method, system, product, or device.

Figure 1:
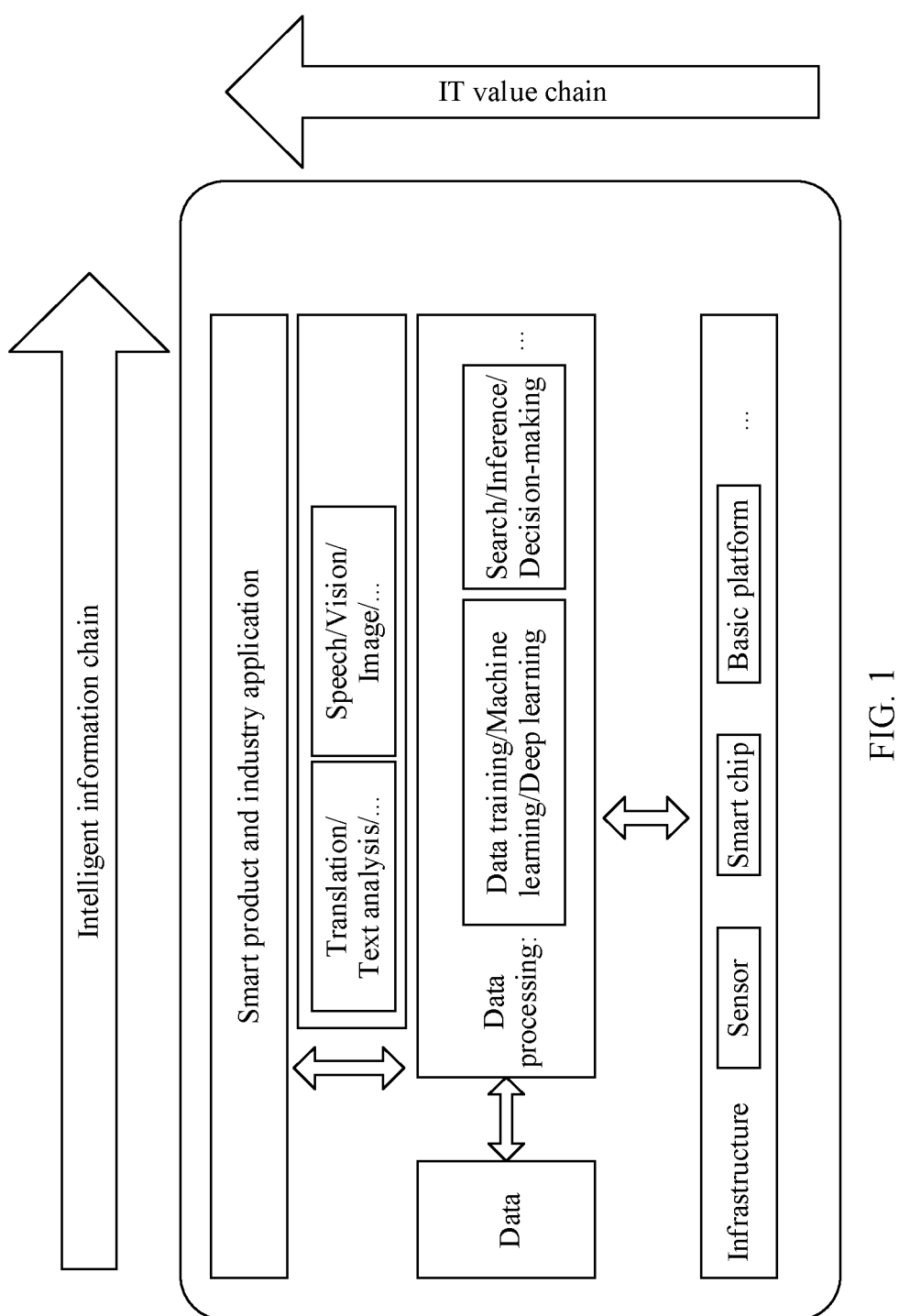
FIG. 1 is a schematic diagram of a structure of a main artificial intelligence framework.

An overall working procedure of an artificial intelligence system is first described with reference to FIG. 1. FIG. 1 is a schematic diagram of a structure of an artificial intelligence main framework. The following describes the artificial intelligence main framework from two dimensions: an "intelligent information chain" (a horizontal axis) and an "information technology (IT) value chain" (a vertical axis). The "intelligent information chain" indicates a process from data obtaining to data processing. For example, the process may be a general process of intelligent information perception, intelligent information representation and formation, intelligent inference, intelligent decision-making, and intelligent execution and output. In this process, data undergoes a refining process of "data-information-knowledge-intelligence". The "IT value chain" is an industrial ecological process from underlying infrastructure of artificial intelligence to information (providing and processing technical implementations) to a system, and indicates value brought by artificial intelligence to the information technology industry.

(1) Infrastructure

The infrastructure provides computing capability support for the artificial intelligence system, implements communication with the external world, and implements support by using a basic platform. The infrastructure communicates with the outside by using sensors. A computing capability is provided by smart chips (hardware acceleration chips such as a central processing unit (CPU), a neural processing unit (NPU), a graphics processing unit (GPU), an application-specific integrated circuit (ASIC), and a field-programmable gate array (FPGA)). The basic platforms include related platforms, for example, a distributed computing framework and network, for assurance and support. The basic platforms may include a cloud storage and computing network, an interconnection network, and the like. For example, the sensor communicates with the outside to obtain data, and the data is provided for a smart chip in a distributed computing system provided by the infrastructure platform to perform computation.

(2) Data

Data at an upper layer of the infrastructure indicates a data source in the artificial intelligence field. The data relates to graphics, images, speech, and text, and further relates to internet of things data of conventional devices, and includes service data of a conventional system and perception data such as force, displacement, a liquid level, temperature, and humidity.

(3) Data Processing

Data processing usually includes data training, machine learning, deep learning, searching, reasoning, decision-making, and other methods.

The machine learning and the deep learning may be used for performing symbolic and formal intelligent information modeling, extraction, preprocessing, training, and the like on data.

Inference is a process in which a human intelligent inferring manner is simulated in a computer or an intelligent system, and machine thinking and problem resolving are performed by using formal information according to an inferring control policy. A typical function is searching and matching.

The decision-making is a process of performing decision-making after performing reasoning on intelligent information, and usually provides classification, sorting, prediction, and other functions.

(4) General Capabilities

After data undergoes the foregoing data processing, some general capabilities may be further formed based on a data processing result. For example, the general capabilities may be an algorithm or a general system, for example, translation, text analysis, computer vision processing, speech recognition, and image recognition.

(5) Smart Product and Industry Application

The smart product and industry application are a product and an application of an artificial intelligence system in various fields, and are package of an overall solution of artificial intelligence, so that decision-making for intelligent information is productized and an application is implemented. Application fields mainly include a smart terminal, smart transportation, smart health care, autonomous driving, a smart city, and the like.

This application may be applied to the field of lossless compression of data such as an image, a video, and a text in the artificial intelligence field. For example, this application may be applied to an image compression process of a terminal device.

Figure 2A:
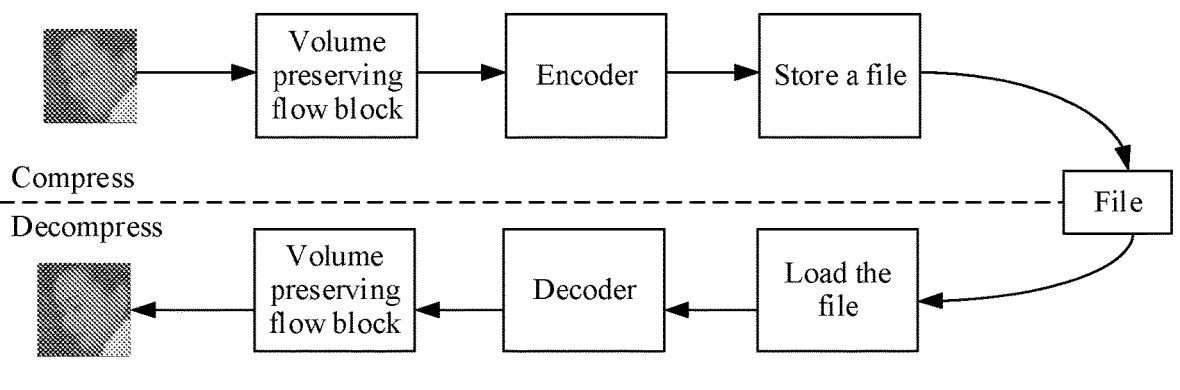
FIG. 2A is a schematic diagram of an application architecture according to an embodiment of this application.

Further, an image compression method provided in embodiments of this application may be applied to the image compression process of the terminal device, and further, may be applied to an album, video surveillance, and the like of the terminal device. Further, FIG. 2A is a schematic diagram of an application scenario according to an embodiment of this application. As shown in FIG. 2A, the terminal device may obtain a to-be-compressed picture (which may also be referred to as with encoded data in this application). The to-be-compressed picture may be a picture photographed by a camera or a frame of picture captured from a video. The terminal device may process the obtained to-be-compressed picture by using a volume preserving flow model, to convert image data into a hidden variable output, and generate probability estimation of each point in the hidden variable output. An encoder may encode the extracted hidden variable output based on the probability estimation of each point in the hidden variable output, to reduce encoding redundancy of the hidden variable output, and further reduce a data transmission amount in the image compression process, and store encoded data in a form of a data file in a corresponding storage location. When a user needs to obtain the file stored in the storage location, a CPU may obtain and load the stored file in the corresponding storage location, decode the file to obtain the hidden variable output, and reconstruct the hidden variable output by using the volume preserving flow model to obtain a reconstructed image (namely, a decoding output).

Because embodiments of this application relate to massive application of a neural network, for ease of understanding, the following describes terms and concepts related to the neural network that may be used in embodiments of this application.

(1) Neural Network

The neural network may include a neuron. The neuron may be an operation unit that uses xs and an intercept of 1 as an input. An output of the operation unit may be as follows:

$$h_{W,b}(x) = f(W^T x) = f\left(\sum_{s=1}^{n} W_s x_s + b\right);$$

s=1, 2, . . . , n, n is a natural number greater than 1, W s is a weight of $X_s$, and b is an offset of the neuron. f indicates an activation function (activation function) of the neuron. The activation function is used for introducing a non-linear characteristic into the neural network, to convert an input signal of the neuron into an output signal. The output signal of the activation function may be used as an input of a next convolutional layer, and the activation function may be a sigmoid function. The neural network is a network constituted by connecting a plurality of single neurons together. To be specific, an output of a neuron may be an input to another neuron. An input of each neuron may be connected to a local receptive field of a previous layer to extract a feature of the local receptive field. The local receptive field may be a region including several neurons.

(2) Deep Neural Network

The deep neural network (DNN) is also referred to as a multi-layer neural network, and may be understood as a neural network having a plurality of hidden layers. The DNN is divided based on locations of different layers, so that the neural network in the DNN can be divided into three types: an input layer, hidden layers, and an output layer. Usually, a first layer is the input layer, a last layer is the output layer, and a middle layer is the hidden layer. Layers are fully connected. To be specific, any neuron at an $i^{th}$ layer is necessarily connected to any neuron at an $(i+1)^{th}$ layer.

Although the DNN seems complex, the DNN is actually not complex in terms of work at each layer, and is simply represented as the following linear relationship expression: $\vec{y} = \alpha(W \cdot \vec{x} + \vec{b})$, where $\vec{x}$ is an input vector, $\vec{y}$ is an output vector, $\vec{b}$ is a bias vector, W is a weight matrix (which is also referred to as a coefficient), and $\alpha(\ )$ is an activation function. At each layer, the output vector $\vec{y}$ is obtained by performing such a simple operation on the input vector $\vec{x}$. Because there is a plurality of layers in the DNN, there are also a plurality of coefficients W and a plurality of bias vectors $\vec{b}$. Definitions of these parameters in the DNN are as follows: The coefficient W is used as an example. It is assumed that in a three-layer DNN, a linear coefficient from the fourth neuron at the second layer to the second neuron at the third layer is defined as $$W_{24}^3.$$

The superscript 3 indicates a layer at which the coefficient W is located, and the subscript corresponds to an output third-layer index 2 and an input second-layer index 4.

In conclusion, a coefficient from a $k^{th}$ neuron at an $(L-1)^{th}$ layer to a $j^{th}$ neuron at an $L^{th}$ layer is defined as $$W_{jk}^L.$$

It should be noted that there is no parameter W at the input layer. In the deep neural network, more hidden layers make the network more capable of describing a complex case in the real world. Theoretically, a model with more parameters has higher complexity and a larger "capacity". It indicates that the model can complete a more complex learning task. Training the deep neural network is a process of learning a weight matrix, and a final objective of the training is to obtain a weight matrix of all layers of a trained deep neural network (a weight matrix formed by vectors W at a plurality of layers).

(2) Convolutional Neural Network

The convolutional neural network (CNN) is a deep neural network with a convolutional structure. The convolutional neural network includes a feature extractor including a convolutional layer and a sub-sampling layer. The feature extractor may be considered as a filter. A convolution process may be considered as performing convolution by using a trainable filter and an input image or a convolution feature plane (feature map). The convolutional layer is a neuron layer (for example, a first convolutional layer and a second convolutional layer in this embodiment) that performs convolution processing on an input signal in the convolutional neural network. At the convolutional layer of the convolutional neural network, one neuron may be connected only to some adjacent-layer neurons. One convolutional layer usually includes several feature planes, and each feature plane may include some neural units that are in a rectangular arrangement. Neural units at a same feature plane share a weight, and the weight shared herein is a convolution kernel. Weight sharing may be understood as that an image information extraction manner is irrelevant to a location. A principle implied herein is that statistical information of a part of an image is the same as that of other parts. This means that image information learned in a part can also be used in another part. Therefore, image information obtained through same learning can be used for all locations in the image. At a same convolutional layer, a plurality of convolution kernels may be used to extract different image information. Usually, a larger quantity of convolution kernels indicates richer image information reflected in a convolution operation.

The convolution kernel may be initialized in a form of a matrix of a random size. In a training process of the convolutional neural network, the convolution kernel may obtain a reasonable weight through learning. In addition, benefits directly brought by weight sharing are that connections among layers of the convolutional neural network are reduced, and an overfitting risk is reduced.

Figure 2B:
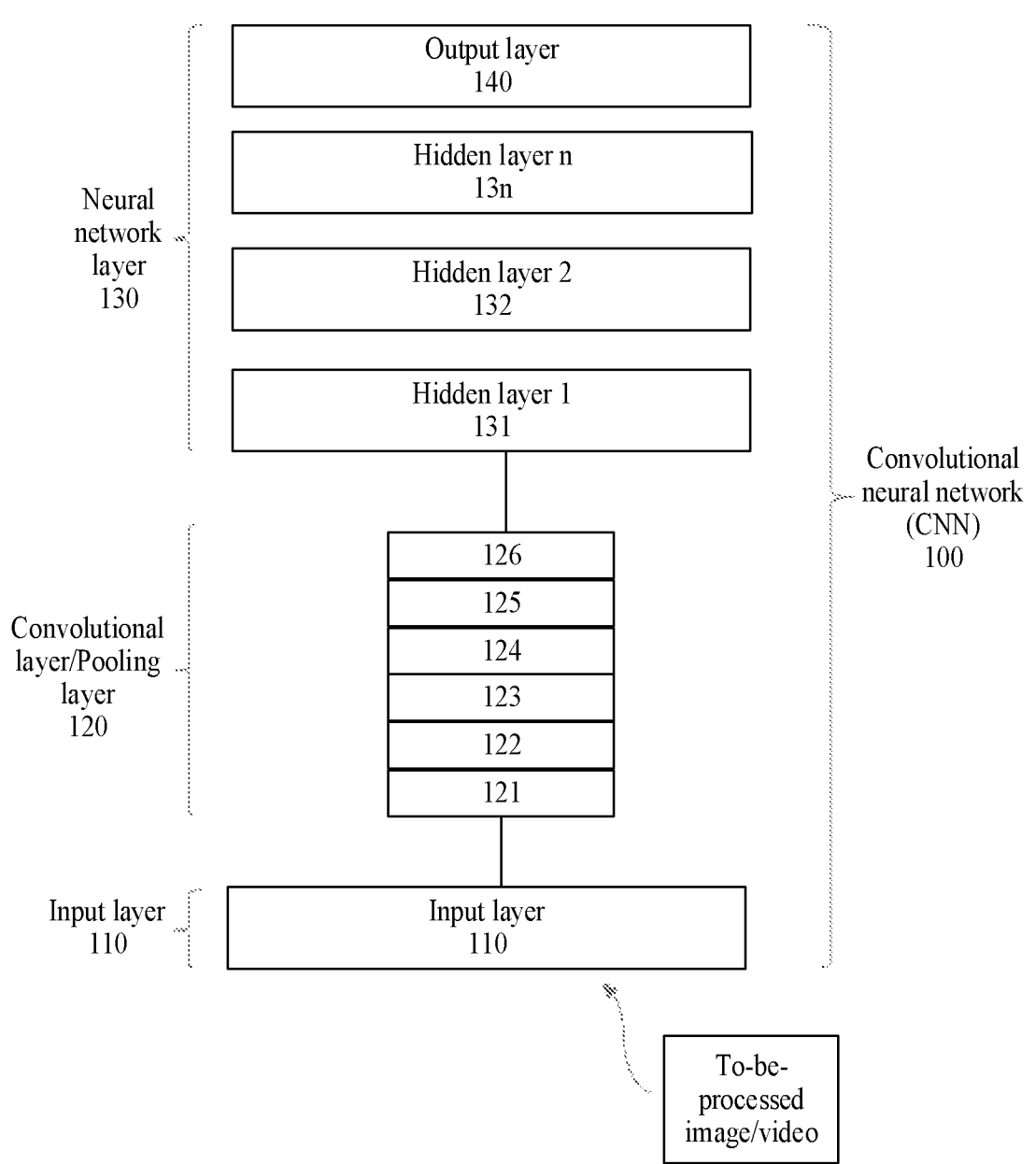
FIG. 2B is a schematic diagram of a convolutional neural network according to an embodiment of this application.

Further, as shown in FIG. 2B, a CNN 100 may include an input layer 110, a convolutional layer/pooling layer 120, and a neural network layer 130. The pooling layer is optional. A structure including the convolutional layer/pooling layer 120 and the neural network layer 130 may be a first convolutional layer and a second convolutional layer described in this application. The input layer 110 is connected to the convolutional layer/pooling layer 120, the convolutional layer/pooling layer 120 is connected to the neural network layer 130, an output of the neural network layer 130 may be input to an activation layer, and the activation layer may perform non-linear processing on the output of the neural network layer 130.

Convolutional Layer/Pooling Layer 120

Convolutional Layer

As shown in FIG. 2B, for example, the convolutional layer/pooling layer 120 may include layers 121 to 126. In an implementation, the layer 121 is a convolutional layer, the layer 122 is a pooling layer, the layer 123 is a convolutional layer, the layer 124 is a pooling layer, the layer 125 is a convolutional layer, and the layer 126 is a pooling layer. In another implementation, the layer 121 and the layer 122 are convolutional layers, the layer 123 is a pooling layer, the layer 124 and the layer 125 are convolutional layers, and the layer 126 is a pooling layer. In other words, an output of a convolutional layer may be used as an input for a subsequent pooling layer, or may be used as an input for another convolutional layer to continue to perform a convolution operation.

The convolutional layer 121 is used as an example. The convolutional layer 121 may include a plurality of convolution operators. A convolution operator is also referred to as a kernel. In image processing, the convolution operator functions as a filter that extracts specific information from an input image matrix. The convolution operator may be essentially a weight matrix, and the weight matrix is usually predefined. In a process of performing a convolution operation on an image, the weight matrix is usually used to process pixels at a granularity level of one pixel (or two pixels, which depends on a value of a stride) in a horizontal direction on the input image, to extract a specific feature from the image. A size of the weight matrix should be related to a size of the picture. It should be noted that a depth dimension of the weight matrix is the same as a depth dimension of the input picture. During a convolution operation, the weight matrix extends to an entire depth of the input picture. Therefore, a convolution output of a single depth dimension is generated by performing convolution with a single weight matrix. However, in most cases, a plurality of weight matrices of a same dimension rather than the single weight matrix is used. Outputs of the weight matrices are stacked to form a depth dimension of a convolutional image. Different weight matrices may be used to extract different features of the image. For example, one weight matrix is used to extract edge information of the image, another weight matrix is used to extract a specific color of the image, still another weight matrix is used to blur an unnecessary noise in the image, and so on. Because the plurality of weight matrices has the same dimension, feature maps extracted by using the plurality of weight matrices with the same dimension also have a same dimension. Then, the plurality of extracted feature maps with the same dimension are combined to form output of the convolution operation.

Weight values in the weight matrices need to be obtained through massive training in an actual application. Each weight matrix formed by using the weight values obtained through training may be used to extract information from the input picture, to enable the convolutional neural network 100 to perform correct prediction.

When the convolutional neural network 100 includes a plurality of convolutional layers, a larger quantity of general features is usually extracted at an initial convolutional layer (for example, the convolutional layer 121). The general features may be also referred to as low-level features. As a depth of the convolutional neural network 100 increases, a feature extracted at a more subsequent convolutional layer (for example, the convolutional layer 126) is more complex, for example, a higher-level semantic feature. A feature with higher semantics is more applicable to a to-be-resolved problem.

Pooling Layer

Because a quantity of training parameters usually needs to be reduced, a pooling layer usually needs to be periodically introduced after a convolutional layer. To be specific, for the layers 121 to 126 in the layer 120 the shown in FIG. 2B, one convolutional layer may be followed by one pooling layer, or a plurality of convolutional layers may be followed by one or more pooling layers.

Neural Network Layer 130

After processing is performed at the convolutional layer/pooling layer 120, the convolutional neural network 100 still cannot output required output information. As described above, at the convolutional layer/pooling layer 120, only a feature is extracted, and parameters resulting from an input image are reduced. However, to generate final output information (required class information or other related information), the convolutional neural network 100 needs to use the neural network layer 130 to generate an output of one required class or outputs of a group of required classes. Therefore, the neural network layer 130 may include a plurality of hidden layers (131, 132, . . . , and 13$n$ shown in FIG. 2A) and an output layer 140. Parameters included in the plurality of hidden layers may be obtained through pre-training based on related training data of a specific task type. For example, the task type may include image recognition, image classification, super-resolution image reconstruction, and the like.

At the neural network layer 130, the plurality of hidden layers is followed by the output layer 140, that is, the last layer of the entire convolutional neural network 100. The output layer 140 has a loss function similar to a categorical cross entropy, and the loss function is further configured to calculate a prediction error. Once forward propagation (for example, propagation from 110 to 140 in FIG. 2B is forward propagation) of the entire convolutional neural network 100 is completed, inverse propagation (for example, propagation from 140 to 110 in FIG. 2B is inverse propagation) is started to update a weight value and a deviation of each layer mentioned above, to reduce a loss of the convolutional neural network 100 and an error between a result output by the convolutional neural network 100 by using the output layer and an ideal result.

Figure 2C:
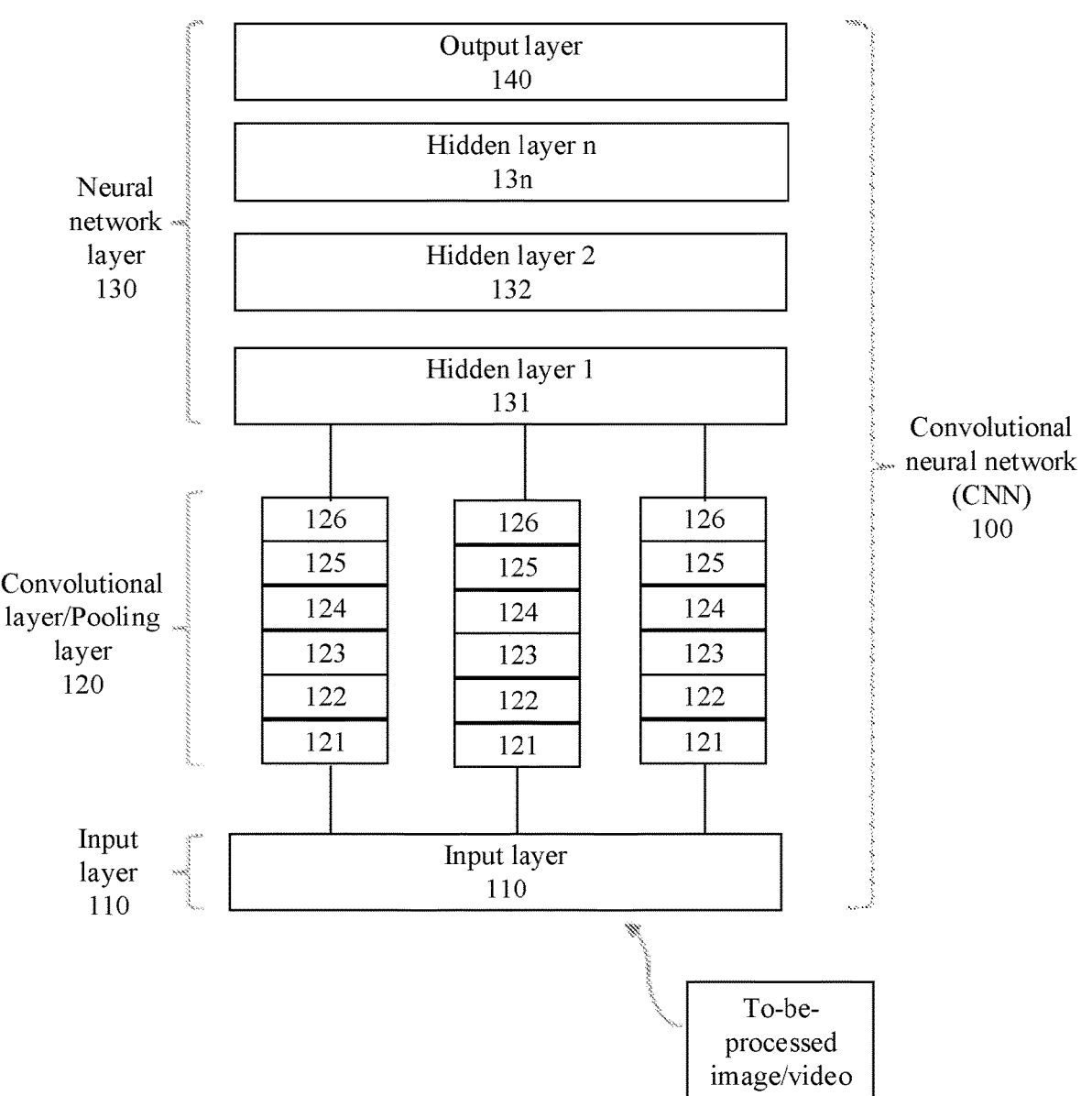
FIG. 2C is a schematic diagram of a convolutional neural network according to an embodiment of this application.

It should be noted that the convolutional neural network 100 shown in FIG. 2B is merely used as an example of a convolutional neural network. During specific application, the convolutional neural network may alternatively exist in a form of another network model, for example, a plurality of parallel convolutional layers/pooling layers shown in FIG. 2C, and extracted features are all input to the entire neural network layer 130 for processing.

(3) Deep Neural Network

The DNN, also referred to as a multi-layer neural network, may be understood as a neural network having many hidden layers. The "many" herein does not have a special measurement standard. The DNN is divided based on locations of different layers, so that the neural network in the DNN can be divided into three types: an input layer, hidden layers, and an output layer. Usually, a first layer is the input layer, a last layer is the output layer, and a middle layer is the hidden layer. Layers are fully connected. To be specific, any neuron at an $i^{th}$ layer is necessarily connected to any neuron at an $(i+1)^{th}$ layer. Although the DNN seems complex, the DNN is actually not complex in terms of work at each layer, and is simply represented as the following linear relationship expression: $\vec{y} = \alpha(W\vec{x} + \vec{b})$, where $\vec{x}$ is an input vector, $\vec{y}$ is an output vector, $\vec{b}$ is a bias vector, W is a weight matrix (which is also referred to as a coefficient), and $\alpha(\ )$ is an activation function. At each layer, the output vector $\vec{y}$ is obtained by performing such a simple operation on the input vector $\vec{x}$. Because there is a plurality of layers in the DNN, there are also a plurality of coefficients W and a plurality of bias vectors $\vec{b}$. Definitions of the parameters in the DNN are as follows. The coefficient W is used as an example. It is assumed that in a three-layer DNN, a linear coefficient from the fourth neuron at the second layer to the second neuron at the third layer is defined as $$w_{24}^3.$$

The superscript 3 indicates a layer at which the coefficient W is located, and the subscript corresponds to an output third-layer index 2 and an input second-layer index 4. In conclusion, a coefficient from a $k^{th}$ neuron at an $(L-1)^{th}$ layer to a $j^{th}$ neuron at an $L^{th}$ layer is defined as $$W_{jk}^L.$$

It should be noted that there is no parameter W at the input layer. In the deep neural network, more hidden layers make the network more capable of describing a complex case in the real world. Theoretically, a model with more parameters has higher complexity and a larger "capacity". It indicates that the model can complete a more complex learning task. Training the deep neural network is a process of learning a weight matrix, and a final objective of the training is to obtain a weight matrix of all layers of the trained deep neural network (a weight matrix formed by vectors W at a plurality of layers).

(4) Loss Function

In a process of training a deep neural network, because it is expected that an output of the deep neural network is as close as possible to a value that is actually expected to be predicted, a current predicted value of the network may be compared with a value that is actually expected, and then a weight vector at each layer of the neural network is updated based on a difference between the current predicted value and the value (there is usually an initialization process before the first update, that is, a parameter is preconfigured for each layer of the deep neural network). For example, if the predicted value of the network is large, the weight vector is adjusted to lower the predicted value until the deep neural network can predict the value that is actually expected or a value close to the value that is actually expected. Therefore, "how to obtain, through comparison, the difference between the predicted value and the target value" needs to be predefined. This is the loss function or an objective function. The loss function and the objective function are important equations used to measure the difference between the predicted value and the target value. The loss function is used as an example. A higher output value (loss) of the loss function indicates a larger difference. Therefore, training of the deep neural network is a process of minimizing the loss as much as possible.

(5) Back Propagation (BP) Algorithm

A neural network may use an error BP algorithm to correct a value of a parameter in an initial neural network model in a training process, so that a reconstruction error loss of the neural network model becomes smaller. Further, an input signal is transferred forward until an error loss occurs at an output, and the parameter in the initial neural network model is updated based on back propagation error loss information, to make the error loss converge. The back propagation algorithm is an error-loss-centered back propagation motion intended to obtain a parameter, such as a weight matrix, of an optimal neural network model.

(6) Lossless Compression

Lossless compression is a technology used to compress data. A length of compressed data is less than a length of raw data. After the compressed data is decompressed, restored data needs to be the same as the raw data.

(7) Compression Length

The compression length is storage space occupied by compressed data.

(8) Compression Rate

The compression rate is a ratio between a length of raw data and a length of compressed data. If data is not compressed, a compression rate is 1. A larger compression rate is better.

(9) Hidden Variable

The hidden variable is a type of data with specific probability distribution. Probability distribution of raw data can be obtained by establishing a conditional probability of the data and the raw data.

(10) Flow Model

The flow model is an inverse deep generation model, and can implement bidirectional transformation between a hidden variable and raw data.

(11) Volume Preserving Flow Model

The volume preserving flow model is a special form of a flow model in which input space and corresponding hidden variable space have a same volume size.

(12) Fixed-Point Number

The fixed-point number is a decimal with specific precision. A fixed-point number x with precision of k meets $2^k*x$, where x is an integer.

(13) Floating-Point Number

The Floating-Point Number is a Decimal Stored in a Computer Floating-Point Number storage format.

(14) Bits-Back Encoding

Bits-back encoding is a special encoding technology that uses additional binary data stored in the system, to generate specific data through decoding.

Embodiments of this application may be performed by a terminal device or a server.

For example, the terminal device may be a mobile phone, a tablet, a notebook computer, an intelligent wearable device, or the like, and the terminal device may perform compression processing on obtained data (for example, image data, video data, or text data). For another example, the terminal device may be a virtual reality (VR) device. For another example, embodiments of this application may also be applied to intelligent surveillance. A camera may be configured in the intelligent surveillance, and the intelligent surveillance may obtain a to-be-compressed picture by using the camera. It should be understood that embodiments of this application may further be applied to another scenario in which data compression needs to be performed, and other application scenarios are not enumerated herein.

Figure 3:
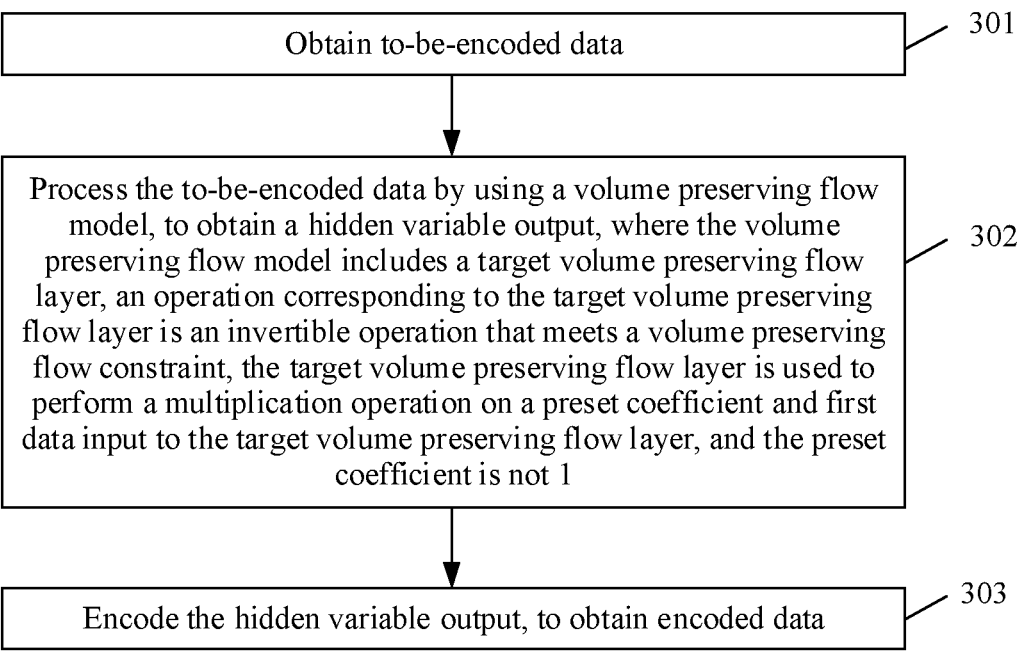
FIG. 3 is a schematic diagram of an embodiment of a data encoding method according to an embodiment of this application.

FIG. 3 is a schematic diagram of an embodiment of a data encoding method according to an embodiment of this application. As shown in FIG. 3, the data encoding method provided in this embodiment of this application includes the following steps.

301: Obtain to-be-encoded data.

In this embodiment of this application, the to-be-encoded data may be data of an image, a video, or a text.

For example, the to-be-encoded data is data of an image. The image may be an image photographed by a terminal device by using a camera, or an image obtained from a terminal device (for example, an image stored in an album of the terminal device, or a picture obtained by the terminal device from a cloud). It should be understood that the image may be an image with an image compression requirement. A source of the to-be-processed image is not limited in this application.

In a possible implementation, the to-be-encoded data may further be preprocessed.

Further, the to-be-encoded data may be processed into a fixed-point number and normalized, and $u \sim U(0, 2^{-h})\delta$ is calculated by using a bits-back encoding technology. $\delta = 2^{-k}$, k is precision of the fixed-point number, and U is uniform distribution. After u is obtained, processed to-be-encoded data may be obtained based on u. $\bar{x} = x + u$, x is the to-be-encoded data, and $\bar{x}$ is the processed to-be-encoded data.

If the to-be-encoded data is video data, and a size of a video does not match a size of an input of a model, the video needs to be divided into several video blocks, and a size of an input block is the same as the size of the input of the model (volume preserving flow block). If a length of the video is greater than a length required by the model, the video is divided into a plurality of video input segments. If the size of the input or the length of the video is insufficient, a color block with a specific color may be used to fill the size of the input or a specific length.

If the to-be-encoded data is text data, a word vector representation needs to be constructed for a character or a word in the text, that is, in a compression process, a text needs to be first converted into a vector. For example, it is assumed that input data is w (a word or a character), and a corresponding word vector is represented as a d-dimensional vector $x = \mu(w)$. Probability distribution $p(x|w) = N(\mu(w), \sigma^2(w))\delta$ ($\delta = 2^{-dk}$), and $$p(w \mid x) = \frac{p(w)p(x \mid w)}{\sum_{w'} p(w')p(x \mid w')}(p(w))$$

is a priori of w, and is usually a word frequency of w) is constructed. In a data preprocessing process, the input w is specified, x is decoded based on $p(x|w)$, and w is encoded based on $p(w|x)$ to obtain the to-be-encoded data.

302: Process the to-be-encoded data by using a volume preserving flow model obtain to obtain a hidden variable output, where the volume preserving flow model includes a target volume preserving flow layer, an operation corresponding to the target volume preserving flow layer is an invertible operation that meets a volume preserving flow constraint, the target volume preserving flow layer is used to perform a multiplication operation on a preset coefficient and first data input to the target volume preserving flow layer, and the preset coefficient is not 1.

In this embodiment of this application, the volume preserving flow (VPF) model may be obtained.

The volume preserving flow model is configured to process the to-be-encoded data to obtain the hidden variable output. The hidden variable output is data with specific probability distribution, and the probability distribution of the to-be-encoded data can be obtained by establishing a conditional probability of the hidden variable output and the to-be-encoded data.

Figure 4:
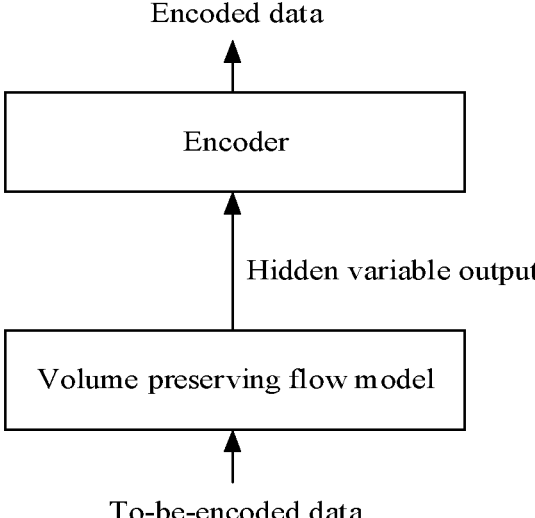
FIG. 4 is a schematic diagram of an application architecture according to an embodiment of this application.

Further, FIG. 4 is a schematic flowchart of data encoding according to an embodiment of this application. The volume preserving flow model may process the to-be-encoded data to obtain the hidden variable output, and an encoder may process the hidden variable output to obtain encoded data.

The following describes a structure feature of the volume preserving flow model in this embodiment of this application.

In an implementation, the volume preserving flow model may be obtained by stacking a plurality of volume preserving flow layers. Further, the volume preserving flow model may include M volume preserving flow layers that are connected in series, an output at an $(i-1)^{th}$ volume preserving flow layer is used as an input at an $i^{th}$ volume preserving flow layer, i is a positive integer not greater than M, an input at a $1^{st}$ volume preserving flow layer is the to-be-encoded data, and an output at an $M^{th}$ volume preserving flow layer is the hidden variable output.

Figure 5:
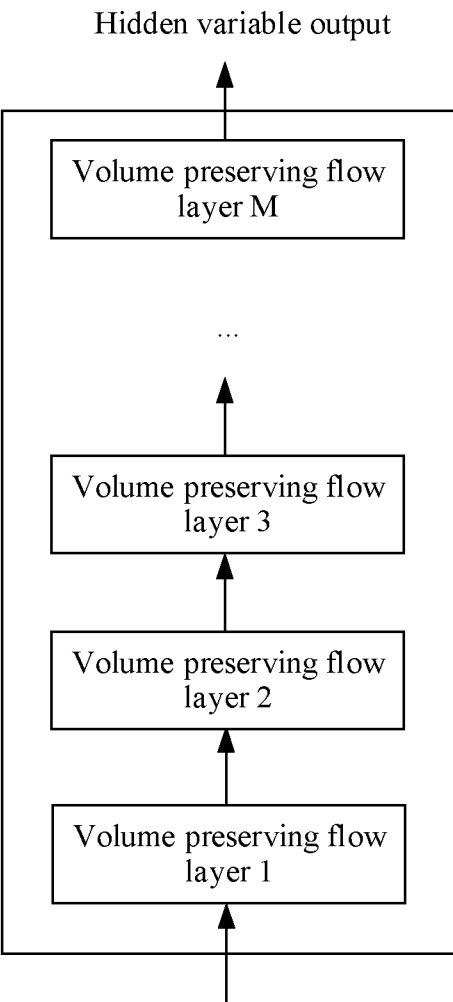
FIG. 5 is a schematic diagram of a volume preserving flow model according to an embodiment of this application.

Further, FIG. 5 is a schematic flowchart of a volume preserving flow model according to an embodiment of this application. The volume preserving flow model may include M volume preserving flow layers (a volume preserving flow layer 1, a volume preserving flow layer 2, a volume preserving flow layer 3, . . . , and a volume preserving flow layer M shown in FIG. 5). An output at the $1^{st}$ volume preserving flow layer (volume preserving flow layer 1) is used as an input at a $2^{nd}$ volume preserving flow layer (volume preserving flow layer 2), an output at the $2^{nd}$ volume preserving flow layer (volume preserving flow layer 2) is used as an input at a $3^{rd}$ volume preserving flow layer (volume preserving flow layer 3), and the rest can be deduced by analogy. The output at the $M^{th}$ volume preserving flow layer is the hidden variable output.

In an implementation, the volume preserving flow model may be obtained by stacking a plurality of volume preserving flow layers and a plurality of convolutional layers. Further, the volume preserving flow model includes M volume preserving flow layers and M convolutional layers that are connected in series, the M volume preserving flow layers include the target volume preserving flow layer, the M convolutional layers include a target convolutional layer, an output at an $i^{th}$ volume preserving flow layer is used as an input at an $i^{th}$ convolutional layer, an output at the $i^{th}$ convolutional layer is used as an input at an $(i+1)^{th}$ volume preserving flow layer, i is a positive integer not greater than M, an input at a $1^{st}$ volume preserving flow layer is the to-be-encoded data, and an output at an $M^{th}$ convolutional layer is the hidden variable output.

Figure 6:
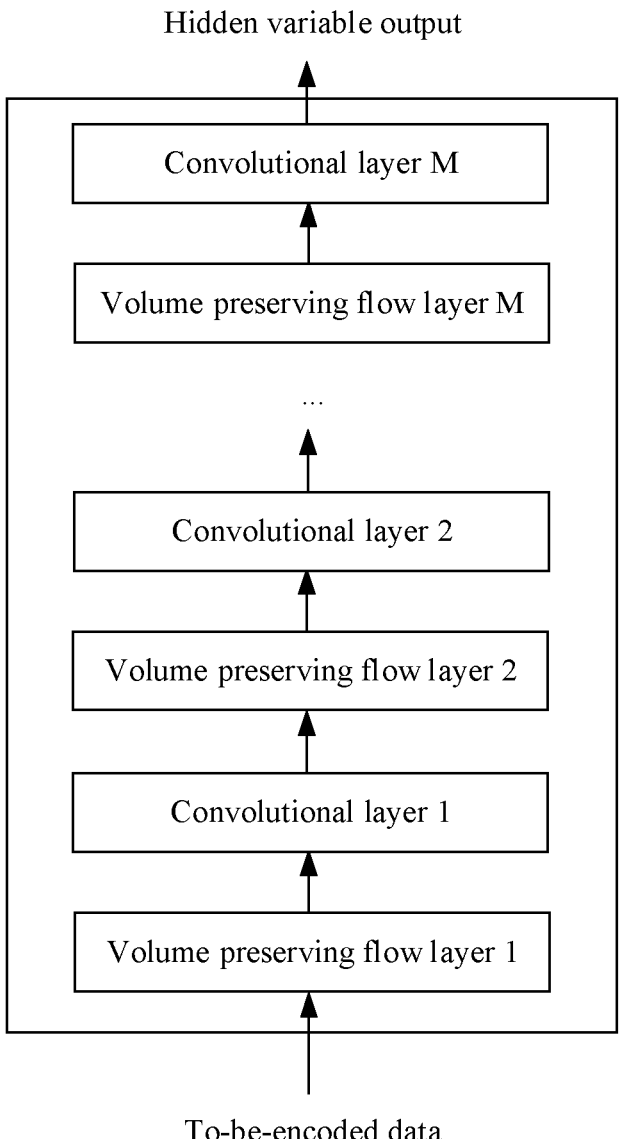
FIG. 6 is a schematic diagram of a volume preserving flow model according to an embodiment of this application.

Further, FIG. 6 is a schematic flowchart of a volume preserving flow model according to an embodiment of this application. The volume preserving flow model may include M volume preserving flow layers (a volume preserving flow layer 1, a volume preserving flow layer 2, a volume preserving flow layer 3, . . . , and a volume preserving flow layer M shown in FIG. 6) and M convolutional layers (a convolutional layer 1, a convolutional layer 2, a convolutional layer 3, . . . , and a convolutional layer M shown in FIG. 6). An output at the $1^{st}$ volume preserving flow layer (volume preserving flow layer 1) is used as an input at a $1^{st}$ convolutional layer (convolutional layer 1), an output at the $1^{st}$ convolutional layer (convolutional layer 1) is used as an input at a $2^{nd}$ volume preserving flow layer (volume preserving flow layer 2), and the rest can be deduced by analogy. The output at the $M^{th}$ volume preserving flow layer is the hidden variable output.

The following describes the volume preserving flow layer in this embodiment of this application.

The target volume preserving flow layer is used as an example. In this embodiment of this application, the volume preserving flow model may include the target volume preserving flow layer, the target volume preserving flow layer is used to obtain the first data, and perform a multiplication operation on the first data and the preset coefficient, where the preset coefficient is not 1.

Further, the first data is an input at the target volume preserving flow layer, and the target volume preserving flow layer may perform a multiplication operation on the first data and the preset coefficient.

In an implementation, because a computer performs storage in a binary manner, input data at the target volume preserving flow layer may be processed into a fixed-point number $$x \leftarrow \frac{\text{round } (2^k x)}{2^k}$$

whose precision is k, where x is the first data.

In this embodiment of this application, the first data and the preset coefficient are vectors, the first data includes N elements, the preset coefficient includes N coefficients, and the N elements included in the first data one-to-one correspond to the N coefficients. Further, when a multiplication operation is performed on the first data and the preset coefficient, a multiplication operation may be performed on each element of the first data and a corresponding coefficient to obtain a product result, where the product result is a vector including N elements.

The following describes how to obtain the preset coefficient through calculation.

In an implementation, a first neural network may be used to process second data input to the target volume preserving flow layer to obtain a first network output, and perform a preset operation on the first network output to obtain the preset coefficient. In an implementation, the preset operation is an exponentiation operation by using a natural constant e as a base.

In this embodiment of this application, the operation corresponding to the target volume preserving flow layer is the invertible operation that meets the volume preserving flow constraint.

The volume preserving flow constraint may be that input space and output space of an operation corresponding to a volume preserving operation layer have a same volume size.

In this embodiment of this application, to ensure that the operation corresponding to the target volume preserving flow layer meets the volume preserving flow constraint, a product of linear coefficients in the operation corresponding to the target volume preserving flow layer needs to be 1. Further, the first data and the preset coefficient are vectors, the first data includes N elements, the preset coefficient includes N coefficients, the N elements included in the first data one-to-one correspond to the N coefficients, the N coefficients included in the preset coefficient is the linear coefficients in the operation corresponding to the target volume preserving flow layer, and a product of the N coefficients is 1.

To ensure that the product of the N coefficients in the preset coefficient is 1, an average may be subtracted from each element included in the first network output. Further, the first network output is a vector, and the first network output includes the N elements. The average of the N elements included in the first network output may be obtained, and the average is subtracted from each element included in the first network output to obtain the processed N elements. An exponentiation operation is performed on each of the processed N elements by using the natural constant e as a base to obtain the preset coefficient, where the preset coefficient includes the N coefficients.

In this embodiment of this application, the operation corresponding to the target volume preserving flow layer is the invertible operation that meets the volume preserving flow constraint.

The invertible operation means that the operation may obtain output data based on input data, and may also inversely derive the input data based on the output data. For example, it is assumed that the input data is x, and the output data is z=f(x). x may also be restored from the output data z by using an inverse operation.

The following describes how to further ensure that the operation corresponding to the target volume preserving flow layer is the invertible operation when the target volume preserving flow layer includes a multiplication operation.

In this embodiment of this application, the first data and the preset coefficient are vectors, the first data includes the N elements, the preset coefficient includes the N coefficients, and the N elements included in the first data one-to-one correspond to the N coefficients. The N elements include a first target element and a second target element, the first target element corresponds to a first target coefficient, and the second target element corresponds to a second target coefficient. A first fixed-point number corresponding to the first target element and a second fixed-point number corresponding to the second target element may be obtained, and a first fraction corresponding to the first target coefficient and a second fraction corresponding to the second target coefficient are obtained. The first fraction includes a first numerator and a first denominator, the second fraction includes a second numerator and a second denominator, the first numerator, the first denominator, the second numerator, and the second denominator are integers, and the first denominator is the same as the second numerator. A multiplication operation is performed on the first fixed-point number and the first numerator to obtain a first result. A division operation is performed on the first result and the first denominator to obtain a second result. The second result includes a first quotient result and a first remainder result, and the first quotient result is used as a multiplication result of the first target element and the first target coefficient. A multiplication operation is performed on the second fixed-point number and the second numerator to obtain a third result. An addition operation is performed on the third result and the first remainder result to obtain a fourth result. A division operation is performed on the fourth result and the second denominator to obtain a fifth result. The fifth result includes a second quotient result and a second remainder result, and the second quotient result is used as a multiplication result of the second target element and the second target coefficient.

In this embodiment, an inverse calculation problem is resolved through division with a remainder. Further, a linear coefficient is changed into a fractional form, and a numerator of each dimension is a denominator of a previous dimension. Data of each dimension is multiplied by a numerator of a current linear coefficient, a remainder of the previous dimension is added, and then a denominator is used to perform division with a remainder to obtain a result of a current dimension. In addition, the remainder of division with a remainder is transferred to a next dimension, to eliminate a numerical error.

For example, a fixed-point number of the first data x may be [44/16, 55/16, 66/16], 16 indicates that precision of the fixed-point number is not in the multiplication operation, and the fixed-point number of the first data is x=[44, 55, 66]. The preset coefficient s is [0.65, 0.61, 2.52], and a fraction corresponding to the preset coefficient s is represented as [⅔, ⅗, 5/2]. The first fixed-point number is 44, the second fixed-point number is 55, the first target coefficient is 0.65, the second target coefficient is 0.61, the first fraction is ⅔, the second fraction is ⅗, the first numerator is 2, the first denominator is 3, the second numerator is 3, and the second denominator is 5. A multiplication operation is performed on the first fixed-point number (44) and the first numerator (2) to obtain the first result (88), and a division operation is performed on the first result (88) and the first denominator (3) to obtain the second result. The second result includes the first quotient result (29) and the first remainder result (1), and the first quotient result (29) is used as the multiplication result of the first target element and the first target coefficient. A multiplication operation is performed on the second fixed-point number (55) and the second numerator (3) to obtain the third result (165), an addition operation is performed on the third result (165) and the first remainder result (1) to obtain the fourth result (166), and a division operation is performed on the fourth result (166) and the second denominator (5) to obtain the fifth result. The fifth result includes the second quotient result (33) and the second remainder result (1), and the second quotient result (33) is used as the multiplication result of the second target element and the second target coefficient.

The second target element is a last element in the N elements on which a multiplication operation is performed with a corresponding coefficient in a process of performing a multiplication operation on the first data and the preset coefficient, and the target volume preserving flow layer is further used to output the second remainder result. Further, the target volume preserving flow layer may output the second remainder result to a next volume preserving flow layer adjacent to the target volume preserving flow layer. In other words, a remainder result is obtained for each element in the first data in the foregoing manner, and is input to a calculation process of a next element until a product operation of a last element in the first data is completed. In this case, an obtained remainder result may be input to an adjacent next volume preserving flow layer.

In an implementation, if the target volume preserving flow layer is a 1$^{st}$ volume preserving flow layer (namely, a volume preserving flow layer for processing the to-be-encoded data) in the volume preserving flow model, the first result is the multiplication result of the multiplication operation performed on the first fixed-point number and the first numerator. If the target volume preserving flow layer is not a 1$^{st}$ volume preserving flow layer (namely, a volume preserving flow layer not for processing the to-be-encoded data, but for processing an output result at another intermediate layer) in the volume preserving flow model, the first fixed-point number is a summation result of the multiplication result of the multiplication operation performed on the first fixed-point number and the first numerator and a remainder result output by an adjacent previous volume preserving flow layer.

In an implementation, the target volume preserving flow layer is further used to perform an addition operation on a constant term and the product result of the first data and the preset coefficient, where the constant term is not 0.

Further, a second neural network may be used to process the second data input to the target volume preserving flow layer to obtain the constant term.

The first neural network and the second neural network may be complex convolutional neural networks, for example, networks such as ResNet and DenseNet. For specific descriptions of the convolutional neural network, refer to descriptions of the embodiments corresponding to FIG. 2b and FIG. 2c. Details are not described herein again.

In this embodiment of this application, the output at the target volume preserving flow layer may include the second data. In other words, the second data is used as a basis for calculating the constant term and the preset coefficient, and is further used as a part of the output at the target volume preserving flow layer.

The following describes, according to a formula, the operation corresponding to the target volume preserving flow layer in this embodiment of this application.

The first data x is decomposed into two parts x=[$x_a$, $x_b$] by dimension, where x a is the second data, $x_b$ is the first data, and $x_b$ is a $d_b$-dimensional vector. In this case, the operation z=f(x) corresponding to the target volume preserving flow layer may be represented as:

$$z_a = x_a, z_b = \exp(s(x_a)) \odot x_b + t(x_a), z = [z_a, z_b]$$

s(·) and t(·) are neural networks (for example, convolutional neural networks) that can be trained, s(·) is the first neural network, t(·) is the second neural network, $\odot$ is a multiplication operation between vectors, and exp( ) is an exponentiation operation by using a natural constant e as a base. Due to a limitation of volume preserving, a product of elements in $\exp(s(x_a))$ needs to be 1. In other words, a summation result of the elements in $(s(x_a))$ is 0, that is, $\mathrm{sum}(s(x_a))=0$, where sum is a sum of vector elements. During implementation, $s(x_a)$ is written as $s(x_a)$ $s(x_a)-\mathrm{mean}(s(x_a))$, where mean is an average value of the vector elements.

It is assumed that $s=\exp(s(x_a))$, and $t=t(x_a)$. The operation corresponding to the target volume preserving flow layer may be represented as linear transformation $z_b=s\odot x_b+t$, where s and t are a linear coefficient and a constant term respectively, and a product of an element s is 1. In this embodiment, division with a remainder is used to ensure complete numerical invertibility. First, additional data (remainder result) $r \in [0,2^C)$ needs to be initialized. It is assumed that $s_i$, $t_i$, and $x_i$ are respectively i$^{th}$ elements of s, t, and $x_b$, where i=1, . . . , $d_b$. $z_i \leftarrow s_i \cdot x_i + t_i$ needs to be calculated, and $z_b=[z_1, z_{d_b}]^T$ and the remainder result r are output.

For example, $z_i$ may be calculated in the following manner: The fixed-point number $x_i$ is first obtained. For i=1, 2, . . . , $d_b$, $m_0=m_{d_b}=2^C$, and $$m_i = \mathrm{round}\left(\frac{m_0}{\prod_{j=1}^{i} s_j}\right).$$

In this case, $$s_i \approx \frac{m_{i-1}}{m_i}.$$

For i=1, 2, ..., $d_b$, v=$x_i \cdot m_{i-1}$+r, $y_i$=floor(v/$m_i$), and r←v mod $m_i$. In this case, $y_i \approx x_i \cdot s_i$, and $$z_i = \frac{\left(y_i + \text{round}(2^k \cdot t_i)\right)}{2^k},$$

where floor is a rounding down symbol, and mod is a modulo operation. Because $$s_i \approx \frac{m_{i-1}}{m_i},$$

and $y_i \approx x_i \cdot s_i$, $$z_i \approx \frac{\left(2^k \cdot x_i \cdot s_i + 2^k \cdot t_i\right)}{2^k} = x_i \cdot s_i + t_i.$$

Therefore, a numerical calculation result of $z_i$ is accurate.

The following describes how to perform an inverse operation based on z to restore x. In a process of performing an inverse operation, z is decomposed into two parts z=[$z_a$, $z_b$], and an inverse operation x=$f^{-1}$(z) at the layer is $x_a$=$z_a$, $x_b$=($z_b$−t($x_a$))∅ exp s($x_a$), x=[$x_a$, $x_b$].

∅ is element-wise division. $x_i$=($z_i$—$t_i$)/$s_i$ needs to be calculated in an inverse process. r∈[0,$2^C$) output in a forward process is specified, and a process of a corresponding numerical calculation method may be as follows $y_i$=$2^k \cdot z_i$−round ($2^k \cdot t_i$) is first calculated. For i=1, 2, ..., $d_b$, $m_0$=$m_{d_b}$=$2^C$, and $$m_i = \text{round}\left(\frac{m_0}{\prod_{j=1}^{i} s_j}\right).$$

In this case, $$s_i \approx \frac{m_{i-1}}{m_i}.$$

For i=$d_b$, ..., 2, 1, v=$y_i \cdot m_i$+r, where $y_i$←floor(v/$m_{i-1}$), and r←v mod $m_{i-1}$. In this case, $x_i \approx y_i$/$s_i$, and $$x_i = \frac{x_i}{2^k}.$$

Then, $x_b$=[$x_1$, ..., $x_{d_b}$]$^T$ and r are output.

In the foregoing operation process, it is clear that $$x_i \approx \frac{z_i - t_i}{s_i}.$$

Because division with a remainder is unique, it can be ensured that x and r are complete invertible, that is, the original x and the remainder result r can be completely restored by using a forward operation and an invertible operation at the target volume preserving flow layer.

In an implementation, refer to the architecture of the volume preserving flow model shown in FIG. 6. The volume preserving flow model further includes a target convolutional layer connected to the target volume preserving flow layer, the output at the target volume preserving flow layer is used as an input at the target convolutional layer, and the target convolutional layer is used to perform a multiplication operation on the output at the target volume preserving flow layer and a weight matrix. In an implementation, the target convolutional layer is a 1×1 convolutional layer.

Further, the weight matrix may be obtained, and LU decomposition is performed on the weight matrix to obtain a first matrix, a second matrix, a third matrix, and a fourth matrix, where the first matrix is a permutation matrix, the second matrix is a lower triangular matrix, the third matrix is a unit matrix whose product of diagonal elements is 1, and the fourth matrix is an upper triangular matrix.

First, a multiplication operation is performed on the output at the target volume preserving flow layer and the fourth matrix to obtain a sixth result. Further, it is assumed that the weight matrix of the target convolutional layer is W∈$R^{c \times c}$ and an operation corresponding to the target convolutional layer is equivalent to a matrix multiplication operation. It is assumed that a dimension of the input data x is c, and z=Wx. LU decomposition is performed on W to obtain W=PLΛU. P is a permutation matrix, L is a lower triangular matrix, U is an upper triangular matrix, and Λ is a unit matrix whose product of diagonal elements is 1 (detΛ=1). In this case, a value of z may be obtained by multiplying by matrices of P, L, Λ, and U, that is, z=PLΛUx. During calculation, Ux may be first calculated. Further, it is assumed that the sixth result is z=Ux, $u_{ij}$ is an element in a row i and a column j in U, and $x_i$ and $z_i$ are i$^{th}$ elements of x and z respectively. In this case, forward calculation is as follows:

$$z_i = x_i + \frac{\text{round}\left(2^k \sum_{j=i+1}^{c} u_{ij}x_j\right)}{2^k}$$

Inverse calculation starts from a last dimension and is iteratively performed dimension by dimension.

$$x_c = z_c, \ x_i = z_i - \frac{\text{round}\left(2^k \sum_{j=i+1}^{c} u_{ij}x_j\right)}{2^k}$$

Then, a multiplication operation may be performed on the sixth result and the third matrix to obtain a seventh result. Further, it may be assumed that the seventh result is z=Λx, λ is an i$^{th}$ diagonal element of Λ, and $x_i$ and $z_i$ are i$^{th}$ elements of x and z respectively. $z_i$=$\lambda_i \cdot x_i$, where Πλ=1. Then, a product of the diagonal matrix and the sixth result may be calculated by using the calculation method of the operation corresponding to the target volume preserving flow layer. Details are not described herein again.

Then, a multiplication operation may be performed on the seventh result and the second matrix to obtain an eighth result. Further, it is assumed that the eighth result is z=Lx, $l_{ij}$ is an element in a row i and a column j in L, and $x_i$ and $z_i$ are $i^{th}$ elements of x and z respectively. In this case, forward calculation is as follows:

$$z_1 = x_1, \, z_i = x_i + \frac{\text{round}\left(2^k \sum_{j=1}^{i-1} u_{ij}x_j\right)}{2^k}$$

Inverse calculation may start from a first dimension and is iteratively performed dimension by dimension.

$$x_1 = z_1, \, x_i = z_i - \frac{\text{round}\left(2^k \sum_{j=1}^{i-1} u_{ij}x_j\right)}{2^k}$$

Then, a multiplication operation may be performed on the eighth result and the first matrix to obtain a ninth result, where the ninth result is used as a result obtained by performing a multiplication operation on the output at the target volume preserving flow layer and the weight matrix. Further, it is assumed that the ninth result is z=Px, z may be obtained by rearranging elements of x based on the matrix P, and x may be restored through inverse rearrangement performed on elements of z based on $P^{-1}$.

In this embodiment, the target convolutional layer is converted into continuous matrix multiplication operations of the upper triangular matrix, the diagonal matrix, the lower triangular matrix, and the permutation matrix, and iterative calculation, numerical calculation at a coupling layer, iterative calculation, and element rearrangement are respectively used for the four matrix multiplication operations.

303: Encode the hidden variable output to obtain encoded data.

In this embodiment of this application, the hidden variable output z may be represented by probability distribution $p_z(z)$, and the hidden variable output z may be encoded based on the probability distribution $p_z(z)$ to obtain the encoded data.

In an optional implementation, the encoded data is a binary bitstream. An entropy estimation network may be used to obtain probability estimation of each point in the hidden variable output, and entropy encoding is performed on the hidden variable output based on the probability estimation to obtain the binary bitstream. It should be noted that an existing entropy encoding technology may be used in the entropy encoding process mentioned in this application. Details are not described in this application.

In this embodiment of this application, after the encoded data is obtained, the encoded data may be sent to a device for decompression, and the device for decompression may decompress (which is also referred to as decoding) the data. Alternatively, a terminal device for compression may store the encoded data in a storage device. When required, the terminal device may obtain the encoded data from the storage device, and may decompress the encoded data.

An embodiment of this application provides a data encoding method. The method includes obtaining the to-be-encoded data; obtaining the volume preserving flow block, and processing the to-be-encoded data by using the volume preserving flow model to obtain the hidden variable output, where the volume preserving flow model includes the target volume preserving flow layer, the operation corresponding to the target volume preserving flow layer is the invertible operation that meets the volume preserving flow constraint, the target volume preserving flow layer is used to obtain the first data, and perform a multiplication operation on the preset coefficient and first data, and the preset coefficient is not 1; and encoding the hidden variable output to obtain the encoded data.

On the one hand, in this application, lossless compression is implemented by using the volume preserving flow model. In comparison with an integer discrete flow model, on a premise that the target volume preserving flow layer of the volume preserving flow model can be inverse, the operation corresponding to the target volume preserving flow layer includes an operation (multiplication operation) other than integer addition and subtraction operations such that the volume preserving flow model has a stronger representation capability. This can more accurately determine data distribution, and implement a better compression rate.

On the other hand, when a multiplication operation is performed, division with a remainder is used to resolve a numerical inverse calculation problem at the target volume preserving flow layer. A linear coefficient (namely, the preset coefficient in the foregoing embodiments) is changed into a fractional form, and a numerator of each dimension is a denominator of a previous dimension. Data of each dimension is multiplied by a numerator of a current linear coefficient, a remainder of the previous dimension is added, then a denominator is used to perform division with a remainder, and a constant term is added to obtain a calculation result of a current dimension. In addition, the remainder result of division with a remainder is transferred to a next dimension, to eliminate a numerical error such as to implement numerical inverse calculation at the target volume preserving flow layer.

On the other hand, when a multiplication operation is performed on the convolutional layer and the weight matrix, the target convolutional layer is converted into continuous matrix multiplication operations of the upper triangular matrix, the diagonal matrix, the lower triangular matrix, and the permutation matrix. Four calculation manners, namely, iterative calculation, numerical calculation at the target volume preserving flow layer, iterative calculation, and element rearrangement, are respectively used for the four matrix multiplication operations. In addition, an inverse calculation method of each calculation manner is provided, to implement numerical inverse calculation of the target convolutional layer.

On the other hand, for a general flow model, it can be proved that there is no method for implementing numerical invertibility in discrete space. Because hidden variable data may correspond to a plurality of pieces of input data due to a numerical error, a plurality of encoding operations need to be performed to eliminate the numerical error, which causes low algorithm efficiency. However, in the volume preserving flow model in this embodiment of this application, a numerical invertible operation can be implemented by using a numerical invertible target volume preserving flow layer. On a premise that the model has a strong representation capability, a small quantity of encoding times is implemented in a compression process. This implements a higher compression throughput rate and a lower compression rate.

FIG. 7 is a schematic flowchart of a data decoding method according to an embodiment of this application. As shown in FIG. 7, the data decoding method provided in this embodiment of this application includes the following steps.

701: Obtain encoded data.

In this embodiment of this application, a decoding device may obtain the encoded data such as the encoded data obtained in step 303 in the embodiment corresponding to FIG. 3.

In this embodiment of this application, after the encoded data is obtained, the encoded data may be sent to a terminal device for decompression, and an image processing device for decompression may obtain the encoded data, and decompress the data. Alternatively, a terminal device for compression may store the encoded data in a storage device. When required, the terminal device may obtain the encoded data from the storage device, and may decompress the encoded data.

It should be understood that a decoding device may further obtain the remainder result described in the foregoing embodiment.

702: Decode the encoded data to obtain a hidden variable output.

In this embodiment of this application, the decoding device may decode the encoded data to obtain the hidden variable output.

Further, the encoded data may be decoded by using an entropy decoding technology in the conventional technology to obtain a reconstructed hidden variable output.

703: Process the hidden variable output by using a volume preserving flow model to obtain a decoding output, where the volume preserving flow model includes a target volume preserving flow layer, an operation corresponding to the target volume preserving flow layer is an invertible operation that meets a volume preserving flow constraint, the target volume preserving flow layer is used to perform a multiplication operation on a preset coefficient and first data input to the target volume preserving flow layer, and the preset coefficient is not 1.

In this embodiment of this application, after the hidden variable output is obtained, the hidden variable output may be processed by using an inverse operation of an operation corresponding to each layer in the volume preserving flow model based on the embodiment corresponding to FIG. 3, to restore original to-be-encoded data (namely, a decoding output), so as to implement lossless decompression.

Further, FIG. 8 is a schematic flowchart of data encoding/decoding according to an embodiment of this application. When performing a forward operation, a volume preserving flow model may process to-be-encoded data to obtain a hidden variable output, and an encoder may process the hidden variable output to obtain encoded data. When performing an invertible operation, the volume preserving flow model may process the hidden variable output to obtain a decoding output.

Refer to the structure of the volume preserving flow model described in the embodiment corresponding to FIG. 3. In an implementation, the volume preserving flow model may be obtained by stacking a plurality of volume preserving flow layers. Further, the volume preserving flow model may include M volume preserving flow layers that are connected in series, an output at an $(i-1)^{th}$ volume preserving flow layer is used as an input at an $i^{th}$ volume preserving flow layer, i is a positive integer not greater than M, an input at a $1^{st}$ volume preserving flow layer is the hidden variable output, and an output at an $M^{th}$ volume preserving flow layer is the decoding output.

Figure 9:
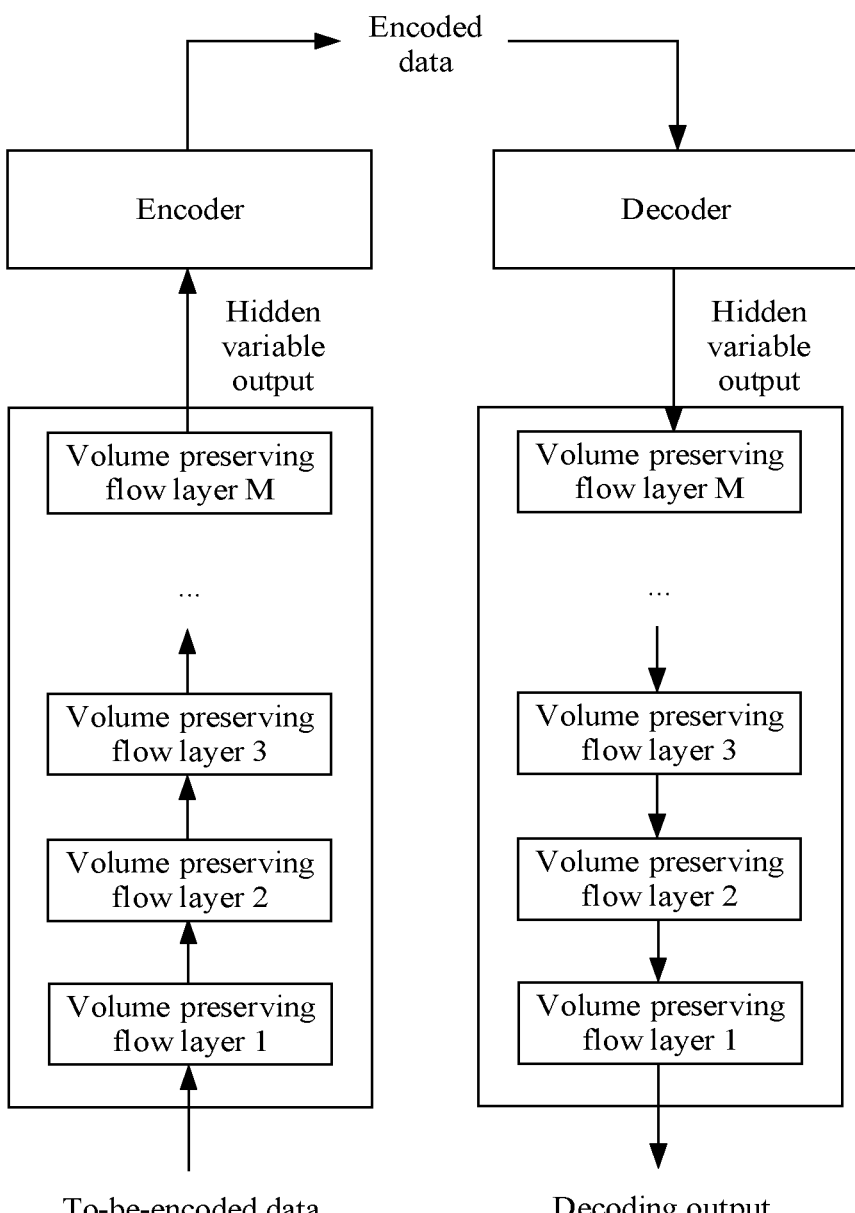
FIG. 9 is a schematic diagram of a volume preserving flow model according to an embodiment of this application.

Further, FIG. 9 is a schematic flowchart of a volume preserving flow model according to an embodiment of this application. The volume preserving flow model may include M volume preserving flow layers (a volume preserving flow layer 1, a volume preserving flow layer 2, a volume preserving flow layer 3, . . . , and a volume preserving flow layer M shown in FIG. 9). During decoding, an output at a $1^{st}$ volume preserving flow layer (volume preserving flow layer M) is used as an input at a $2^{nd}$ volume preserving flow layer (volume preserving flow layer M–1), and the rest can be deduced by analogy. An output at an $(M-2)^{th}$ volume preserving flow layer (volume preserving flow layer 3) is used as the input at the $(M-1)^{th}$ volume preserving flow layer (volume preserving flow layer 2), an output at the $(M-1)^{th}$ volume preserving flow layer (volume preserving flow layer 2) is used as an input at an $M^{th}$ volume preserving flow layer (volume preserving flow layer 1), and an output at the $M^{th}$ volume preserving flow layer (volume preserving flow layer 1) is the decoding output.

In an implementation, the volume preserving flow model may be obtained by stacking a plurality of volume preserving flow layers and a plurality of convolutional layers. Further, the volume preserving flow model includes M volume preserving flow layers and M convolutional layers that are connected in series, the M volume preserving flow layers include the target volume preserving flow layer, the M convolutional layers include a target convolutional layer, an output at an $i^{th}$ volume preserving flow layer is used as an input at an $i^{th}$ convolutional layer, an output at the $i^{th}$ convolutional layer is used as an input at an $(i+1)^{th}$ volume preserving flow layer, i is a positive integer not greater than M, an input at a $1^{st}$ convolutional layer is the hidden variable output, and an output at an $M^{th}$ volume preserving flow layer is the decoding output.

Figure 10:
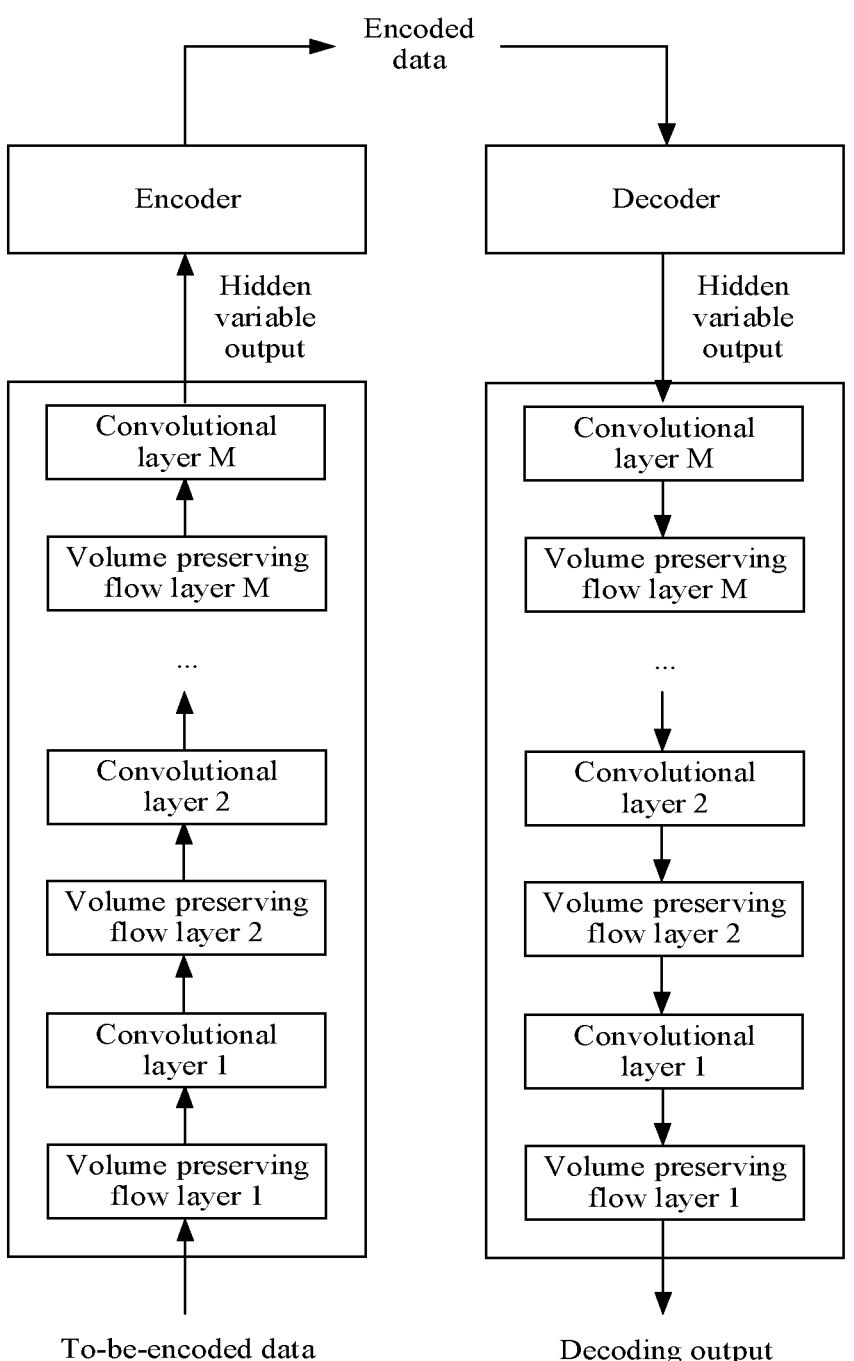
FIG. 10 is a schematic diagram of a volume preserving flow model according to an embodiment of this application.

Further, FIG. 10 is a schematic flowchart of a volume preserving flow model according to an embodiment of this application. The volume preserving flow model may include M volume preserving flow layers (a volume preserving flow layer 1, a volume preserving flow layer 2, a volume preserving flow layer 3, . . . , and a volume preserving flow layer M shown in FIG. 10) and M convolutional layers (a convolutional layer 1, a convolutional layer 2, a convolutional layer 3, . . . , and a convolutional layer M shown in FIG. 10). During decoding, an output at a $1^{st}$ convolutional layer (convolutional layer M) is used as an input at a $1^{st}$ volume preserving flow layer (volume preserving flow layer M), and the rest can be deduced by analogy. An output at an $(M-1)^{th}$ convolutional layer (convolutional layer 2) is used as an input at an $(M-1)^{th}$ volume preserving flow layer (volume preserving flow layer 2), an output at the $(M-1)^{th}$ volume preserving flow layer (volume preserving flow layer 2) is used as an input at an $M^{th}$ convolutional layer (convolutional layer 1), an output at the $M^{th}$ convolutional layer (convolutional layer 1) is used as an input at an Mt h volume preserving flow layer (volume preserving flow layer 1), and an output at the Mt h volume preserving flow layer is the decoding output.

In a possible implementation, the volume preserving flow constraint includes that input space and output space of an operation corresponding to a volume preserving operation layer have a same volume size.

In a possible implementation, the first data and the preset coefficient are vectors, the first data includes N elements, the preset coefficient includes N coefficients, the N elements included in the first data one-to-one correspond to the N coefficients, a product of the N coefficients is 1, and a division operation may be performed on each element in the first data and a corresponding coefficient to obtain a division result.

The following describes how to obtain the preset coefficient through calculation.

In a possible implementation, a first neural network may be used to process second data input to the target volume preserving flow layer to obtain a first network output, and perform a preset operation on the first network output to obtain the preset coefficient. In an implementation, the preset operation is an exponentiation operation by using a natural constant e as a base.

The volume preserving flow constraint may be that input space and output space of an operation corresponding to a volume preserving operation layer have a same volume size.

In this embodiment of this application, to ensure that the operation corresponding to the target volume preserving flow layer meets the volume preserving flow constraint, a product of linear coefficients in the operation corresponding to the target volume preserving flow layer needs to be 1. Further, the first data and the preset coefficient are vectors, the first data includes N elements, the preset coefficient includes N coefficients, the N elements included in the first data one-to-one correspond to the N coefficients, the N coefficients included in the preset coefficient is the linear coefficients in the operation corresponding to the target volume preserving flow layer, and a product of the N coefficients is 1.

To ensure that the product of the N coefficients in the preset coefficient is 1, an average may be subtracted from each element included in the first network output. Further, the first network output is a vector, and the first network output includes the N elements. The average of the N elements included in the first network output may be obtained, and the average is subtracted from each element included in the first network output to obtain the processed N elements. An exponentiation operation is performed on each of the processed N elements by using the natural constant e as a base to obtain the preset coefficient, where the preset coefficient includes the N coefficients.

In this embodiment of this application, the operation corresponding to the target volume preserving flow layer is the invertible operation that meets the volume preserving flow constraint.

The invertible operation means that the operation may obtain output data based on input data, and may also inversely derive the input data based on the output data. For example, it is assumed that the input data is x, and the output data is z=f(x). x may also be restored from the output data z by using an inverse operation.

In a possible implementation, the first network output is a vector, and the first network output includes the N elements. The average of the N elements included in the first network output may be obtained, and the average is subtracted from each element included in the first network output to obtain the processed N elements. An exponentiation operation is performed on each of the processed N elements by using the natural constant e as a base to obtain the preset coefficient, where the preset coefficient includes the N coefficients.

In this embodiment, because division with a remainder is used during encoding to resolve an invertible operation, specifically, a linear coefficient is changed into a fractional form, and a numerator of each dimension is a denominator of a previous dimension. Data of each dimension is multiplied by a numerator of a current linear coefficient, a remainder of the previous dimension is added, and then a denominator is used to perform division with a remainder to obtain a result of a current dimension. In addition, the remainder of division with a remainder is transferred to a next dimension, to eliminate a numerical error. In a decoding process, an inverse operation of division with a remainder needs to be performed.

In a possible implementation, the first data and the preset coefficient are vectors, the first data includes the N elements, the preset coefficient includes the N coefficients, and the N elements included in the first data one-to-one correspond to the N coefficients. The N elements include a first target element and a second target element, the first target element corresponds to a first target coefficient, and the second target element corresponds to a second target coefficient. A first fixed-point number corresponding to the first target element and a second fixed-point number corresponding to the second target element are obtained, and a first fraction corresponding to the first target coefficient and a second fraction corresponding to the second target coefficient are obtained. The first fraction includes a first numerator and a first denominator, the second fraction includes a second numerator and a second denominator, the first numerator, the first denominator, the second numerator, and the second denominator are integers, and the first denominator is the same as the second numerator. A multiplication operation is performed on the first fixed-point number and the first denominator to obtain a first result. A division operation is performed on the first result and the first numerator to obtain a second result. The second result includes a first quotient result and a first remainder result, and the first quotient result is used as a division result of the first target element and the first target coefficient. A multiplication operation is performed on the second fixed-point number and the second denominator to obtain a third result. An addition operation is performed on the third result and the first remainder result to obtain a fourth result. A division operation is performed on the fourth result and the second numerator to obtain a fifth result. The fifth result includes a second quotient result and a second remainder result, and the second quotient result is used as a division result of the second target element and the second target coefficient.

For example, a fixed-point number of the first data x may be [29, 33, 165], and a remainder result output by an adjacent previous volume preserving flow layer or an encoding side is 1. It is assumed that the preset coefficient s is [0.65, 0.61, 2.52], and a fraction corresponding to the preset coefficient s is represented as [$\frac{2}{3}$, $\frac{3}{5}$, $\frac{5}{2}$]. The first fixed-point number is 165, the second fixed-point number is 33, the first target coefficient is 2.52, the second target coefficient is the first fraction is $\frac{5}{2}$, the second fraction is $\frac{3}{5}$, the first numerator is 5, the first denominator is 2, the second numerator is 3, and the second denominator is 5. A multiplication operation is performed on the first fixed-point number (165) and the first denominator (2), and a multiplication result and the remainder result 1 are added to obtain the first result (331), and a division operation is performed on the first result (331) and the first numerator (5) to obtain the second result. The second result includes the first quotient result (66) and the first remainder result (1), and the first quotient result (66) is used as the division result of the first target element and the first target coefficient. A multiplication operation is performed on the second fixed-point number (33) and the second denominator (5) to obtain the third result (165), an addition operation is performed on the third result (165) and the first remainder result (1) to obtain the fourth result (166), and a division operation is performed on the fourth result (166) and the second numerator (3) to obtain the fifth result. The fifth result includes the second quotient result (55) and the second remainder result (1), and the second quotient result (55) is used as the division result of the second target element and the second target coefficient.

The second target element is a last element in the N elements on which a division operation is performed with a corresponding coefficient in a process of performing a division operation on the first data and the preset coefficient, and the target volume preserving flow layer is further used to output the second remainder result. Further, the target volume preserving flow layer may output the second remainder result to a next volume preserving flow layer adjacent to the target volume preserving flow layer. In other words, a remainder result is obtained for each element in the first data in the foregoing manner, and is input to a calculation process of a next element until a product operation of a last element in the first data is completed. In this case, an obtained remainder result may be input to an adjacent next volume preserving flow layer.

In a possible implementation, the volume preserving flow model further includes a first volume preserving flow layer, and the first volume preserving flow layer is an adjacent volume preserving flow layer before the target volume preserving flow layer. A remainder result output by the first volume preserving flow layer is obtained, and a multiplication operation is performed on the first fixed-point number and the first denominator, and an addition operation is performed on a multiplication operation result and the remainder result output by the first volume preserving flow layer to obtain the first result.

In a possible implementation, the input at target volume preserving flow layer is the hidden variable output, the remainder result output by the encoding side may be obtained. After a multiplication operation is performed on the first fixed-point number and the first denominator, an addition operation needs to be performed on a multiplication operation result and the remainder result output by the encoding side to obtain the first result.

In a possible implementation, the target volume preserving flow layer is further used to perform a subtraction operation on the first data and a constant term to obtain a subtraction result, where the constant term is not 0. Further, a division operation may be performed on the subtraction result and the preset coefficient.

Further, a second neural network may be used to process the second data input to the target volume preserving flow layer to obtain the constant term.

The first neural network and the second neural network may be complex convolutional neural networks, for example, networks such as ResNet and DenseNet. For specific descriptions of the convolutional neural network, refer to descriptions of the embodiments corresponding to FIG. 2B and FIG. 2C. Details are not described herein again.

In this embodiment of this application, the output at the target volume preserving flow layer may include the second data. In other words, the second data is used as a basis for calculating the constant term and the preset coefficient, and is further used as a part of the output at the target volume preserving flow layer.

The following describes, according to a formula, an inverse operation corresponding to the target volume preserving flow layer in this embodiment of this application. Further, how to perform an inverse operation based on z to restore x is described.

In a process of performing an inverse operation, z is decomposed into two parts $z=[z_a, z_b]$, and an inverse operation $x=f^{-1}(z)$ at the layer is $x_a=z_a$, $x_b=(z_b-t(x_a))\emptyset \exp s(x_a)$, $x=[x_a, x_b]$.

$\emptyset$ is vector element-wise division. $x_i=z_i/s_i+t_i$ needs to be calculated in an inverse process. $r \in [0,2^C)$ output in a forward process is specified, a process of a corresponding numerical calculation method may be as follows: $y_i=2^k \cdot z_i-$ round$(2^k \cdot t_i)$ is first calculated. For $i=1, 2, \ldots, d_b$, $m_0=m_{d_b}=2^C$, and $$m_i = \text{round}\left(\frac{m_0}{\prod_{j=1}^{i} s_j}\right).$$

In this case, $$s_i \approx \frac{m_{i-1}}{m_i}.$$

For $i=d_b, \ldots, 2, 1$, $v=y_i m_i+r$, where $y_i$ floor$(v/m_{i-1})$, and $r \leftarrow v \bmod m_{i-1}$. In this case, $x_i \approx y_i/s_i$, and $$x_i = \frac{x_i}{2^k}.$$

Then, $x_b=[x_{d_b}]^T$ and r are output.

In the foregoing operation process, it is clear that $$x_i \approx \frac{z_i - t_i}{s_i}.$$

Because division with a remainder is unique, it can be ensured that x and r are complete invertible, that is, the original x and the remainder result r can be completely restored by using a forward operation and an invertible operation at the target volume preserving flow layer.

In an implementation, refer to the architecture of the volume preserving flow model shown in FIG. 10. The volume preserving flow model further includes a target convolutional layer connected to the target volume preserving flow layer, an output at the target convolutional layer is the first data, and the target convolutional layer is used to perform a division operation on input data and a weight matrix. In an implementation, the target convolutional layer is a 1×1 convolutional layer.

Further, the weight matrix may be obtained, and LU decomposition is performed on the weight matrix to obtain a first matrix, a second matrix, a third matrix, and a fourth matrix, where the first matrix is a permutation matrix, the second matrix is a lower triangular matrix, the third matrix is a unit matrix whose product of diagonal elements is 1, and the fourth matrix is an upper triangular matrix.

A multiplication operation is performed on the input data and an inverse matrix of the first matrix to obtain a sixth result. A multiplication operation is performed on the sixth result and an inverse matrix of the second matrix to obtain a seventh result. A multiplication operation is performed on the seventh result and an inverse matrix of the third matrix to obtain an eighth result. A multiplication operation is performed on the eighth result and an inverse matrix of the fourth matrix to obtain a ninth result, where the ninth result is used as a result obtained by performing a division operation on the input data and the weight matrix. For how to perform an invertible operation on the target convolutional layer, refer to the descriptions of the invertible operation on the target convolutional layer in the embodiment corresponding to FIG. 3. Details are not described herein.

In an implementation, in an encoding process, preprocessing such as a bits-back encoding operation may be performed on the to-be-encoded data. An invertible operation of the preprocessing during encoding may be performed after a decoding result is obtained, to restore the original to-be-encoded data. For example, a fixed-point number of the decoding output x may be calculated, where $$x = \frac{\text{floor}(2^h \cdot \bar{x})}{2^h},$$

and $u = \bar{x} - x$. Then, u is encoded by using $U(0, 2^{-h})\delta$, and $x = 2^h(x + 0.5)$ is output, where 0.5 is a preset parameter.

As shown in Table 1, in comparison with a local bits-back (LBB) encoding model of a current optimal lossless compression method based on a flow model, in this embodiment of this application, a quantity of encoding times is reduced by more than 180, and compression efficiency is improved by seven times.

TABLE 1

| Method | Compression time (ms) | Quantity of encoding times |
|---|---|---|
| LBB (NeurIPS 2019) | 97 | 188 |
| Embodiments of this application | 6.4 | 2 |

For example, the to-be-encoded data is image data. As shown in Table 2, in this embodiment of this application, in various image datasets, a good compression rate is obtained. This embodiment of this application can be effectively applied to a lossless image compression task. An optimal lossless compression rate is achieved in CIFAR10, ImageNet32, ImageNet, and another dataset. An important reason for obtaining the good compression rate is that a fitting data distribution capability of the volume preserving flow model is strong.

TABLE 2

| Method | CIFAR10 | Imagenet32 | Imagenet64 |
|---|---|---|---|
| PNG | 1.36 | 1.25 | 1.40 |
| FLIF | 1.91 | 1.77 | 1.91 |
| HilLoc (ICLR 2020) | 2.25 | 1.90 | 2.05 |
| IDF (NeurIPS 2019) | 2.40 | 1.91 | 2.05 |
| IDF++ (Google) | 2.45 | 1.94 | 2.09 |
| Embodiments of this application | 2.50 | 1.99 | 2.14 |

In addition, as shown in Table 3, the volume preserving flow model in this embodiment of this application has good generalization performance, and can compress images of various types and sizes by using a single model. The ImageNet64 dataset is used to train the volume preserving flow model (a size of an input is 64×64). A lossless compression test is performed on a natural image (the natural image is divided into 64×64 blocks, and color blocks with appropriate pixel values fill an image smaller than 64×64 such that a size of the image reaches 64×64) to obtain more than three times a compression rate. The compression rate is far greater than that of the existing lossless compression method.

TABLE 3

| Method | CLIC.mobile | CLIC.pro | DIV2k |
|---|---|---|---|
| PNG | 2.05 | 2.00 | 2.59 |
| FLIF | 3.21 | 2.88 | 2.75 |

TABLE 3-continued

| Method | CLIC.mobile | CLIC.pro | DIV2k |
|---|---|---|---|
| L3C (CVPR 2019) | 3.03 | 2.72 | 2.59 |
| RC (CVPR 2020) | 3.15 | 2.73 | 2.60 |
| Embodiments of this application | 3.35 | 3.15 | 2.99 |

Figure 11:
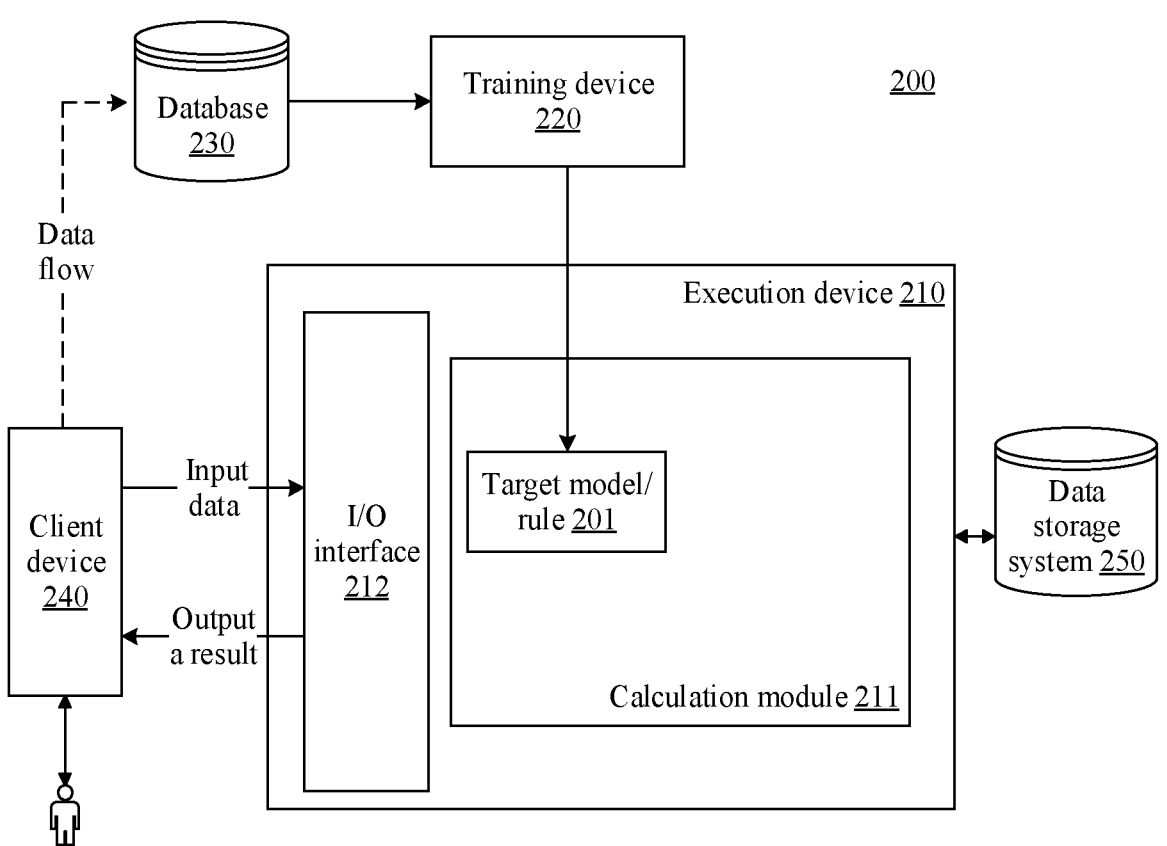
FIG. 11 is a diagram of a system architecture according to an embodiment of this application.

FIG. 11 is a schematic diagram of an architecture of a system according to an embodiment of this application. In FIG. 11, an execution device 210 configures an input/output (I/O) interface 212 configured to exchange data with an external device. A user may input data (for example, to-be-encoded data or encoded data) to the I/O interface 212 by using a client device 240.

In a process in which the execution device 220 preprocesses the input data, or in a process in which a calculation module 211 of the execution device 220 performs related processing such as calculation (for example, implements a function of the neural network in this application), the execution device 220 may invoke data, code, and the like in a data storage system 250 for corresponding processing; or may store data, instructions, and the like obtained through corresponding processing into the data storage system 250.

Finally, the I/O interface 212 returns a processing result (for example, encoded data or decoded data) to the client device 240, to provide the category for the user.

Optionally, the client device 240 may be, for example, a control unit in an autonomous driving system or a function algorithm module in a mobile phone terminal. For example, the function algorithm module may be configured to implement a related task.

It should be noted that a training device 220 may generate corresponding target models/rules (for example, the target neural network model in embodiments of this application) for different targets or different tasks based on different training data. The corresponding target models/rules may be used to implement the foregoing targets or complete the foregoing tasks, to provide a required result for the user.

In a case shown in FIG. 11, the user may manually input data and the user may input the data on an interface provided by the I/O interface 212. In another case, the client device 240 may automatically send input data to the I/O interface 212. If it is required that the client device 240 needs to obtain authorization from the user to automatically send the input data, the user may set corresponding permission on the client device 240. The user may view, on the client device 240, a result output by the execution device 210. Further, the result may be presented in a form of displaying, a sound, an action, or the like. The client device 240 may alternatively be used as a data collection end, to collect, as new sample data, input data that is input to the I/O interface 212 and an output result that is output from the I/O interface 212 that are shown in the figure, and store the new sample data in the database 230. It is clear that the client device 240 may alternatively not perform collection. Instead, the I/O interface 212 directly stores, in the database 230 as new sample data, the input data input to the I/O interface 212 and the output result output from the I/O interface 212.

It should be noted that FIG. 11 is merely a schematic diagram of the system architecture according to an embodiment of this application. A location relationship between a device, a component, a module, and the like shown in the figure constitutes no limitation. For example, in FIG. 11, the data storage system 250 is an external memory relative to the execution device 210. In another case, the data storage system 250 may alternatively be disposed in the execution device 210.

Figure 12:
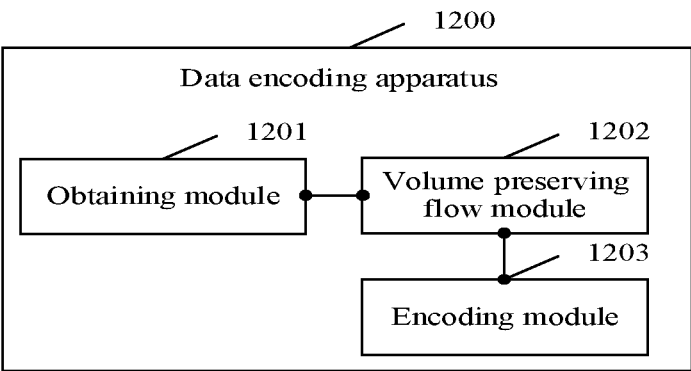
FIG. 12 is a schematic diagram of a structure of a data encoding apparatus according to an embodiment of this application.

Based on the embodiments corresponding to FIG. 3 to FIG. 11, the following further provides a related device used to implement the solutions, to better implement the solutions in embodiments of this application. FIG. 12 is a schematic diagram of a structure of a data encoding apparatus 1200 according to an embodiment of this application. The data encoding apparatus 1200 may be a terminal device or a server. The data encoding apparatus 1200 includes an obtaining module 1201 configured to obtain to-be-encoded data; a volume preserving flow module 1202 configured to process the to-be-encoded data by using a volume preserving flow model to obtain a hidden variable output, where the volume preserving flow model includes a target volume preserving flow layer, an operation corresponding to the target volume preserving flow layer is an invertible operation that meets a volume preserving flow constraint, the target volume preserving flow layer is used to perform a multiplication operation on a preset coefficient and first data input to the target volume preserving flow layer, and the preset coefficient is not 1; and an encoding module 1203 configured to encode the hidden variable output to obtain encoded data.

In a possible implementation, the volume preserving flow constraint includes that input space and output space of an operation corresponding to a volume preserving operation layer have a same volume size.

In a possible implementation, the first data and the preset coefficient are vectors, the first data includes N elements, the preset coefficient includes N coefficients, the N elements included in the first data one-to-one correspond to the N coefficients, a product of the N coefficients is 1, and performing the multiplication operation on the first data and the preset coefficient includes performing a multiplication operation on each element in the first data and a corresponding coefficient to obtain a product result.

In a possible implementation, the volume preserving flow module is further configured to process, by using a first neural network, second data input to the target volume preserving flow layer to obtain a first network output, and perform a preset operation on the first network output to obtain the preset coefficient.

In a possible implementation, the first network output is a vector, and the first network output includes the N elements. The obtaining module is configured to obtain an average of the N elements included in the first network output, and subtract the average from each element included in the first network output to obtain processed N elements; and perform an exponentiation operation on each of the processed N elements by using a natural constant e as a base to obtain the preset coefficient, where the preset coefficient includes the N coefficients.

In a possible implementation, an output at the target volume preserving flow layer includes the second data.

In a possible implementation, the target volume preserving flow layer is further used to perform an addition operation on a constant term and the product result of the first data and the preset coefficient, where the constant term is not 0.

In a possible implementation, the volume preserving flow module is configured to process, by using a second neural network, the second data input to the target volume preserving flow layer to obtain the constant term.

In a possible implementation, the first data and the preset coefficient are vectors, the first data includes the N elements, the preset coefficient includes the N coefficients, the N elements included in the first data one-to-one correspond to the N coefficients, the N elements include a first target element and a second target element, the first target element corresponds to a first target coefficient, the second target element corresponds to a second target coefficient, and the volume preserving flow module is configured to obtain a first fixed-point number corresponding to the first target element and a second fixed-point number corresponding to the second target element; obtain a first fraction corresponding to the first target coefficient and a second fraction corresponding to the second target coefficient, where the first fraction includes a first numerator and a first denominator, the second fraction includes a second numerator and a second denominator, the first numerator, the first denominator, the second numerator, and the second denominator are integers, and the first denominator is the same as the second numerator; perform a multiplication operation on the first fixed-point number and the first numerator to obtain a first result; perform a division operation on the first result and the first denominator to obtain a second result, where the second result includes a first quotient result and a first remainder result, and the first quotient result is used as a multiplication result of the first target element and the first target coefficient; perform a multiplication operation on the second fixed-point number and the second numerator to obtain a third result; perform an addition operation on the third result and the first remainder result to obtain a fourth result; and perform a division operation on the fourth result and the second denominator to obtain a fifth result, where the fifth result includes a second quotient result and a second remainder result, and the second quotient result is used as a multiplication result of the second target element and the second target coefficient.

In a possible implementation, the second target element is a last element in the N elements on which a multiplication operation is performed with a corresponding coefficient in a process of performing a multiplication operation on the first data and the preset coefficient, and the target volume preserving flow layer is further used to output the second remainder result.

In a possible implementation, the target volume preserving flow layer is further used to output the second remainder result to a next volume preserving flow layer adjacent to the target volume preserving flow layer.

In a possible implementation, the volume preserving flow model further includes a first volume preserving flow layer, the first volume preserving flow layer is an adjacent volume preserving flow layer before the target volume preserving flow layer, and the volume preserving flow module is configured to obtain a remainder result output by the first volume preserving flow layer; perform a multiplication operation on the first fixed-point number and the first numerator, and performing an addition operation on a multiplication operation result and the remainder result output by the first volume preserving flow layer to obtain the first result.

In a possible implementation, the volume preserving flow model includes M volume preserving flow layers that are connected in series, the M volume preserving flow layers that are connected in series include the target volume preserving flow layer, an output at an $(i-1)^{th}$ volume preserving flow layer is used as an input at an $i^{th}$ volume preserving flow layer, i is a positive integer not greater than M, an input at a $1^{st}$ volume preserving flow layer is the to-be-encoded data, and an output at an $M^{th}$ volume preserving flow layer is the hidden variable output.

In a possible implementation, the volume preserving flow model further includes a target convolutional layer connected to the target volume preserving flow layer, the output at the target volume preserving flow layer is used as an input at the target convolutional layer, and the target convolutional layer is used to perform a multiplication operation on the output at the target volume preserving flow layer and a weight matrix.

In a possible implementation, the volume preserving flow module is configured to obtain the weight matrix; perform LU decomposition on the weight matrix to obtain a first matrix, a second matrix, a third matrix, and a fourth matrix, where the first matrix is a permutation matrix, the second matrix is a lower triangular matrix, the third matrix is a unit matrix whose product of diagonal elements is 1, and the fourth matrix is an upper triangular matrix; perform a multiplication operation on the output at the target volume preserving flow layer and the fourth matrix to obtain a sixth result; perform a multiplication operation on the sixth result and the third matrix to obtain a seventh result; perform a multiplication operation on the seventh result and the second matrix to obtain an eighth result; and perform a multiplication operation on the eighth result and the first matrix to obtain a ninth result, where the ninth result is used as a result obtained by performing a multiplication operation on the output at the target volume preserving flow layer and the weight matrix.

In a possible implementation, the volume preserving flow model includes M volume preserving flow layers and M convolutional layers that are connected in series, the M volume preserving flow layers include the target volume preserving flow layer, the M convolutional layers include the target convolutional layer, an output at an $i^{th}$ volume preserving flow layer is used as an input at an $i^{th}$ convolutional layer, an output at the $i^{th}$ convolutional layer is used as an input at an $(i+1)^{th}$ volume preserving flow layer, i is a positive integer not greater than M, an input at a $1^{st}$ volume preserving flow layer is the to-be-encoded data, and an output at an $M^{th}$ convolutional layer is the hidden variable output.

Figure 13:
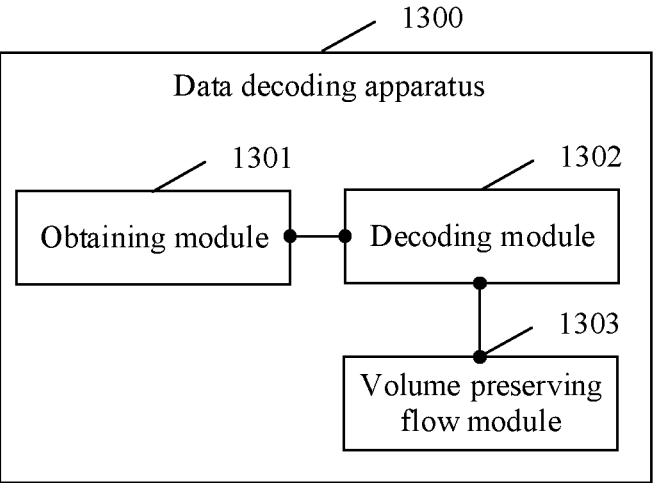
FIG. 13 is a schematic diagram of a structure of a data decoding apparatus according to an embodiment of this application.

FIG. 13 is a schematic diagram of a structure of a data decoding apparatus 1300 according to an embodiment of this application. The data decoding apparatus 1300 may be a terminal device or a server. The data decoding apparatus 1300 includes an obtaining module 1301 configured to obtain encoded data; a decoding module 1302 configured to decode the encoded data to obtain a hidden variable output; and a volume preserving flow module 1303 configured to process the hidden variable output by using a volume preserving flow model to obtain a decoding output, where the volume preserving flow model includes a target volume preserving flow layer, an operation corresponding to the target volume preserving flow layer is an invertible operation that meets a volume preserving flow constraint, the target volume preserving flow layer is used to perform a multiplication operation on a preset coefficient and first data input to the target volume preserving flow layer, and the preset coefficient is not 1.

In a possible implementation, the volume preserving flow constraint includes that input space and output space of an operation corresponding to a volume preserving operation layer have a same volume size.

In a possible implementation, the first data and the preset coefficient are vectors, the first data includes N elements, the preset coefficient includes N coefficients, the N elements included in the first data one-to-one correspond to the N coefficients, a product of the N coefficients is 1, and the performing a division operation on the first data and the preset coefficient includes performing a division operation on each element in the first data and a corresponding coefficient to obtain a division result.

In a possible implementation, the volume preserving flow module is further configured to process, by using a first neural network, second data input to the target volume preserving flow layer to obtain a first network output, and perform a preset operation on the first network output to obtain the preset coefficient.

In a possible implementation, the first network output is a vector, and the first network output includes the N elements. The obtaining module is configured to obtain an average of the N elements included in the first network output, and subtract the average from each element included in the first network output to obtain processed N elements; and perform an exponentiation operation on each of the processed N elements by using a natural constant e as a base to obtain the preset coefficient, where the preset coefficient includes the N coefficients.

In a possible implementation, an output at the target volume preserving flow layer includes the second data.

In a possible implementation, the target volume preserving flow layer is further used to perform a subtraction operation on the first data and a constant term to obtain a subtraction result, where the constant term is not 0.

The obtaining module is configured to perform a division operation on the subtraction result and the preset coefficient.

In a possible implementation, the volume preserving flow module is configured to process, by using a second neural network, the second data input to the target volume preserving flow layer to obtain the constant term.

In a possible implementation, the first data and the preset coefficient are vectors, the first data includes the N elements, the preset coefficient includes the N coefficients, the N elements included in the first data one-to-one correspond to the N coefficients, the N elements include a first target element and a second target element, the first target element corresponds to a first target coefficient, the second target element corresponds to a second target coefficient, and the volume preserving flow module is configured to obtain a first fixed-point number corresponding to the first target element and a second fixed-point number corresponding to the second target element; obtain a first fraction corresponding to the first target coefficient and a second fraction corresponding to the second target coefficient, where the first fraction includes a first numerator and a first denominator, the second fraction includes a second numerator and a second denominator, the first numerator, the first denominator, the second numerator, and the second denominator are integers, and the first numerator is the same as the second denominator; perform a multiplication operation on the first fixed-point number and the first denominator to obtain a first result; perform a division operation on the first result and the first numerator to obtain a second result, where the second result includes a first quotient result and a first remainder result, and the first quotient result is used as a division result of the first target element and the first target coefficient; perform a multiplication operation on the second fixed-point number and the second denominator to obtain a third result; perform an addition operation on the third result and the first remainder result to obtain a fourth result; and perform a division operation on the fourth result and the second numerator to obtain a fifth result, where the fifth result includes a second quotient result and a second remainder result, and the second quotient result is used as a division result of the second target element and the second target coefficient.

In a possible implementation, the second target element is a last element in the N elements on which a division operation is performed with a corresponding coefficient in a process of performing a division operation on the first data and the preset coefficient, and the target volume preserving flow layer is further used to output the second remainder result.

In a possible implementation, the volume preserving flow model further includes a first volume preserving flow layer, the first volume preserving flow layer is an adjacent volume preserving flow layer before the target volume preserving flow layer, and the obtaining module is configured to obtain a remainder result output by the first volume preserving flow layer; and perform a multiplication operation on the first fixed-point number and the first denominator, and perform an addition operation on a multiplication operation result and the remainder result output by the first volume preserving flow layer to obtain the first result.

In a possible implementation, the volume preserving flow model includes M volume preserving flow layers that are connected in series, the M volume preserving flow layers that are connected in series include the target volume preserving flow layer, an output at an $(i-1)^{th}$ volume preserving flow layer is used as an input at an $i^{th}$ volume preserving flow layer, i is a positive integer not greater than M, an input at a $1^{st}$ volume preserving flow layer is the hidden variable output, and an output at an $M^{th}$ volume preserving flow layer is the decoding output.

In a possible implementation, the volume preserving flow model further includes a target convolutional layer connected to the target volume preserving flow layer, an output at the target convolutional layer is the first data, and the target convolutional layer is used to perform a division operation on input data and a weight matrix.

In a possible implementation, the volume preserving flow module is configured to obtain the weight matrix; perform LU decomposition on the weight matrix to obtain a first matrix, a second matrix, a third matrix, and a fourth matrix, where the first matrix is a permutation matrix, the second matrix is a lower triangular matrix, the third matrix is a unit matrix whose product of diagonal elements is 1, and the fourth matrix is an upper triangular matrix; perform a multiplication operation on the input data and an inverse matrix of the first matrix to obtain a sixth result; perform a multiplication operation on the sixth result and an inverse matrix of the second matrix to obtain a seventh result; perform a multiplication operation on the seventh result and an inverse matrix of the third matrix to obtain an eighth result; and perform a multiplication operation on the eighth result and an inverse matrix of the fourth matrix to obtain a ninth result, where the ninth result is used as a result obtained by performing a division operation on the input data and the weight matrix.

In a possible implementation, the volume preserving flow model includes M volume preserving flow layers and M convolutional layers that are connected in series, the M volume preserving flow layers include the target volume preserving flow layer, the M convolutional layers include the target convolutional layer, an output at an $i^{th}$ convolutional layer is used as an input at an $i^{th}$ volume preserving flow layer, an output at the $i^{th}$ volume preserving flow layer is used as an input of an $(i+1)^{th}$ convolutional layer, i is a positive integer not greater than M, an input at a $1^{st}$ convolutional layer is the hidden variable output, and an output at an $M^{th}$ volume preserving flow layer is the decoding output.

Figure 14:
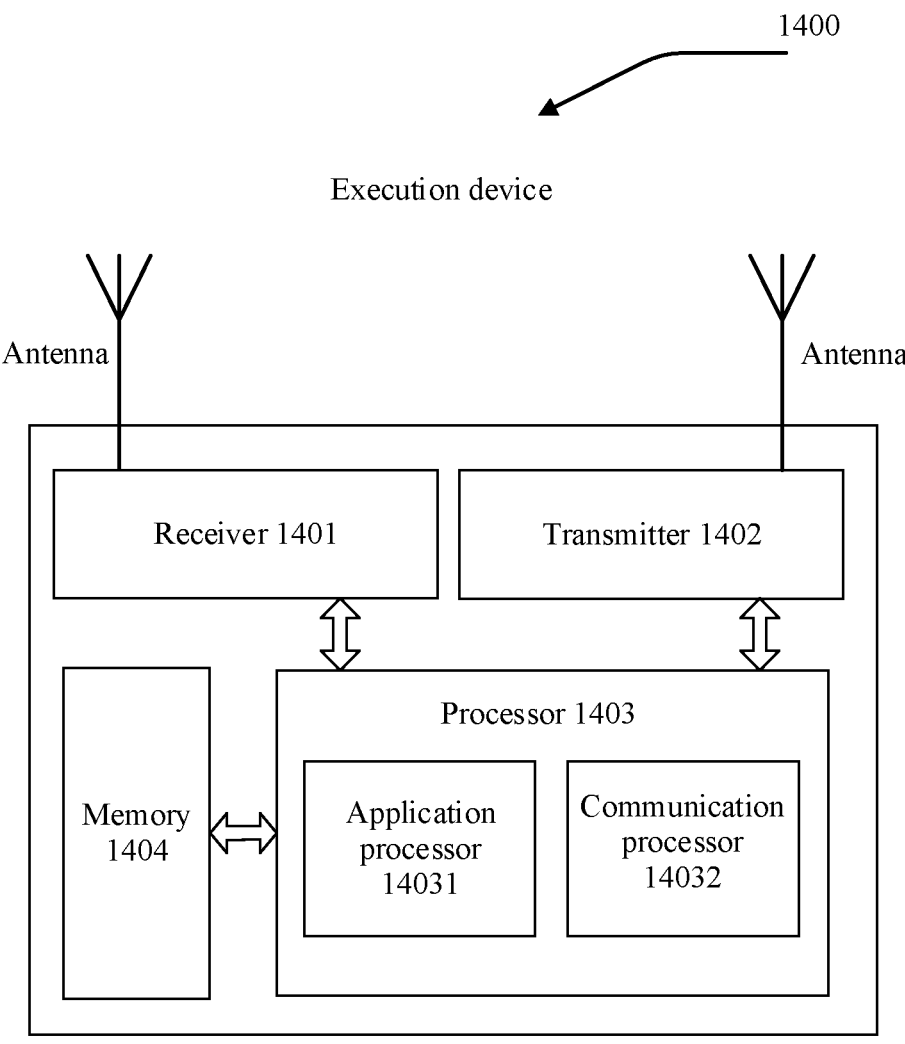
FIG. 14 is a schematic diagram of a structure of an execution device according to an embodiment of this application.

The following describes an execution device provided in an embodiment of this application. FIG. 14 is a schematic diagram of a structure of an execution device according to an embodiment of this application. An execution device 1400 may further be represented as a virtual reality VR device, a mobile phone, a tablet, a notebook computer, an intelligent wearable device, a monitoring data processing device, a server, or the like. This is not limited herein. The data encoding apparatus described in the embodiment corresponding to FIG. 3 or the data decoding apparatus described in the embodiment corresponding to FIG. 7 may be deployed on the execution device 1400. Further, the execution device 1400 may include: a receiver 1401, a transmitter 1402, a processor 1403, and a memory 1404 (there may be one or more processors 1403 in the execution device 1400, and one processor is used as an example in FIG. 15). The processor 1403 may include an application processor 14031 and a communication processor 14032. In some embodiments of this application, the receiver 1401, the transmitter 1402, the processor 1403, and the memory 1404 may be connected by using a bus or in another manner.

The memory 1404 may include a read-only memory (ROM) and a random-access memory (RAM), and provide instructions and data for the processor 1403. A part of the memory 1404 may further include a non-volatile RAM (NVRAM). The memory 1404 stores a processor and operation instructions, an executable module or a data structure, a subnet thereof, or an extended set thereof. The operation instructions may include various operation instructions to implement various operations.

The processor 1403 controls an operation of the execution device. In specific application, components of the execution device are coupled to each other by using a bus system. In addition to a data bus, the bus system may further include a power bus, a control bus, a status signal bus, and the like. However, for clear description, various types of buses in the figure are marked as the bus system.

The method disclosed in embodiments of this application may be applied to the processor 1403, or may be implemented by using the processor 1403. The processor 1403 may be an integrated circuit chip, and has a signal processing capability. In an implementation process, steps in the method may be implemented by using a hardware integrated logical circuit in the processor 1403, or by using instructions in a form of software. The processor 1403 may be a general-purpose processor, a digital signal processor (DSP), a microprocessor, or a microcontroller. The processor 1403 may further include an ASIC, an FPGA or another programmable logic device, a discrete gate, or a transistor logic device, or a discrete hardware component. The processor 1403 may implement or perform the methods, the steps, and logical block diagrams that are disclosed in embodiments of this application. The general-purpose processor may be a microprocessor, or the processor may be any conventional processor or the like. Steps of the method disclosed with reference to embodiments of this application may be directly executed and accomplished by using a hardware decoding processor, or may be executed and accomplished by using a combination of hardware and software modules in the decoding processor. A software module may be located in a mature storage medium in the art, such as aRAM, a flash memory, a read-only memory, a programmable read-only memory, an electrically erasable programmable memory, or a register. The storage medium is located in the memory

1404, and the processor 1403 reads information in the memory 1404 and completes the steps in the method in combination with hardware in the processor 1403.

The receiver 1401 may be configured to receive input digital or character information, and generate a signal input related to setting and function control of the execution device. The transmitter 1402 may be configured to output digital or character information by using a first interface. The transmitter 1402 may further be configured to send instructions to a disk group by using the first interface, to modify data in the disk group. The transmitter 1402 may further include a display device such as a display screen.

Further, the application processor 14031 is configured to obtain to-be-encoded data.

The to-be-encoded data may be data of an image, a video, or a text.

For example, the to-be-encoded data is data of an image. The image may be an image photographed by a terminal device by using a camera, or an image obtained from a terminal device (for example, an image stored in an album of the terminal device, or a picture obtained by the terminal device from a cloud). It should be understood that the image may be an image with an image compression requirement. A source of the to-be-processed image is not limited in this application.

The to-be-encoded data is processed by using a volume preserving flow model to obtain a hidden variable output. The volume preserving flow model includes a target volume preserving flow layer, an operation corresponding to the target volume preserving flow layer is an invertible operation that meets a volume preserving flow constraint, the target volume preserving flow layer is used to perform a multiplication operation on a preset coefficient and first data input to the target volume preserving flow layer, and the preset coefficient is not 1.

The target volume preserving flow layer may also be referred to as a target volume preserving coupling layer.

The volume preserving flow constraint may be that input space and output space of an operation corresponding to a volume preserving operation layer have a same volume size. The same volume size means that data of the input space one-to-one corresponds to the data of the output space, and different output data corresponds to different input data. To ensure that the operation corresponding to the target volume preserving flow layer meets the volume preserving flow constraint, a product of linear coefficients in the operation corresponding to the target volume preserving flow layer needs to be 1. Further, the first data and the preset coefficient are vectors, the first data includes N elements, the preset coefficient includes N coefficients, the N elements included in the first data one-to-one correspond to the N coefficients, the N coefficients included in the preset coefficient is the linear coefficients in the operation corresponding to the target volume preserving flow layer, and a product of the N coefficients is 1.

The invertible operation means that the operation may obtain output data based on input data, and may also inversely derive the input data based on the output data. For example, it is assumed that the input data is x, and the output data is z=f(x). x may also be restored from the output data z by using an inverse operation.

The hidden variable output is encoded to obtain encoded data.

In this embodiment of this application, the hidden variable output z may be represented by probability distribution $p_z(z)$, and the hidden variable output z may be encoded based on the probability distribution $p_z(z)$ to obtain the encoded data.

In an optional implementation, the encoded data is a binary bitstream. An entropy estimation network may be used to obtain probability estimation of each point in the hidden variable output, and entropy encoding is performed on the hidden variable output based on the probability estimation to obtain the binary bitstream. It should be noted that an existing entropy encoding technology may be used in the entropy encoding process mentioned in this application. Details are not described in this application.

In this application, lossless compression is implemented by using the volume preserving flow model. In comparison with an integer discrete flow model, on a premise that the target volume preserving flow layer of the volume preserving flow model can be inverse, the operation corresponding to the target volume preserving flow layer includes an operation (multiplication operation) other than integer addition and subtraction operations, so that the volume preserving flow model has a stronger representation capability. This can more accurately determine data distribution, and implement a better compression rate.

On the other hand, for a general flow model, it can be proved that there is no method for implementing numerical invertibility in discrete space. Because hidden variable data may correspond to a plurality of pieces of input data due to a numerical error, a plurality of encoding operations need to be performed to eliminate the numerical error, which causes low algorithm efficiency. However, in the volume preserving flow model in this embodiment of this application, a numerical invertible operation can be implemented by using a numerical invertible target volume preserving flow layer. On a premise that the model has a strong representation capability, a small quantity of encoding times is implemented in a compression process. This implements a higher compression throughput rate and a lower compression rate.

In a possible implementation, the first data and the preset coefficient are vectors, the first data includes N elements, the preset coefficient includes N coefficients, the N elements included in the first data one-to-one correspond to the N coefficients, a product of the N coefficients is 1, and performing the multiplication operation on the first data and the preset coefficient includes performing a multiplication operation on each element in the first data and a corresponding coefficient to obtain a product result.

In a possible implementation, further, the application processor 14031 is configured to process, by using a first neural network, second data input to the target volume preserving flow layer to obtain a first network output, and perform a preset operation on the first network output to obtain the preset coefficient. In an implementation, the preset operation is an exponentiation operation by using a natural constant e as a base.

In a possible implementation, the first network output is a vector, and the first network output includes the N elements. Further, the application processor 14031 is configured to obtain an average of the N elements included in the first network output, and subtract the average from each element included in the first network output to obtain processed N elements; and perform an exponentiation operation on each of the processed N elements by using a natural constant e as a base to obtain the preset coefficient, where the preset coefficient includes the N coefficients.

To ensure that the product of the N coefficients in the preset coefficient is 1, an average may be subtracted from each element included in the first network output. Further, the first network output is a vector, and the first network output includes the N elements. The average of the N elements included in the first network output may be obtained, and the average is subtracted from each element included in the first network output to obtain the processed N elements. An exponentiation operation is performed on each of the processed N elements by using the natural constant e as a base to obtain the preset coefficient, where the preset coefficient includes the N coefficients.

In a possible implementation, an output at the target volume preserving flow layer includes the second data.

In a possible implementation, the target volume preserving flow layer is further used to perform an addition operation on a constant term and the product result of the first data and the preset coefficient, where the constant term is not 0.

In a possible implementation, further, the application processor 14031 is configured to process, by using a second neural network, the second data input to the target volume preserving flow layer to obtain the constant term.

In a possible implementation, the first data and the preset coefficient are vectors, the first data includes the N elements, the preset coefficient includes the N coefficients, the N elements included in the first data one-to-one correspond to the N coefficients, the N elements include a first target element and a second target element, the first target element corresponds to a first target coefficient, the second target element corresponds to a second target coefficient, and further, the application processor 14031 is configured to obtain a first fixed-point number corresponding to the first target element and a second fixed-point number corresponding to the second target element; obtain a first fraction corresponding to the first target coefficient and a second fraction corresponding to the second target coefficient, where the first fraction includes a first numerator and a first denominator, the second fraction includes a second numerator and a second denominator, the first numerator, the first denominator, the second numerator, and the second denominator are integers, and the first denominator is the same as the second numerator; perform a multiplication operation on the first fixed-point number and the first numerator to obtain a first result; perform a division operation on the first result and the first denominator to obtain a second result, where the second result includes a first quotient result and a first remainder result, and the first quotient result is used as a multiplication result of the first target element and the first target coefficient; perform a multiplication operation on the second fixed-point number and the second numerator to obtain a third result; perform an addition operation on the third result and the first remainder result to obtain a fourth result; and perform a division operation on the fourth result and the second denominator to obtain a fifth result, where the fifth result includes a second quotient result and a second remainder result, and the second quotient result is used as a multiplication result of the second target element and the second target coefficient.

In this embodiment, an inverse calculation problem is resolved through division with a remainder. Further, a linear coefficient is changed into a fractional form, and a numerator of each dimension is a denominator of a previous dimension. Data of each dimension is multiplied by a numerator of a current linear coefficient, a remainder of the previous dimension is added, and then a denominator is used to perform division with a remainder to obtain a result of a current dimension. In addition, the remainder of division with a remainder is transferred to a next dimension, to eliminate a numerical error.

For example, a fixed-point number of the first data x may be [44/16, 55/16, 66/16], 16 indicates that precision of the fixed-point number is not in the multiplication operation, and the fixed-point number of the first data is x=[44, 55, 66]. The preset coefficient s is [0.65, 0.61, 2.52], and a fraction corresponding to the preset coefficient s is represented as [⅔, ⅗, 5/2]. The first fixed-point number is 44, the second fixed-point number is 55, the first target coefficient is 0.65, the second target coefficient is 0.61, the first fraction is ⅔, the second fraction is ⅗, the first numerator is 2, the first denominator is 3, the second numerator is 3, and the second denominator is 5. A multiplication operation is performed on the first fixed-point number (44) and the first numerator (2) to obtain the first result (88), and a division operation is performed on the first result (88) and the first denominator (3) to obtain the second result. The second result includes the first quotient result (29) and the first remainder result (1), and the first quotient result (29) is used as the multiplication result of the first target element and the first target coefficient. A multiplication operation is performed on the second fixed-point number (55) and the second numerator (3) to obtain the third result (165), an addition operation is performed on the third result (165) and the first remainder result (1) to obtain the fourth result (166), and a division operation is performed on the fourth result (166) and the second denominator (5) to obtain the fifth result. The fifth result includes the second quotient result (33) and the second remainder result (1), and the second quotient result (33) is used as the multiplication result of the second target element and the second target coefficient.

In a possible implementation, the second target element is a last element in the N elements on which a multiplication operation is performed with a corresponding coefficient in a process of performing a multiplication operation on the first data and the preset coefficient, and the target volume preserving flow layer is further used to output the second remainder result. Further, the target volume preserving flow layer may output the second remainder result to a next volume preserving flow layer adjacent to the target volume preserving flow layer. In other words, a remainder result is obtained for each element in the first data in the foregoing manner, and is input to a calculation process of a next element until a product operation of a last element in the first data is completed. In this case, an obtained remainder result may be input to an adjacent next volume preserving flow layer.

In a possible implementation, the target volume preserving flow layer is further used to output the second remainder result to a next volume preserving flow layer adjacent to the target volume preserving flow layer.

In a possible implementation, the volume preserving flow model further includes a first volume preserving flow layer, the first volume preserving flow layer is an adjacent volume preserving flow layer before the target volume preserving flow layer, and further, the application processor 14031 is configured to obtain a remainder result output by the first volume preserving flow layer; and perform a multiplication operation on the first fixed-point number and the first numerator, and performing an addition operation on a multiplication operation result and the remainder result output by the first volume preserving flow layer to obtain the first result.

In an implementation, if the target volume preserving flow layer is a 1$^{st}$ volume preserving flow layer (namely, a volume preserving flow layer for processing the to-be-encoded data) in the volume preserving flow model, the first result is the multiplication result of the multiplication operation performed on the first fixed-point number and the first numerator. If the target volume preserving flow layer is not a $1^{st}$ volume preserving flow layer (namely, a volume preserving flow layer not for processing the to-be-encoded data, but for processing an output result at another intermediate layer) in the volume preserving flow model, the first fixed-point number is a summation result of the multiplication result of the multiplication operation performed on the first fixed-point number and the first numerator and a remainder result output by an adjacent previous volume preserving flow layer.

In a possible implementation, the volume preserving flow model includes M volume preserving flow layers that are connected in series, the M volume preserving flow layers that are connected in series include the target volume preserving flow layer, an output at an $(i-1)^{th}$ volume preserving flow layer is used as an input at an $i^{th}$ volume preserving flow layer, i is a positive integer not greater than M, an input at a $1^{st}$ volume preserving flow layer is the to-be-encoded data, and an output at an $M^{th}$ volume preserving flow layer is the hidden variable output. The volume preserving flow model may be obtained by stacking a plurality of volume preserving flow layers.

In a possible implementation, the volume preserving flow model further includes a target convolutional layer connected to the target volume preserving flow layer, the output at the target volume preserving flow layer is used as an input at the target convolutional layer, and the target convolutional layer is used to perform a multiplication operation on the output at the target volume preserving flow layer and a weight matrix.

In a possible implementation, further, the application processor 14031 is configured to obtain the weight matrix; perform LU decomposition on the weight matrix to obtain a first matrix, a second matrix, a third matrix, and a fourth matrix, where the first matrix is a permutation matrix, the second matrix is a lower triangular matrix, the third matrix is a unit matrix whose product of diagonal elements is 1, and the fourth matrix is an upper triangular matrix; perform a multiplication operation on the output at the target volume preserving flow layer and the fourth matrix to obtain a sixth result; perform a multiplication operation on the sixth result and the third matrix to obtain a seventh result; perform a multiplication operation on the seventh result and the second matrix to obtain an eighth result; and perform a multiplication operation on the eighth result and the first matrix to obtain a ninth result, where the ninth result is used as a result obtained by performing a multiplication operation on the output at the target volume preserving flow layer and the weight matrix.

In this embodiment, the target convolutional layer is converted into continuous matrix multiplication operations of the upper triangular matrix, the diagonal matrix, the lower triangular matrix, and the permutation matrix, and iterative calculation, numerical calculation at a coupling layer, iterative calculation, and element rearrangement are respectively used for the four matrix multiplication operations. When a multiplication operation is performed on the convolutional layer and the weight matrix, the target convolutional layer is converted into continuous matrix multiplication operations of the upper triangular matrix, the diagonal matrix, the lower triangular matrix, and the permutation matrix. Four calculation manners, namely, iterative calculation, numerical calculation at the target volume preserving flow layer, iterative calculation, and element rearrangement, are respectively used for the four matrix multiplication operations. In addition, an inverse calculation method of each calculation manner is provided, to implement numerical inverse calculation at the target convolutional layer.

In a possible implementation, the volume preserving flow model includes M volume preserving flow layers and M convolutional layers that are connected in series, the M volume preserving flow layers include the target volume preserving flow layer, the M convolutional layers include the target convolutional layer, an output at an $i^{th}$ volume preserving flow layer is used as an input at an $i^{th}$ convolutional layer, an output at the $i^{th}$ convolutional layer is used as an input at an $(i+1)^{th}$ volume preserving flow layer, i is a positive integer not greater than M, an input at a $1^{st}$ volume preserving flow layer is the to-be-encoded data, and an output at an $M^{th}$ convolutional layer is the hidden variable output. The volume preserving flow model may be obtained by stacking a plurality of volume preserving flow layers and a plurality of convolutional layers.

Further, the application processor 14031 is configured to obtain encoded data.

The encoded data is decoded to obtain a hidden variable output.

The hidden variable output is processed by using a volume preserving flow model to obtain a decoding output. The volume preserving flow model includes a target volume preserving flow layer, an operation corresponding to the target volume preserving flow layer is an invertible operation that meets a volume preserving flow constraint, the target volume preserving flow layer is used to perform a multiplication operation on a preset coefficient and first data input to the target volume preserving flow layer, and the preset coefficient is not 1.

In a possible implementation, the volume preserving flow constraint includes that input space and output space of an operation corresponding to a volume preserving operation layer have a same volume size.

In a possible implementation, the first data and the preset coefficient are vectors, the first data includes N elements, the preset coefficient includes N coefficients, the N elements included in the first data one-to-one correspond to the N coefficients, a product of the N coefficients is 1, and the performing a division operation on the first data and the preset coefficient includes performing a division operation on each element in the first data and a corresponding coefficient to obtain a division result.

In a possible implementation, further, the application processor 14031 is configured to process, by using a first neural network, second data input to the target volume preserving flow layer to obtain a first network output, and perform a preset operation on the first network output to obtain the preset coefficient.

In a possible implementation, the first network output is a vector, and the first network output includes the N elements. Further, the application processor 14031 is configured to obtain an average of the N elements included in the first network output, and subtract the average from each element included in the first network output to obtain processed N elements; and perform an exponentiation operation on each of the processed N elements by using a natural constant e as a base to obtain the preset coefficient, where the preset coefficient includes the N coefficients.

In a possible implementation, an output at the target volume preserving flow layer includes the second data.

In a possible implementation, the target volume preserving flow layer is further used to: perform a subtraction operation on the first data and a constant term to obtain a subtraction result, where the constant term is not 0; and perform a division operation on the subtraction result and the preset coefficient.

In a possible implementation, further, the application processor 14031 is configured to process, by using a second neural network, the second data input to the target volume preserving flow layer to obtain the constant term.

In a possible implementation, the first data and the preset coefficient are vectors, the first data includes the N elements, the preset coefficient includes the N coefficients, the N elements included in the first data one-to-one correspond to the N coefficients, the N elements include a first target element and a second target element, the first target element corresponds to a first target coefficient, and further, the application processor 14031 is configured to obtain a first fixed-point number corresponding to the first target element and a second fixed-point number corresponding to the second target element; obtain a first fraction corresponding to the first target coefficient and a second fraction corresponding to the second target coefficient, where the first fraction includes a first numerator and a first denominator, the second fraction includes a second numerator and a second denominator, the first numerator, the first denominator, the second numerator, and the second denominator are integers, and the first denominator is the same as the second numerator; perform a multiplication operation on the first fixed-point number and the first denominator to obtain a first result; perform a division operation on the first result and the first numerator to obtain a second result, where the second result includes a first quotient result and a first remainder result, and the first quotient result is used as a division result of the first target element and the first target coefficient; perform a multiplication operation on the second fixed-point number and the second denominator to obtain a third result; perform an addition operation on the third result and the first remainder result to obtain a fourth result; and perform a division operation on the fourth result and the second numerator to obtain a fifth result, where the fifth result includes a second quotient result and a second remainder result, and the second quotient result is used as a division result of the second target element and the second target coefficient.

In a possible implementation, the second target element is a last element in the N elements on which a division operation is performed with a corresponding coefficient in a process of performing a division operation on the first data and the preset coefficient, and the target volume preserving flow layer is further used to output the second remainder result.

In a possible implementation, the volume preserving flow model further includes a first volume preserving flow layer, the first volume preserving flow layer is an adjacent volume preserving flow layer before the target volume preserving flow layer, and further, the application processor 14031 is configured to obtain the first fixed-point number of the first target element, and perform an addition operation on the first fixed-point number and a remainder result output by the first volume preserving flow layer to obtain the first result.

In a possible implementation, the volume preserving flow model includes M volume preserving flow layers that are connected in series, the M volume preserving flow layers that are connected in series include the target volume preserving flow layer, an output at an $(i-1)^{th}$ volume preserving flow layer is used as an input at an $i^{th}$ volume preserving flow layer, i is a positive integer not greater than M, an input at a $1^{st}$ volume preserving flow layer is the hidden variable output, and an output at an $M^{th}$ volume preserving flow layer is the decoding output.

In a possible implementation, the volume preserving flow model further includes a target convolutional layer connected to the target volume preserving flow layer, an output at the target convolutional layer is the first data, and the target convolutional layer is used to perform a division operation on input data and a weight matrix.

In a possible implementation, further, the application processor 14031 is configured to obtain the weight matrix; perform LU decomposition on the weight matrix to obtain a first matrix, a second matrix, a third matrix, and a fourth matrix, where the first matrix is a permutation matrix, the second matrix is a lower triangular matrix, the third matrix is a unit matrix whose product of diagonal elements is 1, and the fourth matrix is an upper triangular matrix; perform a multiplication operation on the input data and an inverse matrix of the first matrix to obtain a sixth result; perform a multiplication operation on the sixth result and an inverse matrix of the second matrix to obtain a seventh result; perform a multiplication operation on the seventh result and an inverse matrix of the third matrix to obtain an eighth result; and perform a multiplication operation on the eighth result and an inverse matrix of the fourth matrix to obtain a ninth result, where the ninth result is used as a result obtained by performing a division operation on the input data and the weight matrix.

In a possible implementation, the volume preserving flow model includes M volume preserving flow layers and M convolutional layers that are connected in series, the M volume preserving flow layers include the target volume preserving flow layer, the M convolutional layers include the target convolutional layer, an output at an $i^{th}$ convolutional layer is used as an input at an $i^{th}$ volume preserving flow layer, an output at the $i^{th}$ volume preserving flow layer is used as an input of an $(i+1)^{th}$ convolutional layer, i is a positive integer not greater than M, an input at a $1^{st}$ convolutional layer is the hidden variable output, and an output at an $M^{th}$ volume preserving flow layer is the decoding output.

An embodiment of this application further provides a computer program product. When the computer program product is run on a computer, the computer is enabled to perform the steps performed by the execution device in the method described in the embodiment shown in FIG. 14.

An embodiment of this application further provides a computer-readable storage medium. The computer-readable storage medium stores a program used for signal processing. When the program is run on a computer, the computer is enabled to perform the steps performed by the execution device in the method described in the embodiment shown in FIG. 14.

The execution device, the training device, or the terminal device in embodiments of this application may further be a chip. The chip includes a processing unit and a communication unit. The processing unit may be, for example, a processor, and the communication unit may be, for example, an input/output interface, a pin, or a circuit. The processing unit may execute computer-executable instructions stored in a storage unit, so that a chip in the execution device performs the data encoding method described in the embodiment shown in FIG. 3, or a chip in the training device performs the data decoding method described in the embodiment shown in FIG. 7. Optionally, the storage unit is a storage unit in the chip, for example, a register or a buffer. Alternatively, the storage unit may be a storage unit in a wireless access device but outside the chip, for example, aROM, another type of static storage device that can store static information and instructions, or a RAM.

Figure 15:
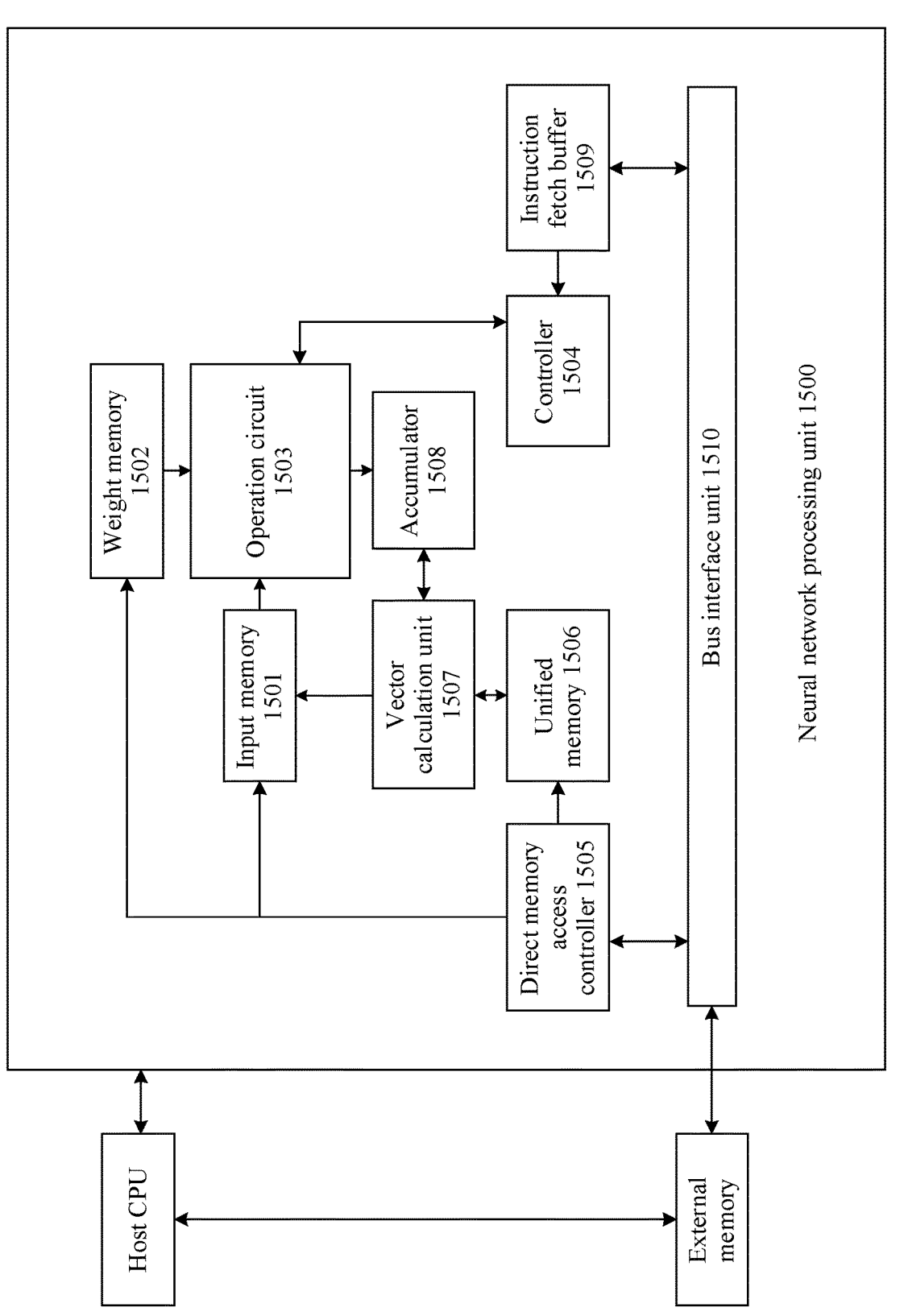
FIG. 15 is a schematic diagram of a structure of a chip according to an embodiment of this application.

Further, FIG. 15 is a schematic diagram of a structure of a chip according to an embodiment of this application. The chip may be represented as a neural network processing unit NPU 1500. The NPU 1500 is mounted to a host CPU as a coprocessor, and the host CPU allocates a task. A core part of the NPU is an operation circuit 1503, and a controller 1504 controls the operation circuit 1503 to extract matrix data in a memory and perform a multiplication operation.

In some implementations, the operation circuit 1503 internally includes a plurality of process engines (PE). In some implementations, the operation circuit 1503 is a two-dimensional systolic array. The operation circuit 1503 may alternatively be a one-dimensional systolic array or another electronic circuit capable of performing mathematical operations such as multiplication and addition. In some implementations, the operation circuit 1503 is a general-purpose matrix processor.

For example, it is assumed that there is an input matrix A, a weight matrix B, and an output matrix C. The operation circuit fetches corresponding data of the matrix B from a weight memory 1502, and buffers the data on each PE in the operation circuit. The operation circuit obtains data of the matrix A from the input memory 1501 to perform a matrix operation on the matrix B, and stores an obtained partial result or an obtained final result of the matrix into an accumulator 1508.

A unified memory 1506 is configured to store input data and output data. Weight data is directly transferred to the weight memory 1502 by using a direct memory access controller (DMAC) DMAC 1505. The input data is also transferred to the unified memory 1506 by using the DMAC.

A bus interface unit (BIU) namely, a bus interface unit 1510, is configured for interaction between an advanced extensible interface (AXI) bus and the DMAC and interaction between the AXI bus and an instruction fetch buffer (IFB) 1509.

The BIU 1510 is configured to obtain an instruction from an external memory by the instruction fetch buffer 1509, and is further configured to obtain original data of the input matrix A or the weight matrix B from the external memory by the direct memory access controller 1505.

The DMAC is mainly configured to transfer input data in the external memory Double Data Rate (DDR) to the unified memory 1506, transfer weight data to the weight memory 1502, or transfer input data to the input memory 1501.

A vector calculation unit 1507 includes a plurality of operation processing units. If required, further processing is performed on an output of the operation circuit, for example, vector multiplication, vector addition, an exponential operation, a logarithmic operation, or size comparison. The vector calculation unit 1207 is mainly configured to perform network calculation at a non-convolutional/fully connected layer in a neural network, for example, batch normalization, pixel-level summation, and upsampling on a feature plane.

In some implementations, the vector calculation unit 1507 can store a processed output vector in the unified memory 1506. For example, the vector calculation unit 1507 may apply a linear function or a non-linear function to the output of the operation circuit 1503, for example, perform linear interpolation on a feature plane extracted at a convolutional layer. For another example, the linear function or the non-linear function is applied to a vector of an accumulated value to generate an activation value. In some implementations, the vector calculation unit 1507 generates a normalized value, a pixel-level summation value, or both. In some implementations, the processed output vector can be used as an activation input to the operation circuit 1503, for example, to be used in a subsequent layer in the neural network.

The IFB 1509 connected to the controller 1504, configured to store instructions used by the controller 1504.

The unified memory 1506, the input memory 1501, the weight memory 1502, and the instruction fetch buffer 1509 are all on-chip memories. The external memory is private to a hardware architecture of the NPU.

The processor mentioned above may be a general-purpose central processing unit, a microprocessor, an ASIC, or one or more integrated circuits for controlling program execution in the method in the first aspect.

In addition, it should be noted that the described apparatus embodiment is merely an example. The units described as separate parts may or may not be physically separate, and parts displayed as units may or may not be physical units, may be located in one position, or may be distributed on a plurality of network units. Some or all the modules may be selected according to actual needs to achieve the objectives of the solutions of embodiments. In addition, in the accompanying drawings of the apparatus embodiments provided by this application, connection relationships between modules indicate that the modules have communication connections with each other, which may be further implemented as one or more communication buses or signal cables.

Based on the description of the foregoing implementations, a person skilled in the art may clearly understand that this application may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be in various forms, for example, in a form of an analog circuit, a digital circuit, or a dedicated circuit. However, as for this application, software program implementation is a better implementation in most cases. Based on such an understanding, the technical solutions of this application essentially, or the part contributing to a current technology may be implemented in a form of a software product. The computer software product is stored in a readable storage medium, for example, a floppy disk, a Universal Serial Bus (USB) flash drive, a removable hard disk, a ROM, a RAM, a magnetic disk, or an optical disc on a computer, and includes several instructions for instructing a computer device (that may be a personal computer, a training device, or a network device) to perform the method described in embodiments of this application.

All or some of the embodiments may be implemented by using software, hardware, firmware, or any combination thereof. When software is used to implement the embodiments, all or a part of the embodiments may be implemented in a form of a computer program product.

The computer program product includes one or more computer instructions. When the computer program instructions are loaded and executed on the computer, the procedure or functions according to embodiments of this application are all or partially generated. The computer may be a general-purpose computer, a dedicated computer, a computer network, or other programmable apparatuses. The computer instruction may be stored in a computer-readable storage medium or may be transmitted from a computer-readable storage medium to another computer-readable storage medium. For example, the computer instruction may be transmitted from a web site, computer, training device, or data center to another web site, computer, training device, or data center in a wired (for example, using a coaxial cable, an optical fiber, or a digital subscriber line (DSL)) or wireless (for example, via infrared, radio, or microwaves) manner. The computer-readable storage medium may be any usable medium accessible by the computer, or a data storage device, such as a training device or a data center, integrating one or more usable media. The usable medium may be a magnetic medium (for example, a floppy disk, a hard disk, or a magnetic tape), an optical medium (for example, a Digital Versatile Disc (DVD)), a semiconductor medium (for example, a solid-state disk (SSD)), or the like.

What is claimed is:

1. A method comprising:
obtaining to-be-encoded data;
processing the to-be-encoded data using a trained volume preserving flow model to obtain a latent variable output representing a bijective transformation of the to-be-encoded data, wherein the trained volume preserving flow model comprises a plurality of invertible layers comprising a target volume preserving flow layer, wherein the target volume preserving flow layer performs an invertible operation that meets a volume preserving flow constraint, wherein the volume preserving flow constraint comprises that input space and output space of an operation corresponding to a volume preserving operation layer have a same volume size, wherein the invertible operation comprises an element-wise multiplication operation on a preset coefficient vector and an input vector to the target volume preserving flow layer, and wherein the preset coefficient vector comprises N coefficients whose product is equal to 1; and
encoding the latent variable output using entropy encoding based on a learned probability distribution associated with the latent variable output to obtain encoded data.

2. The method of claim 1, wherein the input vector comprises N elements that one-to-one correspond to the N coefficients, and wherein performing the an element-wise multiplication operation comprises performing the an element-wise multiplication operation on each of the N elements and a corresponding coefficient of the N coefficients to obtain a product result.

3. The method of claim 1, further comprising:
processing, using a first neural network, input data to the target volume preserving flow layer to obtain a first network output; and
performing a preset operation on the first network output to obtain the preset coefficient vector.

4. The method of claim 3, wherein the first network output is a vector and comprising N elements, and wherein performing the preset operation comprises:
obtaining an average of the N elements and subtracting the average from each of the N elements to obtain processed N elements; and
performing an exponentiation operation on each of the processed N elements using a natural constant e as a base to obtain the preset coefficient vector.

5. The method of claim 3, wherein an output at the target volume preserving flow layer comprises the input data.

6. The method of claim 1, further comprising performing, using the target volume preserving flow layer, an addition operation on a constant term and a product result of the input vector and the preset coefficient vector, wherein the constant term is not 0.

7. The method of claim 6, further comprising processing, using a second neural network, input data to the target volume preserving flow layer to obtain the constant term.

8. The method of claim 1, wherein the input vector comprises N elements that one-to-one correspond to the N coefficients, wherein the N elements comprise a first target element corresponding to a first target coefficient and a second target element corresponding to a second target coefficient, and wherein performing the element-wise multiplication operation comprises:
obtaining a first fixed-point number corresponding to the first target element and a second fixed-point number corresponding to the second target element;
obtaining a first fraction corresponding to the first target coefficient and a second fraction corresponding to the second target coefficient, wherein the first fraction comprises a first numerator and a first denominator, wherein the second fraction comprises a second numerator and a second denominator, wherein the first numerator, the first denominator, the second numerator, and the second denominator are integers, and wherein the first denominator is the same as the second numerator;
performing a second multiplication operation on the first fixed-point number and the first numerator to obtain a first result;
performing a first division operation on the first result and the first denominator to obtain a second result, wherein the second result comprises a first quotient result and a first remainder result, and wherein the first quotient result is a first multiplication result of the first target element and the first target coefficient;
performing a third multiplication operation on the second fixed-point number and the second numerator to obtain a third result;
performing an addition operation on the third result and the first remainder result to obtain a fourth result; and
performing a second division operation on the fourth result and the second denominator to obtain a fifth result, wherein the fifth result comprises a second quotient result and a second remainder result, and wherein the second quotient result is a second multiplication result of the second target element and the second target coefficient.

9. The method of claim 8, wherein the second target element is a last element in the N elements on which a fourth multiplication operation is performed with a corresponding coefficient in a process of performing the element-wise multiplication operation, and wherein the target volume preserving flow layer further outputs the second remainder result.

10. The method of claim 8, wherein the volume preserving flow model further comprises a first volume preserving flow layer which is an adjacent volume preserving flow layer before the target volume preserving flow layer, and wherein performing the second multiplication operation comprises:
obtaining a remainder result output by the first volume preserving flow layer; and
performing the second multiplication operation and performing, using the first volume preserving flow layer, an addition operation on a multiplication operation result and the remainder result output to obtain the first result.

11. The method of claim 1, wherein the volume preserving flow model comprises M volume preserving flow layers that are connected in series, wherein the M volume preserving flow layers comprise the target volume preserving flow layer, wherein a first output at an $(i-1)^{th}$ volume preserving flow layer is a first input at an $i^{th}$ volume preserving flow layer, wherein i is a positive integer not greater than M, wherein a second input at a $1^{st}$ volume preserving flow layer is the to-be-encoded data, and wherein a second output at an $M^{th}$ volume preserving flow layer is the latent variable output.

12. The method of claim 1, wherein the volume preserving flow model further comprises a target convolutional layer connected to the target volume preserving flow layer, wherein an output at the target volume preserving flow layer is an input at the target convolutional layer, and wherein the method further comprising performing, using the target convolutional layer, a second multiplication operation on the output and a weight matrix.

13. The method of claim 12, wherein performing the second multiplication operation comprises:
obtaining the weight matrix;
performing lower-upper (LU) decomposition on the weight matrix to obtain a first matrix, a second matrix, a third matrix, and a fourth matrix, wherein the first matrix is a permutation matrix, wherein the second matrix is a lower triangular matrix, wherein the third matrix is a unit matrix whose product of diagonal elements is 1, and wherein the fourth matrix is an upper triangular matrix;
performing a third multiplication operation on the output and the fourth matrix to obtain a sixth result;
performing a fourth multiplication operation on the sixth result and the third matrix to obtain a seventh result;
performing a fifth multiplication operation on the seventh result and the second matrix to obtain an eighth result; and
performing a sixth multiplication operation on the eighth result and the first matrix to obtain a ninth result, wherein the ninth result is a result of the second multiplication operation.

14. The method of claim 12, wherein the volume preserving flow model comprises M volume preserving flow layers and M convolutional layers that are connected in series, wherein the M volume preserving flow layers comprise the target volume preserving flow layer, wherein the M convolutional layers comprise the target convolutional layer, wherein a first output at an $i^{th}$ volume preserving flow layer is a first input at an $i^{th}$ convolutional layer, wherein a second output at the $i^{th}$ convolutional layer is a second input at an $(i+1)^{th}$ volume preserving flow layer, wherein i is a positive integer not greater than M, wherein a third input at a $1^{st}$ volume preserving flow layer is the to-be-encoded data, and wherein a third output at an $M^{th}$ convolutional layer is the latent variable output.

15. A method comprising:
obtaining encoded data;
decoding the encoded data to obtain a latent variable output representing a bijective transformation of the encoded data; and
processing the latent variable output using a trained volume preserving flow model to obtain a decoding output, wherein the trained volume preserving flow model comprises a plurality of invertible layers comprising a target volume preserving flow layer, wherein the target volume preserving flow layer performs an invertible operation that meets a volume preserving flow constraint, wherein the volume preserving flow constraint comprises that input space and output space of an operation corresponding to a volume preserving operation layer have a same volume size, wherein the invertible operation comprises an element-wise division operation on a preset coefficient vector and an input vector to the target volume preserving flow layer, and wherein the preset coefficient vector comprises N coefficients whose product is equal to 1.

16. The method of claim 15, wherein the input vector comprises N elements that one-to-one correspond to the N coefficients, and wherein performing the element-wise division operation comprises performing the element-wise division operation on each of the N elements and a corresponding coefficient of the N coefficients to obtain a division result.

17. An apparatus comprising:
a memory configured to store instructions; and
one or more processors coupled to the memory and configured to:
obtain to-be-encoded data;
process the to-be-encoded data using a trained volume preserving flow model to obtain a latent variable output representing a bijective transformation of the to-be-encoded data, wherein the trained volume preserving flow model comprises a plurality of invertible layers comprising a target volume preserving flow layer, wherein the target volume preserving flow layer performs an invertible operation that meets a volume preserving flow constraint, wherein the volume preserving flow constraint comprises that input space and output space of an operation corresponding to a volume preserving operation layer have a same volume size, wherein the invertible operation comprises an element-wise multiplication operation on a preset coefficient vector and an input vector to the target volume preserving flow layer, and wherein the preset coefficient vector comprises N coefficients whose product is equal to 1; and
encode the latent variable output using entropy encoding based on a learned probability distribution associated with the latent variable output to obtain encoded data.

* * * * *